(12) United States Patent
Wu

(10) Patent No.: US 12,349,021 B2
(45) Date of Patent: Jul. 1, 2025

(54) MANAGING CONDITIONAL CONFIGURATION WHEN A SECONDARY CELL IS UNAVAILABLE

(71) Applicant: GOOGLE LLC, Mountain View, CA (US)

(72) Inventor: Chih-Hsiang Wu, Taoyuan (TW)

(73) Assignee: GOOGLE LLC, Mountain View, CA (US)

( * ) Notice: Subject to any disclaimer, the term of this patent is extended or adjusted under 35 U.S.C. 154(b) by 325 days.

(21) Appl. No.: 17/799,214

(22) PCT Filed: Jan. 29, 2021

(86) PCT No.: PCT/US2021/015648
§ 371 (c)(1),
(2) Date: Aug. 11, 2022

(87) PCT Pub. No.: WO2021/162870
PCT Pub. Date: Aug. 19, 2021

(65) Prior Publication Data
US 2023/0345315 A1    Oct. 26, 2023

Related U.S. Application Data

(60) Provisional application No. 62/975,381, filed on Feb. 12, 2020.

(51) Int. Cl.
*H04W 36/36* (2009.01)
*H04W 36/00* (2009.01)

(52) U.S. Cl.
CPC .... *H04W 36/362* (2023.05); *H04W 36/00698* (2023.05)

(58) Field of Classification Search
CPC ................ H04W 36/362; H04W 36/00698
See application file for complete search history.

(56) References Cited

U.S. PATENT DOCUMENTS

| 2014/0045502 A1 | 2/2014 | Whinnett et al. |
| 2016/0338039 A1 | 11/2016 | Van Der Velde et al. |

(Continued)

FOREIGN PATENT DOCUMENTS

| CN | 108668284 A | 10/2018 |
| WO | WO-2018175721 A1 | 9/2018 |
| WO | WO-2018203710 A1 | 11/2018 |

OTHER PUBLICATIONS

International Search Report and Written Opinion for Application No. PCT/US2021/015648, dated Apr. 22, 2021.

(Continued)

*Primary Examiner* — Alex Skripnikov
(74) *Attorney, Agent, or Firm* — MARSHALL, GERSTEIN & BORUN LLP

(57) ABSTRACT

A user equipment (UE) can implement a method for managing mobility. The method includes operating in dual connectivity (DC) with a master node (MN) via a primary cell and a secondary node (SN) via a primary secondary cell, the MN and the SN operating in a radio access network (RAN) (1702). The method further includes receiving, from the RAN, a conditional configuration related to a candidate primary secondary cell, the conditional configuration associated with a condition to be satisfied before the UE applies the conditional configuration during a conditional procedure (1704). The method also includes detecting a secondary cell group (SCG) failure. Still further, the method includes, in response to the detecting, suspending the conditional procedure.

15 Claims, 32 Drawing Sheets

(56) References Cited

U.S. PATENT DOCUMENTS

2018/0278357 A1    9/2018  Kim et al.
2018/0279193 A1    9/2018  Park et al.
2021/0105681 A1*   4/2021  Paladugu ............ H04W 36/328
2022/0386207 A1*  12/2022  Rugeland .............. H04W 76/15

OTHER PUBLICATIONS

Potevio, "Considerations on Failure Handling for CPAC in NR," 3GPP Draft (2019).
LG Electronics Inc., "SCG Failure Handling with Conditional PSCell," 3GPP Draft (2019).
Catt, "Conditional PSCell Addition/Change," 3GPP Draft (2019).
First Examination Report for India Application No. 202247048774, dated Jan. 10, 2023.
Office Action for European Application No. 21707119.0, dated Feb. 27, 2024.
Vivo, "Remaining Issue of Conditional PSCell Addition and Change," 3GPP Draft (Nov. 8, 2019).

* cited by examiner

MANAGING CONDITIONAL CONFIGURATION WHEN A SECONDARY CELL IS UNAVAILABLE

CROSS-REFERENCE TO RELATED APPLICATIONS

This patent application is a national stage application, filed under 35 U.S.C. § 371, of International Application No. PCT/US21/15648, filed Jan. 29, 2021 and entitled, "MANAGING CONDITIONAL CONFIGURATION WHEN A SECONDARY CELL IS UNAVAILABLE," which claims priority to and the benefit of U.S. Provisional Patent Application No. 62/975,381, filed on Feb. 12, 2020 and entitled "MANAGING CONDITIONAL CONFIGURATION WHEN A SECONDARY CELL IS UNAVAILABLE," the entire disclosures of which are hereby incorporated by reference herein in their entireties.

FIELD OF THE DISCLOSURE

This disclosure relates generally to wireless communications and, more particularly, to managing conditional configuration when a user equipment (UE) operates in Multi-Radio Dual Connectivity (MR-DC) and encounters secondary cell group configuration (SCG) failure.

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In telecommunication systems, the Packet Data Convergence Protocol (PDCP) sublayer of the radio protocol stack provides services such as transfer of user-plane data, ciphering, integrity protection, etc. For example, the PDCP layer defined for the Evolved Universal Terrestrial Radio Access (EUTRA) radio interface (see 3GPP specification TS 36.323) and New Radio (NR) (see 3GPP specification TS 38.323) provides sequencing of protocol data units (PDUs) in the uplink direction (from a user device, also known as a user equipment (UE), to a base station) as well as in the downlink direction (from the base station to the UE). Further, the PDCP sublayer provides signaling radio bearers (SRBs) and data radio bearers (DRBs) to the Radio Resource Control (RRC) sublayer. Generally speaking, the UE and a base station can use SRBs to exchange RRC messages as well as non-access stratum (NAS) messages, and can use DRBs to transport data on a user plane.

UEs can use several types of SRBs and DRBs. When operating in dual connectivity (DC), the cells associated with the base station operating the master node (MN) define a master cell group (MCG), and the cells associated with the base station operating as the secondary node (SN) define the secondary cell group (SCG). So-called SRB1 resources carry RRC messages, which in some cases include NAS messages over the dedicated control channel (DCCH), and SRB2 resources support RRC messages that include logged measurement information or NAS messages, also over the DCCH but with lower priority than SRB1 resources. More generally, SRB1 and SRB2 resources allow the UE and the MN to exchange RRC messages related to the MN and embed RRC messages related to the SN, and also can be referred to as MCG SRBs. SRB3 resources allow the UE and the SN to exchange RRC messages related to the SN, and can be referred to as SCG SRBs. Split SRBs allow the UE to exchange RRC messages directly with the MN via lower layer resources of the MN and the SN. Further, DRBs using the lower-layer resources of only the MN can be referred as MCG DRBs, DRBs using the lower-layer resources of only the SN can be referred as SCG DRBs, and DRBs using the lower-layer resources of both the MCG or and the SCG can be referred to as split DRBs.

The UE in some scenarios can concurrently utilize resources of multiple RAN nodes (e.g., base stations or components of a distributed base station), interconnected by a backhaul. When these network nodes operate using different radio access technologies (RATS), this type of connectivity is referred to as Multi-Radio Dual Connectivity (MR-DC). When a UE operates in MR-DC, one base station operates as a master node (MN) and uses a primary cell (PCell) associated with an MCG, and the other base station operates as a secondary node (SN) and uses a primary secondary cell (PSCell) associated with an SCG for communicating with the UE. In other scenarios, the UE utilizes resources of one base station at a time. A connected base station and/or the UE determines that the UE should establish a radio connection with another base station. For example, one base station can determine to hand the UE over to the second base station, and initiate a handover procedure.

3GPP technical specifications (TS) 36.300 and 38.300 describes procedures for handover (also referred to as reconfiguration with sync) scenarios. These procedures involve messaging (e.g., RRC signaling and preparation) between RAN nodes. This messaging generally causes latency, which in turn increases the probability of handover procedures. These procedures do not involve conditions associated with the UE, and can be referred to as "immediate" handover procedures. R2-1914640 and R2-1914834 describes procedures for conditionally handover scenarios.

3GPP specification TS 37.340 (v15.7.0) describes procedures for a UE to add or change an SN in DC scenarios. These SN-related procedures involve messaging (e.g., RRC signaling and preparation) between radio access network (RAN) nodes. This messaging generally causes latency, which in turn increases the probability that the SN addition or SN change procedure will fail. These SN-related procedures, which do not involve conditions that are checked at the UE, can be referred to as "immediate" SN addition and SN change procedures.

UEs can also perform handover procedures to switch from one cell to another, whether in single connectivity (SC) or DC operation. The UE may perform a handover procedure to switch its connection from a cell of a first base station to a cell of a second base station, or from a cell of a first distributed unit (DU) of a base station to a cell of a second DU of the same base station, depending on the scenario. 3GPP specifications 36.300 v15.6.0 and 38.300 v15.6.0 describe a handover procedure that includes several steps (RRC signaling and preparation) between RAN nodes, which causes latency in the handover procedure and therefore increases the risk of handover failure.

More recently, for both SN or PSCell addition/change and handover, "conditional" procedures have been considered (i.e., conditional SN or PSCell addition/change and conditional handover). Unlike the "immediate" procedures discussed above, these procedures do not add or change the SN or PSCell, or perform the handover, until the UE determines that a condition is satisfied. As used herein, the term "condition" may refer to a single, detectable state or event (e.g., a particular signal quality metric exceeding a threshold), or to a logical combination of such states or events (e.g., "Condition A and Condition B," or "(Condition A or Condition B) and Condition C", etc.).

To configure a conditional procedure, the RAN provides the condition to the UE, along with a configuration (e.g., a set of random-access preambles, etc.) that will enable the UE to communicate with the appropriate base station, or via the appropriate cell, when the condition is satisfied. For a conditional addition of a base station as an SN or a candidate cell as a PSCell, for example, the RAN provides the UE with a condition to be satisfied before the UE can add that base station as the SN or that candidate cell as the PSCell, and a configuration that enables the UE to communicate with that base station or PSCell after the condition has been satisfied.

In some cases, a UE operating in MR-DC can detect a secondary cell group (SCG) failure described in 3GPP specifications 36.331 v15.8.0 and 38.331 v15.8.0. An SCG failure may prevent the UE from communicating with the SN, at least temporarily. When the UE also has stored a conditional configuration related to a candidate PSCell, it is unclear how the UE and/or the base station should manage the conditional configuration if the UE detects the SCG failure. When the status of conditional configuration is not precisely defined, a base station operating as an SN may not recognize the UE, or the base station may fail to release resources in a timely manner.

SUMMARY

A UE that initially operates in DC with an MN and an SN detects SCG failure and receives a conditional configuration related to a C-PSCell. In other scenarios, the UE receives conditional configuration related to a C-PSCell, attempts to connect to the C-PSCell, but fails to complete the random access procedure. The UE determines whether the UE should retain the conditional configuration and subsequently attempts to resume communication in DC via the PSCell or the C-PSCell.

In some implementations, the UE retains the conditional configuration after detecting the SCG failure and attempts to resume communication in DC via the C-PSCell. According to some of these implementations, the UE applies the conditional configuration only when the corresponding condition is satisfied. In other cases, however, the UE applies the conditional configuration if the C-PSCell is suitable, regardless of whether the corresponding condition is satisfied. In other implementations, the UE releases the conditional configuration after detecting the SCG failure and subsequently receives a reconfiguration command for connecting to the SN via a new PSCell.

An example embodiment of the techniques of this disclosure is a method for managing mobility in a UE operating in DC with an MN via a primary cell and an SN via a primary secondary cell, the MN and the SN operating in a RAN. The method is implemented by processing hardware and includes receiving a conditional configuration related to a candidate primary secondary cell from the RAN. The conditional configuration is associated with a condition to be satisfied before the UE applies the conditional configuration during a conditional procedure. The method further includes detecting a failure to communicate via the primary secondary cell or the candidate primary secondary cell. Still further, the method includes determining, based at least in part on the failure, a configuration according to which the UE is to resume the DC.

Another example embodiment of these techniques is a UE including processing hardware and configured to execute the method above.

Yet another example embodiment of these techniques is a method in a RAN for configuring a UE. The method is implemented by processing hardware and includes communicating with a UE via a primary cell of an MN and a primary secondary cell of an SN to provide DC to the UE. The method further includes transmitting, by processing hardware and to the UE, a conditional configuration related to a candidate secondary cell, the conditional configuration associated with a condition to be satisfied before the UE applies the conditional configuration during a conditional procedure. The method also includes, in response to determining a failure of the UE to communicate with the secondary cell or the candidate secondary cell, suspending a communication with the UE via the SN. Further, the method includes resuming the communication with the UE via the SN.

DETAILED DESCRIPTION OF THE DRAWINGS

As discussed in detail below, a UE and/or one or more base stations manage conditional configuration for a procedure such as conditional PSCell addition or change (CPAC) (also referred to as a conditional PSCell change (CPC)), for example, when the UE operating in DC detects SCG failure. Prior to discussing the techniques the UE or a base station can implement to manage conditional configuration in these scenarios, example communication systems in which these techniques are considered with reference to FIGS. 1A-C.

Figure 1A:
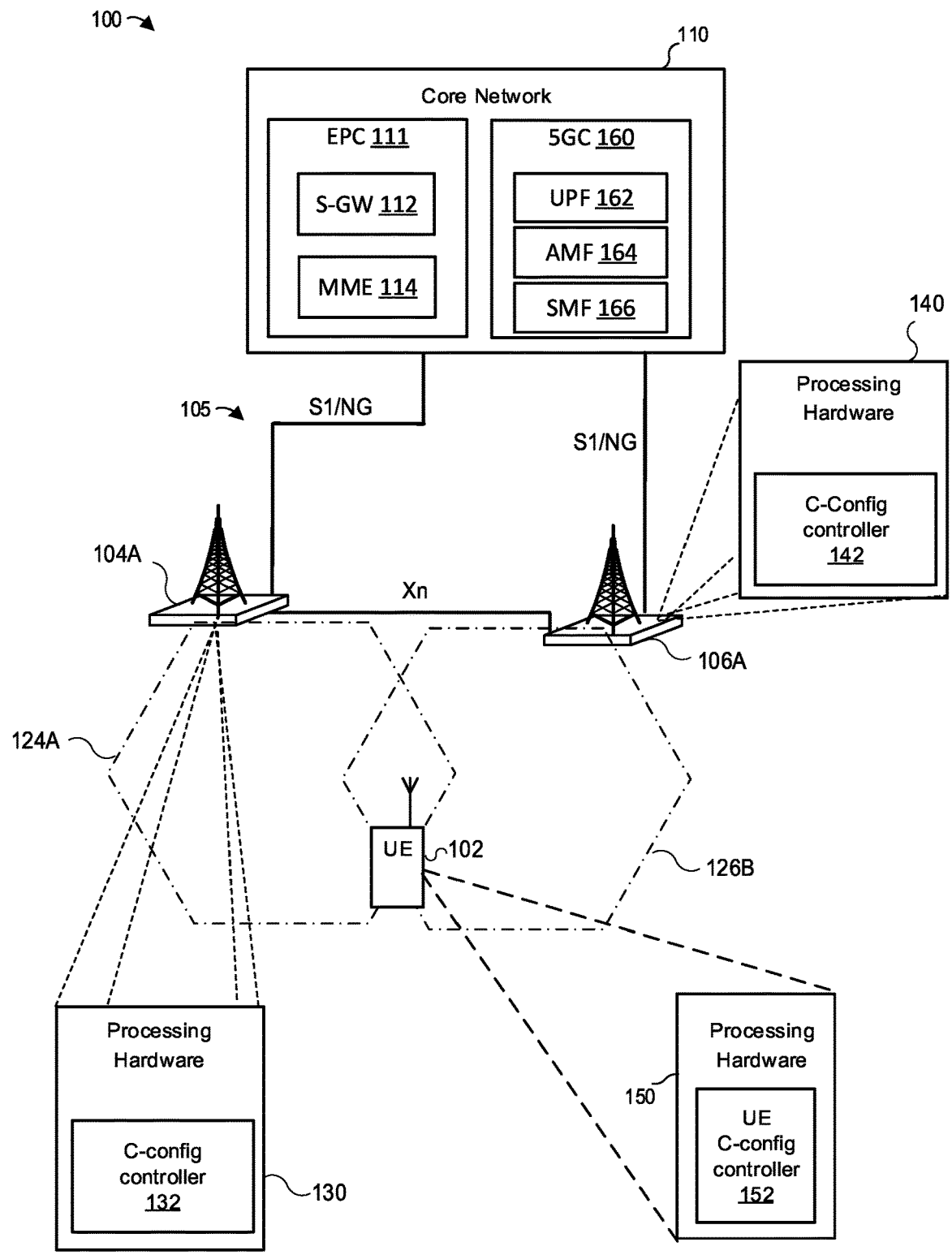
FIG. 1A is a block diagram of an example system in which a radio access network (RAN) and a user device can implement the techniques of this disclosure for managing conditional procedures related to a master node (MN) or a secondary node (SN)

Referring first to FIG. 1A, an example wireless communication system 100 includes a UE 102, a base station (BS) 104A, a base station 106A, and a core network (CN) 110. The base stations 104A and 106A can operate in a RAN 105 connected to the same core network (CN) 110. The CN 110 can be implemented as an evolved packet core (EPC) 111 or a fifth generation (5G) core (5GC) 160, for example.

Among other components, the EPC 111 can include a Serving Gateway (S-GW) 112 and a Mobility Management Entity (MME) 114. The S-GW 112 in general is configured to transfer user-plane packets related to audio calls, video calls, Internet traffic, etc., and the MME 114 is configured to manage authentication, registration, paging, and other related functions. The 5GC 160 includes a User Plane Function (UPF) 162 and an Access and Mobility Management (AMF) 164, and/or Session Management Function (SMF) 166. Generally speaking, the UPF 162 is configured to transfer user-plane packets related to audio calls, video calls, Internet traffic, etc., the AMF 164 is configured to manage authentication, registration, paging, and other related functions, and the SMF 166 is configured to manage PDU sessions.

As illustrated in FIG. 1A, the base station 104A supports a cell 124A, and the base station 106A supports a cell 126A.

The cells 124A and 126A can partially overlap, so that the UE 102 can communicate in DC with the base station 104A and the base station 106A operating as a master node (MN) and a secondary node (SN), respectively. To directly exchange messages during DC scenarios and other scenarios discussed below, the MN 104A and the SN 106A can support an X2 or Xn interface. In general, the CN 110 can connect to any suitable number of base stations supporting NR cells and/or EUTRA cells. An example configuration in which the EPC 110 is connected to additional base stations is discussed below with reference to FIG. 1B.

The base station 104A is equipped with processing hardware 130 that can include one or more general-purpose processors such as CPUs and non-transitory computer-readable memory storing machine-readable instructions executable on the one or more general-purpose processors, and/or special-purpose processing units. The processing hardware 130 in an example implementation includes a conditional configuration controller 132 configured to manage conditional configuration for one or more conditional procedures such as CHO, CPAC, or CSAC, when the base station 104A operates as an MN.

The base station 106A is equipped with processing hardware 140 that can also include one or more general-purpose processors such as CPUs and non-transitory computer-readable memory storing machine-readable instructions executable on the one or more general-purpose processors, and/or special-purpose processing units. The processing hardware 140 in an example implementation includes a conditional configuration controller 142 configured to manage conditional configurations for one or more conditional procedures such as CHO, CPAC, or CSAC, when the base station 106A operates as an SN.

Still referring to FIG. 1A, the UE 102 is equipped with processing hardware 150 that can include one or more general-purpose processors such as CPUs and non-transitory computer-readable memory storing machine-readable instructions executable on the one or more general-purpose processors, and/or special-purpose processing units. The processing hardware 150 in an example implementation includes a UE conditional configuration controller 152 configured to manage conditional configuration for one or conditional procedures.

More particularly, the conditional configuration controllers 132, 142, and 152 can implement at least some of the techniques discussed with reference to the messaging and flow diagrams below to receive conditional configuration, release the conditional configuration in response to certain events, apply the conditional configuration, etc. Although FIG. 1A illustrates the conditional configuration controllers 132 and 142 as separate components, in at least some of the scenarios the base stations 104A and 106A can have similar implementations and in different scenarios operate as MN or SN nodes. In these implementations, each of the base stations 104A and 106A can implement both the conditional configuration controller 132 and the conditional configuration controller 142 to support MN and SN functionality, respectively.

In operation, the UE 102 can use a radio bearer (e.g., a DRB or an SRB) that at different times terminates at the MN 104A or the SN 106A. The UE 102 can apply one or more security keys when communicating on the radio bearer, in the uplink (from the UE 102 to a BS) and/or downlink (from a base station to the UE 102) direction. The UE in some cases can use different RATs to communicate with the base stations 104A and 106A. Although the examples below may refer specifically to specific RAT types, 5G NR or EUTRA, in general the techniques of this disclosure also can apply to other suitable radio access and/or core network technologies.

Figure 1B:
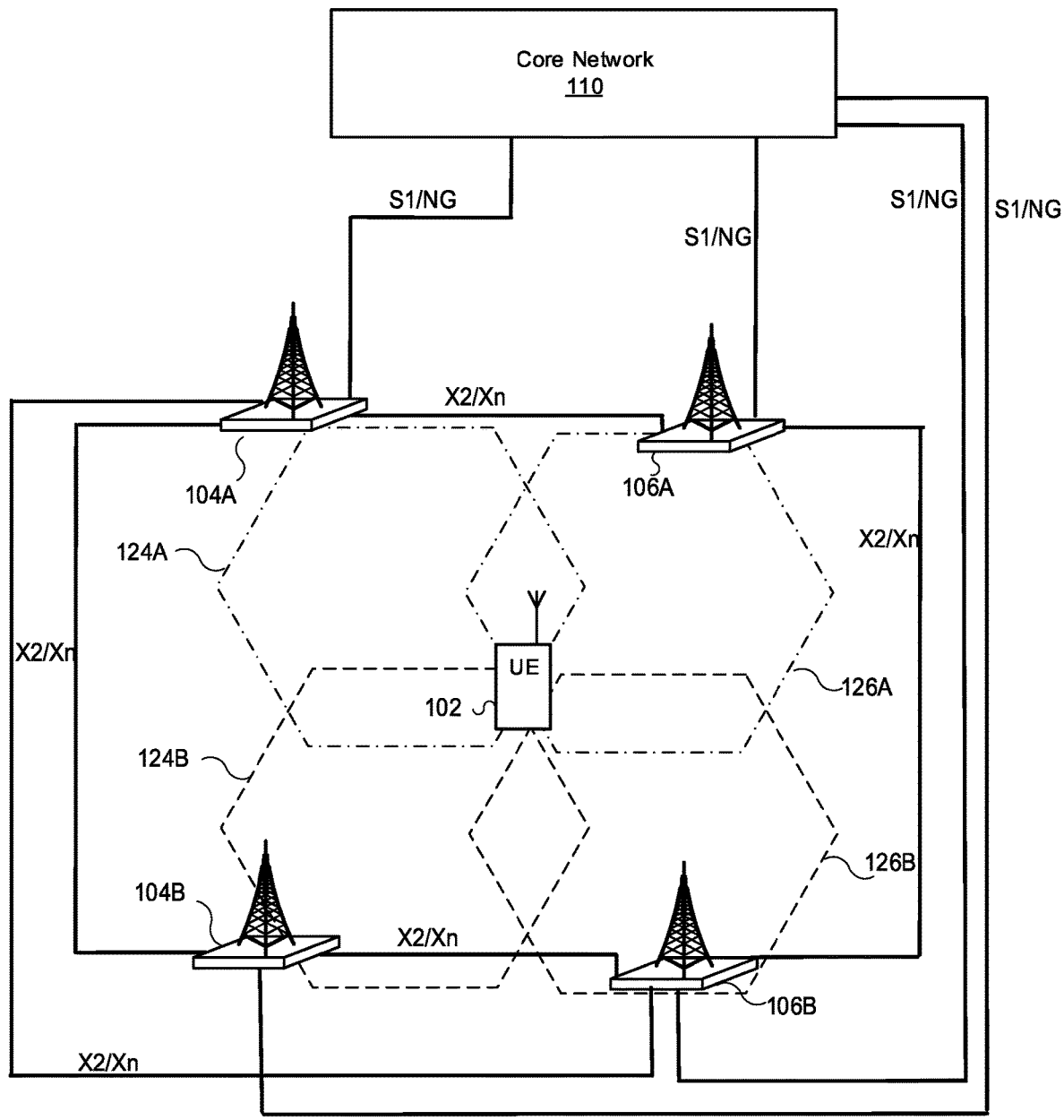
FIG. 1B is another block diagram of an example system in which a radio access network (RAN) and a user device can implement the techniques of this disclosure for managing conditional procedures related to an MN or an SN.

FIG. 1B depicts an example wireless communication system 100 in which communication devices can implement these techniques. The wireless communication system 100 includes a UE 102, a base station 104A, a base station 104B, a base station 106A, a base station 106B and a core network (CN) 110. The UE 102 initially connects to the base station 104A. The BSs 104B and 106B may have similar processing hardware as the base station 106A. The UE 102 initially connects to the base station 104A.

In some scenarios, the base station 104A can perform immediate SN addition to configure the UE 102 to operate in dual connectivity (DC) with the base station 104A (via a PCell) and the base station 106A (via a PSCell other than cell 126A). The base stations 104A and 106A operate as an MN and an SN for the UE 102, respectively. The UE 102 in some cases can operate using the MR-DC connectivity mode, e.g., communicate with the base station 104A using 5G NR and communicate with the base station 106A using EUTRA, or communicate with the base station 104A using EUTRA and communicate with the base station 106A using 5G NR.

At some point, the MN 104A can perform an immediate SN change to change the SN of the UE 102 from the base station 106A (source SN, or "S-SN") to the base station 104B (target SN, or "T-SN") while the UE 102 is communicating in DC with the MN 104A and the S-SN 106A. In another scenario, the SN 106A can perform an immediate PSCell change to change the PSCell of the UE 102 to the cell 126A. In one implementation, the SN 106A can transmit a configuration changing the PSCell to cell 126A to the UE 102 via a signaling radio bearer (SRB) (e.g., SRB3) for the immediate PSCell change. In another implementation, the SN 106A can transmit a configuration changing the PSCell to the cell 126A to the UE 102 via the MN 104A for the immediate PSCell change. The MN 104A may transmit the configuration immediately changing the PSCell to the cell 126A to the UE 102 via SRB1.

In other scenarios, the base station 104A can perform a conditional SN Addition procedure to first configure the base station 106B as a C-SN for the UE 102, i.e. conditional SN addition or change (CSAC). At this time, the UE 102 can be in single connectivity (SC) with the base station 104A or in DC with the base station 104A and the base station 106A. If the UE 102 is in DC with the base station 104A and the base station 106A, the MN 104A may determine to perform the conditional SN Addition procedure in response to a request received from the base station 106A or in response to one or more measurement results received from the UE 102 or obtained by the MN 104A from measurements on signals received from the UE 102. In contrast to the immediate SN Addition case discussed above, the UE 102 does not immediately attempt to connect to the C-SN 106B. In this scenario, the base station 104A again operates as an MN, but the base station 106B initially operates as a C-SN rather than an SN.

More particularly, when the UE 102 receives a configuration for the C-SN 106B, the UE 102 does not connect to the C-SN 106B until the UE 102 has determined that a certain condition is satisfied (the UE 102 in some cases can consider multiple conditions, but for convenience only the discussion below refers to a single condition). When the UE 102 determines that the condition has been satisfied, the UE 102 connects to the C-SN 106B, so that the C-SN 106B begins to operate as the SN 106B for the UE 102. Thus, while the base station 106B operates as a C-SN rather than an SN, the base station 106B is not yet connected to the UE 102, and accordingly is not yet servicing the UE 102. In some implementations, the UE 102 may disconnect from the SN 106A to connect to the C-SN 106B.

In yet other scenarios, the UE 102 is in DC with the MN 104A (via a PCell) and SN 106A (via a PSCell other than cell 126A and not shown in FIG. 1A). The SN 106A can perform conditional PSCell addition or change (CPAC) to configure a candidate PSCell (C-PSCell) 126A for the UE 102. If the UE 102 is configured a signaling radio bearer (SRB) (e.g., SRB3) to exchange RRC messages with the SN 106A, the SN 106A may transmit a configuration for the C-PSCell 126A to the UE 102 via the SRB, e.g., in response to one or more measurement results which may be received from the UE 102 via the SRB or via the MN 104A or may be obtained by the SN 106A from measurements on signals received from the UE 102. In case of via the MN 104A, the MN 104A receives the configuration for the C-PSCell 126A. In contrast to the immediate PSCell change case discussed above, the UE 102 does not immediately disconnect from the PSCell and attempt to connect to the C-PSCell 126A.

More particularly, when the UE 102 receives a configuration for the C-PSCell 126A, the UE 102 does not connect to the C-PSCell 126A until the UE 102 has determined that a certain condition is satisfied (the UE 102 in some cases can consider multiple conditions, but for convenience only the discussion below refers to a single condition). When the UE 102 determines that the condition has been satisfied, the UE 102 connects to the C-PSCell 126A, so that the C-PSCell 126A begins to operate as the PSCell 126A for the UE 102. Thus, while the cell 126A operates as a C-PSCell rather than a PSCell, the SN 106A may not yet connect to the UE 102 via the cell 126A. In some implementations, the UE 102 may disconnect from the PSCell to connect to the C-PSCell 126A.

In some scenarios, the condition associated with CSAC or CPAC can be signal strength/quality, which the UE 102 detects on the C-PSCell 126A of the SN 106A or on a C-PSCell 126B of C-SN 106B, exceeding a certain threshold or otherwise corresponding to an acceptable measurement. For example, when the one or more measurement results the UE 102 obtains on the C-PSCell 126A are above a threshold configured by the MN 104A or the SN 106A or above a pre-determined or pre-configured threshold, the UE 102 determines that the condition is satisfied. When the UE 102 determines that the signal strength/quality on the C-PSCell 126A of the SN 106A is sufficiently good (again, measured relative to one or more quantitative thresholds or other quantitative metrics), the UE 102 can perform a random access procedure on the C-PSCell 126A with the SN 106A to connect to the SN 106A. After the UE 102 successfully completes the random access procedure on the C-PSCell 126A, the C-PSCell 126A becomes a PSCell 126A for the UE 102. The SN 106A then can start communicating data (user-plane data or control-plane data) with the UE 102 through the PSCell 126A. In another example, when the one or more measurement results the UE 102 obtains on the C-PSCell 126B are above a threshold configured by the MN 104A or the C-SN 106B or above a pre-determined or pre-configured threshold, the UE 102 determines that the condition is satisfied. When the UE 102 determines that the signal strength/quality on the C-PSCell 126B of the C-SN 106B is sufficiently good (again, measured relative to one or more quantitative thresholds or other quantitative metrics), the UE 102 can perform a random access procedure on the C-PSCell 126B with the C-SN 106B to connect to the C-SN 106B. After the UE 102 successfully completes the random access procedure on the C-PSCell 126B, the C-PSCell 126B becomes a PSCell 126B for the UE 102 and the C-SN 106B becomes an SN 106B. The SN 106B then can start communicating data (user-plane data or control-plane data) with the UE 102 through the PSCell 126B.

In various configurations of the wireless communication system 100, the base station 104A can be implemented as a master eNB (MeNB) or a master gNB (MgNB), and the base station 106A or 106B can be implemented as a secondary gNB (SgNB) or a candidate SgNB (C-SgNB). The UE 102 can communicate with the base station 104A and the base station 106A or 106B (106A/B) via the same RAT such as EUTRA or NR, or different RATs. When the base station 104A is an MeNB and the base station 106A is an SgNB, the UE 102 can be in EUTRA-NR DC (EN-DC) with the MeNB and the SgNB. In this scenario, the MeNB 104A may or may not configure the base station 106B as a C-SgNB to the UE 102. In this scenario, the SgNB 106A may configure cell 126A as a C-PSCell to the UE 102. When the base station 104A is an MeNB and the base station 106A is a C-SgNB for the UE 102, the UE 102 can be in SC with the MeNB. In this scenario, the MeNB 104A may or may not configure the base station 106B as another C-SgNB to the UE 102.

In some cases, an MeNB, an SeNB or a C-SgNB is implemented as an ng-eNB rather than an eNB. When the base station 104A is a Master ng-eNB (Mng-eNB) and the base station 106A is a SgNB, the UE 102 can be in next generation (NG) EUTRA-NR DC (NGEN-DC) with the Mng-eNB and the SgNB. In this scenario, the MeNB 104A may or may not configure the base station 106B as a C-SgNB to the UE 102. In this scenario, the SgNB 106A may configure cell 126A as a C-PSCell to the UE 102. When the base station 104A is an Mng-NB and the base station 106A is a C-SgNB for the UE 102, the UE 102 can be in SC with the Mng-NB. In this scenario, the Mng-eNB 104A may or may not configure the base station 106B as another C-SgNB to the UE 102.

When the base station 104A is an MgNB and the base station 106A/B is an SgNB, the UE 102 may be in NR-NR DC (NR-DC) with the MgNB and the SgNB. In this scenario, the MeNB 104A may or may not configure the base station 106B as a C-SgNB to the UE 102. In this scenario, the SgNB 106A may configure cell 126A as a C-PSCell to the UE 102. When the base station 104A is an MgNB and the base station 106A is a C-SgNB for the UE 102, the UE 102 may be in SC with the MgNB. In this scenario, the MgNB 104A may or may not configure the base station 106B as another C-SgNB to the UE 102.

When the base station 104A is an MgNB and the base station 106A/B is a Secondary ng-eNB (Sng-eNB), the UE 102 may be in NR-EUTRA DC (NE-DC) with the MgNB and the Sng-eNB. In this scenario, the MgNB 104A may or may not configure the base station 106B as a C-Sng-eNB to the UE 102. In this scenario, the Sng-eNB 106A may configure cell 126A as a C-PSCell to the UE 102. When the base station 104A is an MgNB and the base station 106A is a candidate Sng-eNB (C-Sng-eNB) for the UE 102, the UE 102 may be in SC with the MgNB. In this scenario, the MgNB 104A may or may not configure the base station 106B as another C-Sng-eNB to the UE 102.

The base stations 104A, 106A, and 106B can connect to the same core network (CN) 110 which can be an evolved packet core (EPC) 111 or a fifth-generation core (5GC) 160. The base station 104A can be implemented as an eNB supporting an S1 interface for communicating with the EPC 111, an ng-eNB supporting an NG interface for communicating with the 5GC 160, or as a base station that supports the NR radio interface as well as an NG interface for communicating with the 5GC 160. The base station 106A can be implemented as an EN-DC gNB (en-gNB) with an S1 interface to the EPC 111, an en-gNB that does not connect to the EPC 111, a gNB that supports the NR radio interface as well as an NG interface to the 5GC 160, or a ng-eNB that supports an EUTRA radio interface as well as an NG interface to the 5GC 160. To directly exchange messages during the scenarios discussed below, the base stations 104A, 106A, and 106B can support an X2 or Xn interface.

As illustrated in FIG. 1B, the base station 104A supports a cell 124A, the base station 104B supports a cell 124B, the base station 106A supports a cell 126A, and the base station 106B supports a cell 126B. The cells 124A and 126A can partially overlap, as can the cells 124A and 124B, so that the UE 102 can communicate in DC with the base station 104A (operating as an MN) and the base station 106A (operating as an SN) and, upon completing an SN change, with the base station 104A (operating as MN) and the SN 104B. More particularly, when the UE 102 operates in DC with the base station 104A and the base station 106A, the base station 104A operates as an MeNB, a Mng-eNB or a MgNB, and the base station 106A operates as an SgNB or a Sng-eNB. The cells 124A and 126B can partially overlap. When the UE 102 is in SC with the base station 104A, the base station 104A operates as an MeNB, a Mng-eNB or a MgNB, and the base station 106B operates as a C-SgNB or a C-Sng-eNB. When the UE 102 operates in DC with the base station 104A and the base station 106A, the base station 104A operates as an MeNB, a Mng-eNB or a MgNB, the base station 106A operates as an SgNB or a Sng-eNB, and the base station 106B operates as a C-SgNB or a C-Sng-eNB.

In general, the wireless communication network 100 can include any suitable number of base stations supporting NR cells and/or EUTRA cells. More particularly, the EPC 111 or the 5GC 160 can be connected to any suitable number of base stations supporting NR cells and/or EUTRA cells. Although the examples below refer specifically to specific CN types (EPC, 5GC) and RAT types (5G NR and EUTRA), in general the techniques of this disclosure also can apply to other suitable radio access and/or core network technologies such as sixth generation (6G) radio access and/or 6G core network or 5G NR-6G DC.

Figure 1C:
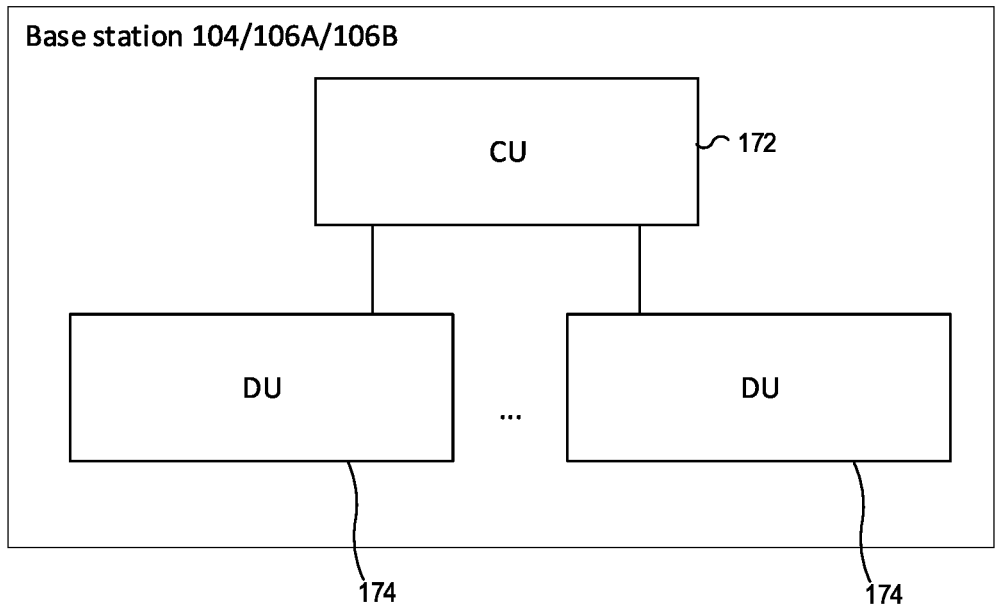
FIG. 1C is a block diagram of an example base station in which a centralized unit (CU) and a distributed unit (DU) that can operate in the system of FIG. 1A or FIG. 1B.

FIG. 1C depicts an example distributed implementation of a base station such as the base station 104A, 104B, 106A, or 106B. The base station in this implementation can include a centralized unit (CU) 172 and one or more distributed units (DUs) 174. The CU 172 is equipped with processing hardware that can include one or more general-purpose processors such as CPUs and non-transitory computer-readable memory storing machine-readable instructions executable on the one or more general-purpose processors, and/or special-purpose processing units. In one example, the CU 172 is equipped with the processing hardware 130. In another example, the CU 172 is equipped with the processing hardware 140. The processing hardware 140 in an example implementation includes an (C-)SN RRC controller 142 configured to manage or control one or more RRC configurations and/or RRC procedures when the base station 106A operates as an SN or a candidate SN (C-SN). The base station 106B can have hardware same as or similar to the base station 106A. The DU 174 is also equipped with processing hardware that can include one or more general-purpose processors such as CPUs and non-transitory computer-readable memory storing machine-readable instructions executable on the one or more general-purpose processors, and/or special-purpose processing units. In some examples, the processing hardware in an example implementation includes a medium access control (MAC) controller configured to manage or control one or more MAC operations or procedures (e.g., a random access procedure) and a radio link control (RLC) controller configured to manage or control one or more RLC operations or procedures when the base station 106A operates as an MN, an SN or a candidate SN (C-SN). The process hardware may include further a physical layer controller configured to manage or control one or more physical layer operations or procedures.

Figure 2:
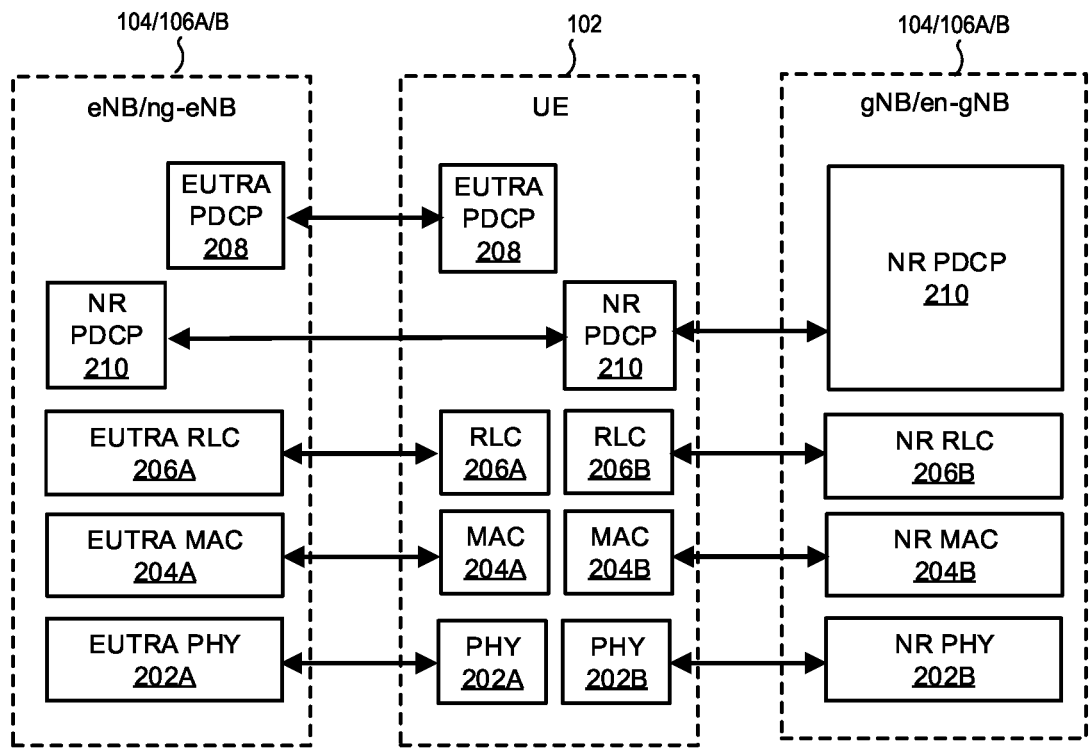
FIG. 2 is a block diagram of an example protocol stack according to which the UE of FIG. 1A communicates with base stations.

FIG. 2 illustrates, in a simplified manner, an example radio protocol stack 200 according to which the UE 102 may communicate with an eNB/ng-eNB or a gNB (e.g., one or more of the base stations 104A, 104B, 106A, 106B). In the example stack 200, a physical layer (PHY) 202A of EUTRA provides transport channels to the EUTRA MAC sublayer 204A, which in turn provides logical channels to the EUTRA RLC sublayer 206A. The EUTRA RLC sublayer 206A in turn provides RLC channels to the EUTRA PDCP sublayer 208 and, in some cases, to the NR PDCP sublayer 210. Similarly, the NR PHY 202B provides transport channels to the NR MAC sublayer 204B, which in turn provides logical channels to the NR RLC sublayer 206B. The NR RLC sublayer 206B in turn provides RLC channels to the NR PDCP sublayer 210. The UE 102, in some implementations, supports both the EUTRA and the NR stack as shown in FIG. 2, to support handover between EUTRA and NR base stations and/or to support DC over EUTRA and NR interfaces. Further, as illustrated in FIG. 2, the UE 102 can support layering of NR PDCP sublayer 210 over the EUTRA RLC sublayer 206A.

The EUTRA PDCP sublayer 208 and the NR PDCP sublayer 210 receive packets (e.g., from an Internet Protocol (IP) layer, layered directly or indirectly over the PDCP layer 208 or 210) that can be referred to as service data units (SDUs), and output packets (e.g., to the RLC layer 206A or 206B) that can be referred to as protocol data units (PDUs). Except where the difference between SDUs and PDUs is relevant, this disclosure for simplicity refers to both SDUs and PDUs as "packets."

On a control plane, the EUTRA PDCP sublayer 208 and the NR PDCP sublayer 210 can provide SRBs to exchange RRC messages, for example. On a user plane, the EUTRA PDCP sublayer 208 and the NR PDCP sublayer 210 can provide DRBs to support data exchange.

In scenarios where the UE 102 operates in EUTRA/NR DC (EN-DC), with the base station 104A operating as an MeNB and the base station 106A operating as an SgNB, the wireless communication system 100 can provide the UE 102 with an MN-terminated bearer that uses the EUTRA PDCP sublayer 208, or an MN-terminated bearer that uses the NR PDCP sublayer 210. The wireless communication system 100 in various scenarios can also provide the UE 102 with an SN-terminated bearer, which uses only the NR PDCP sublayer 210. The MN-terminated bearer can be an MCG bearer, an SCG bearer, or a split bearer. The SN-terminated bearer can be an MCG bearer, an SCG bearer, or a split bearer. The MN-terminated bearer can be an SRB (e.g., SRB1 or SRB2) or a DRB. The SN-terminated bearer can an SRB or a DRB.

Next, several example scenarios in which a UE and/or a base station manage conditional configuration for a conditional procedure are discussed with reference to FIGS. 3A-6B.

Figure 3A:
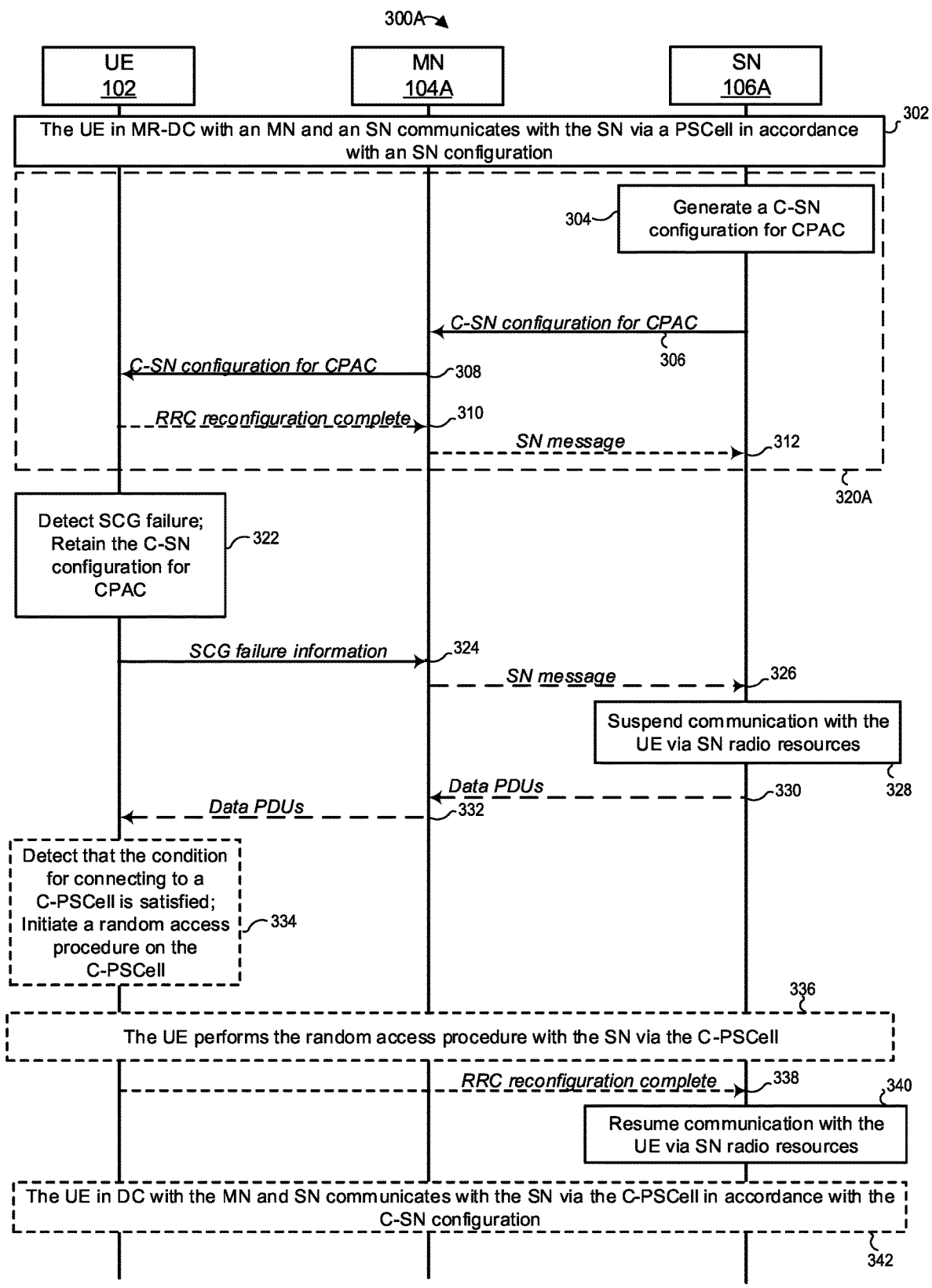
FIG. 3A is a messaging diagram of an example scenario in which a UE operating in MR-DC retains a previously received conditional configuration for conditional PSCell addition or change (CPAC) in response to SCG failure, in accordance with the techniques of this disclosure.

Referring first to FIG. 3A, the base station 104A in a scenario 300A operates as an MN, and the base station 106A operates as an SN. Initially, the UE 102 is in MR-DC with the MN 104A and the SN 106A. The UE 102 communicates 302 UL PDUs and/or DL PDUs with the SN 106A via a PSCell in accordance with a certain SN configuration. The SN 106A then determines 304 that it should generate a C-SN configuration for conditional PSCell addition or change (CPAC). The SN 106A can make this determination based on one or more measurement results received from the UE 102 via the MN 104A, from the UE directly (e.g., via a signaling radio bearer (SRB) established between the UE 102 and the SN 106A or via a physical control channel), or obtained by the SN 106A from measurements on signals, control channels or data channels received from the UE 102, for example. More intelligently, the SN 106A can derive or estimate that the UE 102 is moving toward coverage of the cell 126A according to uplink signals received from the UE 102 or positioning measurement result(s) received from the UE 102. In response to this determination, the SN 106A generates 304 a C-SN configuration.

In the example scenario 300A, the SN 106A then transmits 306 the C-SN configuration to the MN 104A. The MN 104A in turn transmits 308 the C-SN configuration to the UE 102. In some implementations, the SN 106A at event 304 generates a conditional configuration including the C-SN configuration and generates an RRC reconfiguration message including the conditional configuration. The SN 106A then transmits 306 the RRC reconfiguration message to the MN 104A. The MN 104A in turn transmits 308 the RRC reconfiguration message including the conditional configuration to the UE 102. In other implementations, the MN 104A generates a conditional configuration including the C-SN configuration and generates an RRC reconfiguration message including the conditional configuration. The MN 104A transmits 308 the RRC reconfiguration message including the conditional configuration to the UE 102.

In some implementations, the UE 102 transmits 310 an RRC reconfiguration complete message to the MN 104A in response to the RRC reconfiguration message described above. The MN 104A may transmit 312 an SN message (e.g., SN Reconfiguration Complete message) to the SN 106A in response to the RRC reconfiguration complete message. The events 304-312 collectively can define a CPAC configuration procedure 320A.

To transmit the RRC reconfiguration message, the MN 104A in one implementation transmits an RRC container message including the RRC reconfiguration to the UE 102. In response, the UE 102 in one implementation transmits an RRC container response message including the RRC reconfiguration complete message to the MN 104A to transmit 310 the RRC reconfiguration complete message. The MN 104A may send 312 the SN message to the SN 106A in response to the RRC container response message. In turn, the MN 104A may include the RRC reconfiguration complete message in the SN message that the MN 104A transmits 312. In another implementation, the UE 102 does not generate an RRC container response message to wrap the RRC reconfiguration complete message the UE transmits 310.

When the SN 106A is implemented as an ng-eNB, the RRC reconfiguration message generated by the SN 106A is an RRCConnectionReconfiguration message, and the RRC reconfiguration complete message the MN 104A receives 310 is RRCConnectionReconfigurationComplete. When the SN 106A is implemented as a gNB, the RRC reconfiguration message generated by the SN 106A is an RRCReconfiguration message, and the RRC reconfiguration complete message the MN 104A receives 310 is an RRCReconfigurationComplete message. When the MN 104A is implemented as an eNB or ng-eNB, the RRC container message is an RRCConnectionReconfiguration message, and the RRC container response message is RRCConnectionReconfigurationComplete. When the MN 104A is implemented as a gNB, the RRC container message is an RRCReconfiguration message, and the RRC container response message is an RRCReconfigurationComplete message.

When the MN 104A is implemented as an eNB or ng-eNB, the RRC reconfiguration message generated by the MN 104A is an RRCConnectionReconfiguration message, and the RRC reconfiguration complete message is RRCConnectionReconfigurationComplete. When the MN 104A is implemented as a gNB, the RRC reconfiguration message generated by the MN 104A is an RRCReconfiguration message, and the RRC reconfiguration complete message is an RRCReconfigurationComplete message.

At a later time, the UE 102 detects 322 SCG failure and retains 322 the C-SN configuration for CPAC in response to the SCG failure. The UE 102 transmits 324 an SCG failure information message to the MN 104A to inform the MN 104A of the SCG failure. In response to receiving 324 the SCG failure information message, the MN 104A may send an SN message to the SN 106A to cause the SN 106A to suspend communication with the UE 102 via SN radio resources (i.e., SCG radio resources on the PSCell and SCell(s), if configured, of the SN 106A). The SN 106A may suspend 328 communication with the UE via SN radio resources in response to receiving 326 the SN message or, more generally, in response to a determination that the UE 102 disconnects from the SN 106A. Thus, the SN 106A does not expend its radio resources attempting to transmit data to the UE 102 which has detected the SCG failure. After the SN 106A suspends communication with the UE 102 via the SN radio resources, the SN 106A may send 330 data PDUs (e.g., PDCP PDUs) including data packets to the MN 104A, e.g., if the SN 106A receives the data packets from the CN 110 (e.g., S-GW 112 or UPF 162) or an edge server. In turn, the MN 104A transmits 332 the data PDUs to the UE 102. Thus, the SN 106A sends 330 the data PDUs to the UE 102 via the MN 104A. The data PDUs can be associated to a SN-terminated bearer which can be a split bearer or an MCG bearer.

Generally speaking, an SCG failure can be related to SCG radio resources the UE 102 uses to communicate with the SN 106A. The SCG failure can be for example a radio link failure, SCG change failure (or SCG synchronous reconfiguration failure), SCG reconfiguration failure, or SRB3 integrity failure. The UE 102 can detect the SCG failure when the UE 102 detects a random access problem on the PSCell, when a timer T310 or T313 for monitoring a radio link on the PSCell expires, or when the maximum number of retransmissions on SCG radio resources with the SN 106A at the RLC layer has been reached. Further, the SCG change failure can correspond to an immediate SCG change failure (or immediate SCG synchronous reconfiguration failure) or conditional SCG change failure (or conditional SCG synchronous reconfiguration failure). The term "SCG change" can apply to PSCell change or SN change. The immediate SCG synchronous reconfiguration failure occurs when the UE 102 fails an RRC reconfiguration procedure involving reconfiguration with sync for immediate SCG change. The conditional SCG change can correspond to CPAC or CSAC. The conditional SCG synchronous reconfiguration failure occurs when the UE 102 fails an RRC reconfiguration procedure involving reconfiguration with sync for conditional SCG change. The UE 102 detects 322 the conditional SCG change failure (or the conditional SCG synchronous reconfiguration failure) if the UE 102 fails connecting to a C-PSCell (i.e., the UE 102 fails the CPAC or CSAC). The UE 102 may attempt to connect to a C-PSCell in response to detecting that the condition is satisfied or that the C-PSCell is suitable ("suitable" is described for FIG. 3C), but fail to connect to the C-PSCell. The SCG reconfiguration failure may include immediate SCG reconfiguration failure and conditional SCG reconfiguration failure. The UE 102 detects the immediate SCG reconfiguration failure if the UE 102 receives an RRC reconfiguration message on an SRB (e.g., SRB3) established between the UE 102 and the SN 106A, and determines that the RRC reconfiguration message contains an invalid configuration which is not in a conditional configuration (or a C-SN configuration). The UE 102 detects the conditional SCG reconfiguration failure if the UE 102 receives a C-SN configuration and identifies the C-SN configuration is invalid (e.g. the C-SN configuration contains an invalid configuration).

According to the above, the SCG failure can be divided into 8 failure types (or causes): (1) a random access problem, (2) a timer T310 or T313 expiring, (3) exceeding a maximum number of retransmissions at the RLC layer, (4) an immediate SCG change failure (or immediate SCG synchronous reconfiguration failure), (5) an conditional SCG change failure (or conditional SCG synchronous reconfiguration failure), (6) an immediate SCG reconfiguration failure, (7) a conditional SCG reconfiguration failure, or (8) an SRB3 integrity failure.

In other implementations, some of the types of SCG failure listed above can be merged into one failure type. For example, the immediate SCG reconfiguration failure and the conditional SCG reconfiguration failure can be combined into an SCG reconfiguration failure. In another example, the immediate SCG change failure and the conditional SCG change failure can be combined into an SCG reconfiguration failure.

In some implementations, the UE 102 retains the C-SN configuration if the SCG failure is a first failure type and releases the C-SN configuration if the SCG failure is a second failure type. For example, the second failure type can be a conditional SCG change failure or a conditional SCG reconfiguration failure, and the first failure type can be a different failure type.

In some implementations, the SN message at event 326 can be an SN Modification Request message and the SN 106A may send an SN Modification Request Acknowledge message to the MN 104A in response. In other implementations, the SN message can be an SN Release Request message and the SN 106A may send an SN Release Request Acknowledge message to the MN 104A in response. In some implementations, the SN 106A determines that the SN 106A has disconnected from the UE 102 if the SN 106A does not receive signals on an uplink channel from the UE 102. The signals may include PDUs or control signals such as hybrid automatic repeat request (HARQ) acknowledgement, HARQ negative acknowledgement, uplink control information (UCI) channel state information (CSI) or sounding reference signal (SRS). The uplink channel can be a physical uplink control channel (PUCCH), a physical uplink shared channel (PUSCH), or an uplink shared channel (UL-SCH).

Optionally, after detecting 322 the SCG failure and retaining 322 the C-SN configuration, the UE 102 can detect 334 that the condition for connecting to a C-PSCell 126A is satisfied and initiate a random access procure on the C-PSCell 126A in response to the detection. For convenience, this discussion may refer to the condition or a configuration in singular, but it will be understood that there may be multiple conditions, and that the conditional configuration can include one or multiple configuration parameters to specify the condition or the multiple conditions. The UE 102 then performs 336 the random access procedure with the SN 106A via the C-PSCell 126A, e.g., using one or more random access configurations in the C-SN configuration. The UE 102 may transmit 338 an RRC reconfiguration complete message via the C-PSCell 126A (e.g., on SRB3) during or after the random access configuration to connect to the C-PSCell 126A. Alternatively, the UE 102 can transmit 338 the RRC reconfiguration complete message to the SN 106A via the MN 104A. In this case, the UE 102 can transmit 338 an RRC container message (e.g., a ULInformationTransferMRDC message or a newly defined RRC message) including the RRC reconfiguration complete message to the MN 104A (e.g., on SRB1) and in turn, the MN 104A transmits the RRC reconfiguration message to the SN 106A in a SN message (e.g., RRC Transfer message, a SN Reconfiguration Complete message or a newly defined SN message). The newly defined RRC message can be specifically designed for the UE 102 to transmit the RRC reconfiguration complete message in response to connecting to the C-PSCell 126A. The MN 104A can forward the RRC reconfiguration complete message to the SN 106A if the MN 104A receives the newly defined RRC message. The newly defined SN message can be specifically designed for the MN 104A to send the RRC reconfiguration complete message to the SN 106A. The SN 106A can determine that the UE 102 connects to the C-PSCell 126A if the SN 106A receives the RRC reconfiguration message via the newly defined SN message. Yet alternatively, the UE 102 does not transmit 338 the RRC reconfiguration message to the SN 106A. If the SN 106A identifies the UE 102 in the random access procedure, the SN 106A resumes 340 communication with the UE 102 via SN radio resources. If the UE 102 successfully completes the random access procedure, the UE 102 communicates 342 with the SN 106A via the C-PSCell 126A in accordance with configurations in the C-SN configuration.

In some implementations, the random access procedure can be a four-step random access procedure or a two-step random access procedure. In other implementations, the random access procedure can be a contention-based random access procedure or a contention-free random access procedure. In some implementations, the UE 102 includes the RRC reconfiguration complete message in a message 3 of the four-step random access procedure or in a message A of the two-step random access procedure.

In some implementations, the SN 106A includes a trigger condition configuration that configures the condition that the UE 102 detects 334 in the conditional configuration generated by the SN 106A. The SN 106A may include a configuration ID identifying the conditional configuration or the C-SN configuration in the conditional configuration. In other implementations, the SN 106A can send the trigger condition configuration at event 306 and in turn, the MN 104A can include the trigger condition configuration in the conditional configuration generated by the MN 104A. To simplify the description below, a CPAC configuration is used to represent the C-SN configuration and the trigger condition configuration, conditional configuration or the RRC reconfiguration message generated by the SN 106A described above.

With continued reference to FIG. 3A, the C-SN configuration in some implementations can be a complete and self-contained configuration (i.e. a full configuration). The C-SN configuration may include a full configuration indication (an information element (IE) or a field) that identifies the C-SN configuration as a full configuration. The UE 102 in this case can use the C-SN configuration to communicate with the SN 106A without relying on an SN configuration. On the other hand, the C-SN configuration in other cases can include a "delta" configuration, or one or more configurations that augment a previously received SN configuration. In these cases, the UE 102 can use the delta C-SN configuration together with the SN configuration to communicate with the SN 106A.

The C-SN configuration can include multiple configuration parameters for the UE 102 to apply when communicating with the SN 106A via a C-PSCell 126A. The multiple configuration parameters may configure the C-PSCell 126A and zero, one, or more candidate secondary cells (C-SCells) of the SN 106A to the UE 102. The multiple configuration parameters may configure radio resources for the UE 102 to communicate with the SN 106A via the C-PSCell 126A and zero, one, or more C-SCells of the SN 106A. The multiple configuration parameters may configure zero, one, or more radio bearers. The one or more radio bearers can include an SRB and/or one or more DRBs.

The SN configuration can include multiple configuration parameters for the UE 102 to communicate with the SN 106A via the PSCell and zero, one, or more secondary cells (SCells) of the SN 106A. The multiple configuration parameters may configure radio resources for the UE 102 to communicate with the SN 106A via the PSCell and zero, one, or more SCells of the SN 106A. The multiple configuration parameters may configure zero, one, or more radio bearers. The one or more radio bearers can include an SRB and/or one or more DRBs.

In some implementations, the SN 106A can include the CPAC configuration in an SN Modification Acknowledge message responding to an SN Modification Request message received from the MN 104A and send the SN Modification Request Acknowledge message to the MN 104A during the event 306. In other implementations, the SN 106A can include the CPAC configuration in an SN Modification Required message and send the SN Modification Required message to the MN 104A during the event 306. The SN 106A may indicate that the SN Modification Request Acknowledge message or the SN Modification Required message is for CPAC, so that the MN 104A can determine that the SN Modification Request Acknowledge message or the SN Modification Required message includes a conditional configuration for CPAC. In other implementations, the SN 106A does not indicate CPAC in the SN Modification Request Acknowledge message or the SN Modification Required message. In these implementations, the CPAC configuration from the SN 106A is transparent to the MN 104A, so the MN 104A simply tunnels the CPAC configuration through to the UE 102, without processing the CPAC configuration.

In some implementations, the C-SN configuration can include a group configuration (CellGroupConfig) IE that configures the C-PSCell 126A and zero, one, or more C-SCells of the SN 106A. In one implementation, the C-SN configuration includes a radio bearer configuration. In another implementation, the C-SN configuration does not include a radio bearer configuration. For example, the radio bearer configuration can be a RadioBearerConfig IE, DRB-ToAddModList IE or SRB-ToAddModList IE, DRB-ToAd-dMod IE or SRB-ToAddMod IE. In various implementations, the C-SN configuration can be an RRCReconfiguration message, RRCReconfiguration-IEs, or the CellGroupConfig IE conforming to 3GPP TS 38.331. The full configuration indication may be a field or an IE conforming to 3GPP TS 38.331. In other implementations, the C-SN configuration can include an SCG-ConfigPartSCG-r12 IE that configures the C-PSCell 126A and zero, one, or more C-SCells of the SN 106A. In some implementations, the C-SN configuration is an RRCConnectionReconfiguration message, RRCConnectionReconfiguration-IEs, or the ConfigPartSCG-r12 IE conforming to 3GPP TS 36.331. The full configuration indication may be a field or an IE conforming to 3GPP TS 36.331.

In some implementations, the SN configuration can include a CellGroupConfig IE that configures the PSCell and may configure zero, one, or more SCells of the SN 106A. In one implementation, the SN configuration can be an RRCReconfiguration message, RRCReconfiguration-IEs or the CellGroupConfig IE conforming to 3GPP TS 38.331. In other implementations, the SN configuration can include an SCG-ConfigPartSCG-r12 IE that configures the PSCell and may configure zero, one, or more SCells of the SN 106A. In one implementation, the SN configuration can be an RRC-ConnectionReconfiguration message, RRCConnectionReconfiguration-IEs or the ConfigPartSCG-r12 IE conforming to 3GPP TS 36.331.

In some cases, the UE 102 may receive one or more conditions (discussed in this disclosure in singular for convenience) in the trigger condition configuration during the event 308. The UE 102 may use the one or more conditions to determine whether to connect to the C-PSCell 126A. If the UE 102 detects 334 that the condition is satisfied, the UE 102 connects to the C-PSCell 126A. That is, the condition (or "triggering condition") triggers the UE 102 to connect to the C-PSCell 126A or to execute the C-SN configuration. However, if the UE 102 does not detect that the condition is satisfied, the UE 102 does not connect to the C-PSCell 126A.

Still referring to FIG. 3A, the SN 106A in some cases can include the CU 172 and one or more DU 174 as illustrated in FIG. 1C. The UE communicates 302 with the SN via a first DU 174 operating the PSCell. A second DU 174 operating the C-PSCell 126A may generate the C-SN configuration or part of the C-SN configuration and send the C-SN configuration or part of the C-SN configuration to the CU 172. In cases where the second DU 174 generates a portion of the C-SN configuration, the CU 172 may generate the rest of the C-SN configuration. When the CU 172 suspends 328 communication with the UE via SN radio resources, the CU 172 may send a UE Context Modification Request message causing the first DU 174 to suspend lower layers and to suspend communication with the UE 102. The first DU 174 may also send a UE Context Modification Response message to the CU 172. The UE 102 performs 336 the random access procedure with the second DU 174 and the second DU 174 may identify the UE 102 in the random access procedure. The second DU 174 may receive 338 the RRC reconfiguration complete message from the UE 102 during or after the random access procedure. In turn, the second DU 174 may include the RRC reconfiguration complete in an F1 application protocol (F1AP) message (e.g., UL RRC Message Transfer message) and send the F1AP message to the CU 172. The CU 172 resumes communication with the UE via the second DU 174 in response to the F1AP message or the RRC reconfiguration complete message 338. The CU 172 may send a UE Context Release Command message to the first DU 174 to command the first DU 174 to release a UE context of the UE 102 in response to the F1AP message, the RRC reconfiguration complete message 338. Alternatively, the CU 172 resumes communication with the UE via the second DU 174 in response to the identification in the random access procedure. The second DU 174 may send the CU 172 another F1AP message including an indication of the identification if the second DU 174 identifies the UE 102 in the random access procedure. The CU 172 may send a UE Context Release Command message to the first DU 172 to command the first DU 172 to release a UE context of the UE 102 in response to the identification. In response to the UE Context Release Command message, first DU 172 releases the UE context of the UE 102 and sends a UE Context Release Complete message. The first and second DUs 174 can be the same DU operating the PSCell and the C-PSCell 126A or can be different DUs.

Figure 3B:
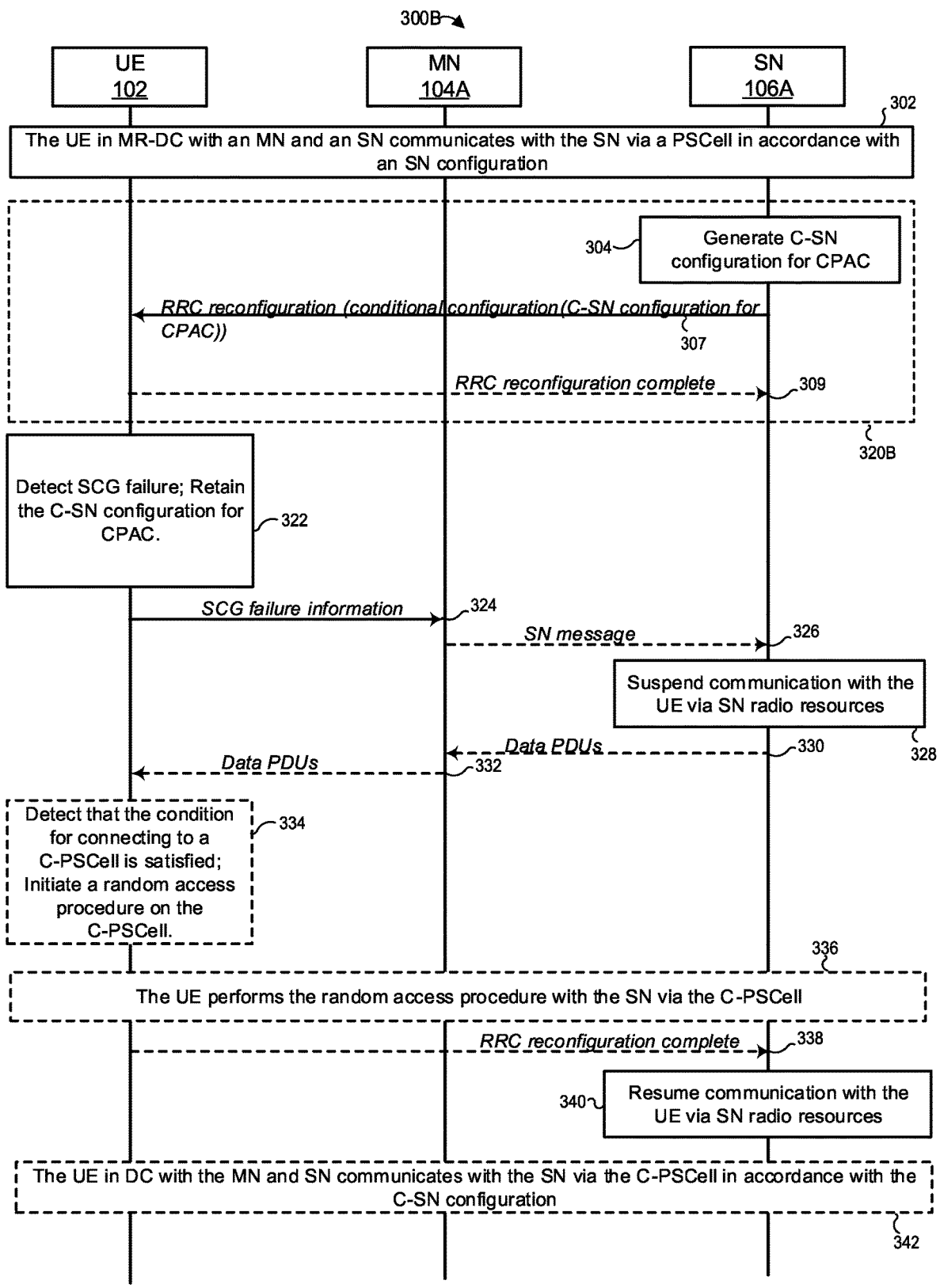
FIG. 3B is a messaging diagram of an example scenario similar to the scenario of FIG. 3A, but with the SN rather than the MN providing the conditional configuration.

Now referring to FIG. 3B, a scenario 300B involves a CPAC without SN change, i.e., a conditional change of a PSCell of an SN when the UE is already in DC with the MN and SN. In this scenario, the base station 104A operates as an MN and the base station 106A operates as an SN. Events in this scenario similar to those discussed above are labeled with the same reference numbers. The differences between the scenarios of FIG. 3A and FIG. 3B are discussed below.

The CPAC configuration procedure 320B is generally similar to the CPAC configuration procedure 320A of FIG. 3A. However, in the scenario 300B the SN 106A directly transmits 307 the RRC reconfiguration message including the conditional configuration to the UE 102, rather than transmitting the RRC reconfiguration message to the UE 102 via the MN 104A, as the SN 106A does in the scenario 300A of FIG. 3A. In some implementations, the SN 106A configures a first SRB to the UE 102 via the MN 104A and transmits the RRC reconfiguration message via the first SRB to the UE 102. For example, the SN 106A transmits an SRB configuration configuring the first SRB (e.g., SRB3) to the MN 104A, and the MN 104A transmits the SRB configuration to the UE via a second SRB (e.g., SRB1) between the MN 104A and the UE 102. In some implementations, the UE 102 can transmit 309 an RRC reconfiguration complete message via the first SRB to the SN 106A in response to the RRC reconfiguration message, rather than transmitting 310 the RRC reconfiguration complete message to the MN 104A as in the scenario 300A. In some implementations, the UE 102 can transmit 338 the RRC reconfiguration message via the first SRB to the SN 106A.

When the SN 106A is implemented as an ng-eNB, the RRC reconfiguration message the SN 106A transmits 307 is an RRCConnectionReconfiguration message, and the RRC reconfiguration complete message SN 106A receives 309 is an RRCConnectionReconfigurationComplete message. When the SN 106A is an gNB, the RRC reconfiguration message the SN 106A transmits 307 is an RRCReconfiguration message, and the RRC reconfiguration complete message the SN 106A receives 309 is an RRCReconfigurationComplete message.

Figure 3C:
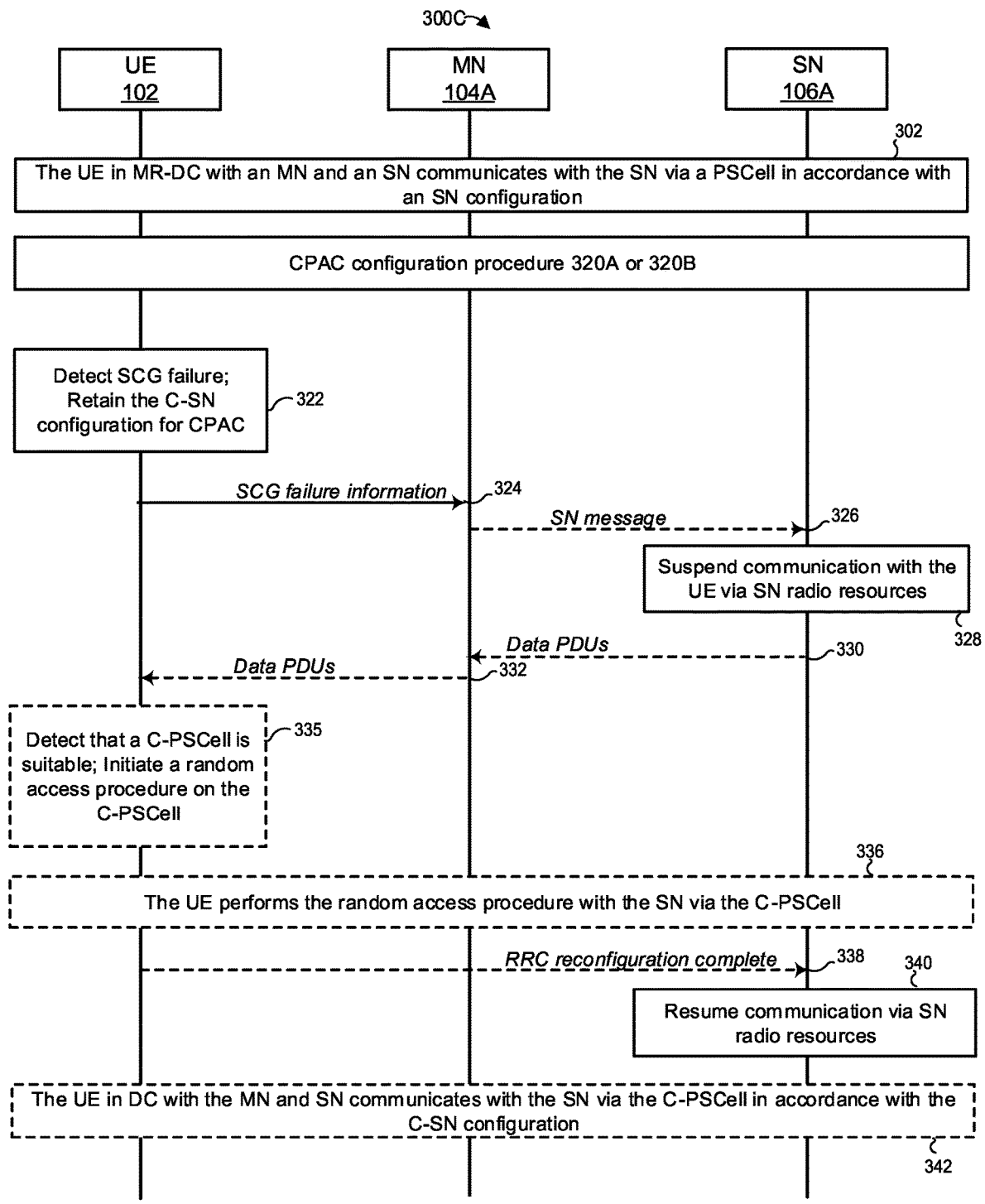
FIG. 3C is a messaging diagram of an example scenario in which a UE retains a previously received conditional configuration for CPAC in response to SCG failure and applies the configuration if candidate cell is suitable, regardless of whether the condition is satisfied.

Now referring to FIG. 3C, a scenario 300C involves a CPAC without SN change, i.e., a conditional change of a PSCell of an SN when the UE is already in DC with the MN and SN. In this scenario, the base station 104A operates as an MN and the base station 106A operates as an SN. Events in this scenario similar to those discussed above are labeled with the same reference numbers. The differences between the scenarios of FIG. 3A and FIG. 3C are discussed below.

The scenario 300C is generally similar to the scenarios 300A and 300B depicted in FIGS. 3A-B. However, in the scenario 300C, the UE 102 initiates 335 a random access procedure on the C-PSCell in response to detecting 335 that the C-PSCell is suitable, regardless of whether the UE 102 detects that the condition for connecting to the C-PSCell is satisfied. The "suitable" condition may be pre-configured in the UE 102 rather than received from the SN 106A at CPAC configuration procedure 320A or 320B. For example, the "suitable" condition may be pre-defined in a 3GPP specification, e.g., 36.304 or 38.304. In some implementations, if the UE 102 fails the random access procedure triggered by the UE 102 detecting that the C-PSCell is suitable, the UE 102 releases the C-SN configuration. In other implementations, if the UE 102 fails the random access procedure triggered by the UE 102 detecting that the C-PSCell is suitable, the UE 102 retains the C-SN configuration.

Figure 3D:
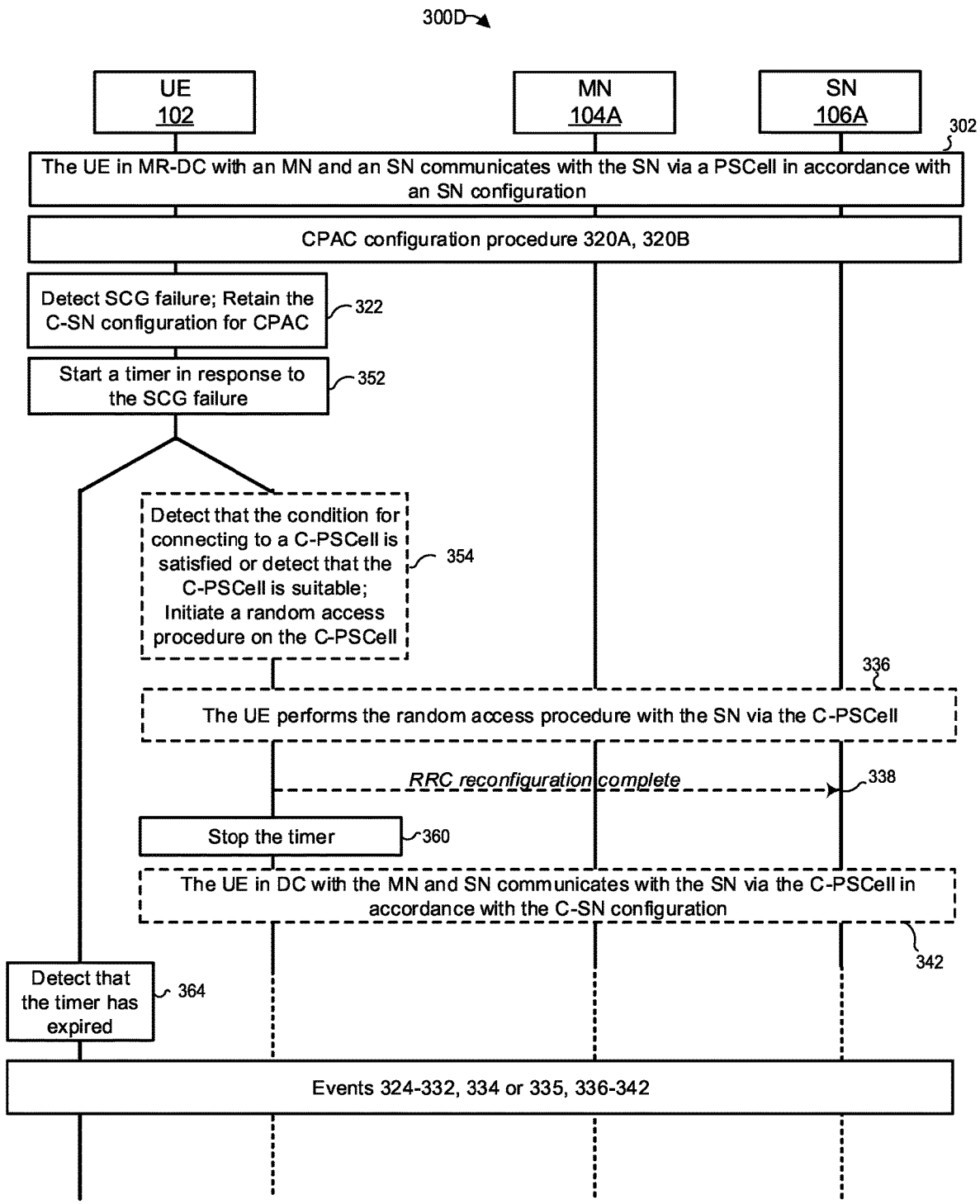
FIG. 3D is a messaging diagram of an example scenario similar to the scenarios of FIGS. 3A and 3B, but with the UE notifying the MN of the SCG failure only after failing to connect to the candidate cell within a predetermined period of time.

Now referring to FIG. 3D, a scenario 300D involves a CPAC without SN change, i.e., a conditional change of a PSCell of an SN when the UE is already in DC with the MN and SN. In this scenario, the base station 104A operates as an MN and the base station 106A operates as an SN. Events in this scenario similar to those discussed above are labeled with the same reference numbers. The differences between the scenarios of FIGS. 3A-3B and FIG. 3D are discussed below.

After detecting 322 an SCG failure, the UE 102 does not initially transmit an SCG failure information message to the MN, as in FIGS. 3A-B. Rather, the UE notifies the MN 104A of the SCG failure only after failing to connect to the C-PSCell within a predetermined period of time. In particular, the UE 102 starts 352 an SCG failure recovery timer in response to the SCG failure (e.g., upon detecting the SCG failure). Before the SCG failure timer expires, the UE 102 detects 354 that the condition for connecting to a C-PSCell 126A is satisfied or that the C-PSCell 126A is suitable, and initiates a random access procedure on the C-PSCell 126A in response to the detection. The UE 102 then performs 336 the random access procedure with the SN 106A via the C-PSCell 126A, e.g., using one or more random access configurations in the C-SN configuration. The UE 102 may transmit 338 an RRC reconfiguration complete message during or after the random access configuration to connect to the C-PSCell 126A. If the UE 102 successfully completes the random access procedure, the UE 102 stops 360 the SCG failure recovery timer and communicates 342 with the SN 106A via the C-PSCell 126A in accordance with configurations in the C-SN configuration. If the SN 106A identifies the UE 102 in the random access procedure, the SN 106A may resume communication with the UE 102 via SN radio resources if the SN 106A has suspended communication with the UE 102 in response to detecting disconnection from the UE 102 as described for FIG. 3A. If the UE 102 does not detect that the condition for connecting to a C-PSCell or that a C-PSCell is suitable before detecting 364 that the SCG failure recovery timer has expired, events 324-332, 334 or 335, and 336-342 may occur. In this way, the UE 102 does not transmit 324 an SCG failure information message in response to detecting an SCG failure unless the UE 102 does not detect that the condition for connecting to a C-PSCell cell is satisfied or that a C-PSCell is suitable before the timer expires.

Figure 3E:
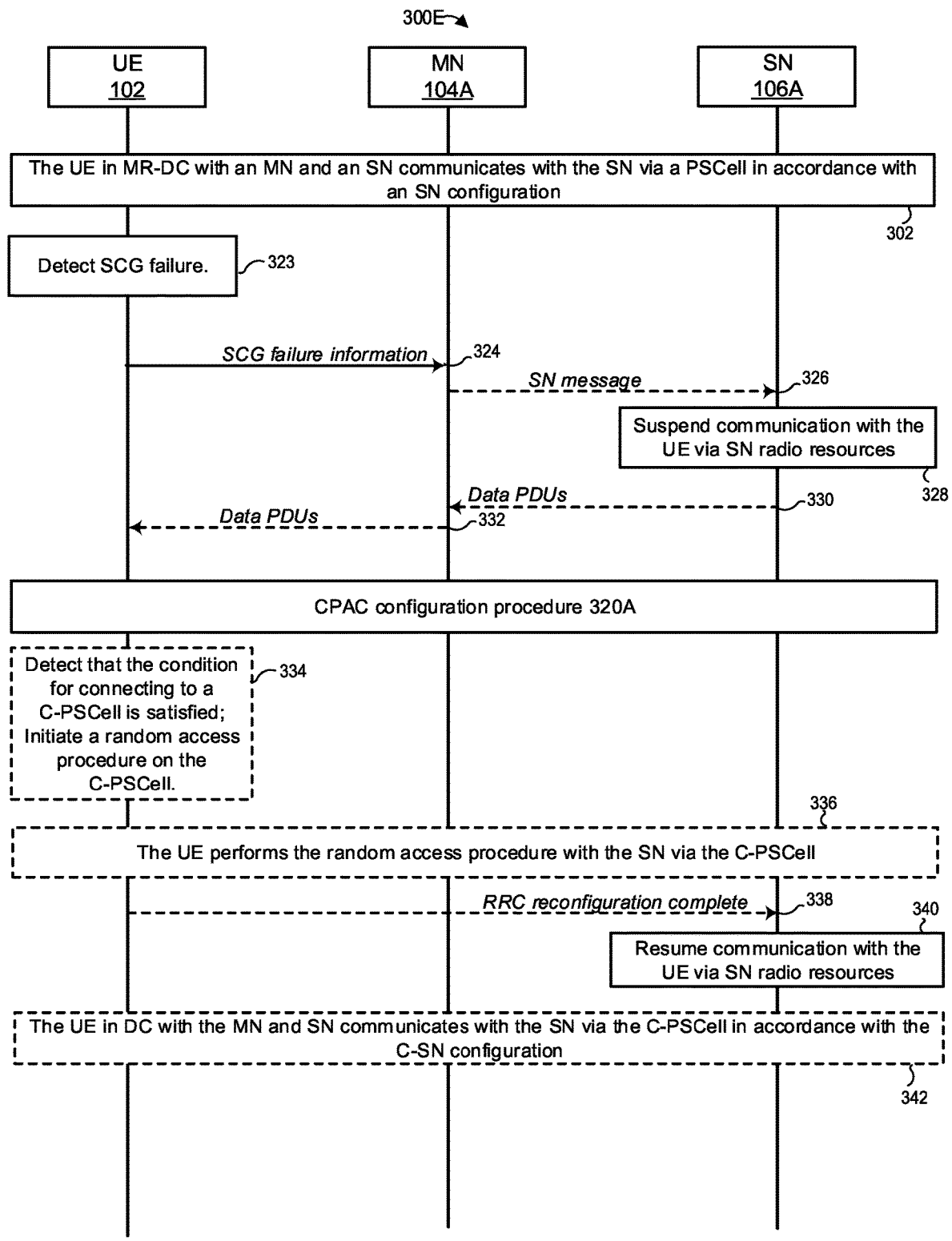
FIG. 3E is a messaging diagram of an example scenario similar to the scenario of FIG. 3A, but with the SN providing the conditional configuration for CPAC after the UE detects SCG failure.

Now referring to FIG. 3E, a scenario 300E involves a CPAC without SN change, i.e., a conditional change of a PSCell of an SN when the UE is already in DC with the MN and SN. In this scenario, the base station 104A operates as an MN and the base station 106A operates as an SN. Events in this scenario similar to those discussed above are labeled with the same reference numbers. The differences between the scenarios of FIG. 3A and FIG. 3E are discussed below.

In FIG. 3A, the CPAC configuration procedure 320A takes place before the UE 102 detects the SCG failure. In contrast, in FIG. 3E, the CPAC configuration procedure 320A takes place after the UE 102 detects 323 the SCG failure. The SN 106A transmits a CPAC configuration by the CPAC configuration procedure 320A to the UE 102 after receiving 326 the SN message or detecting the UE 102 has disconnected from the SN 106A. In some implementations, the UE 102 may include at least one measurement result in the SCG failure information message and in turn, the MN 104A sends the at least one measurement result in the SN message 326 to the SN 106A. In other implementations, the UE 102 may transmit at least one measurement report message including at least one measurement result to the SN 106A via the MN 104A after the UE 102 detects the SCG failure. The SN 106A may determine whether to transmit the CPAC configuration to the UE 102 by the CPAC configuration procedure 320A based on the at least one measurement result. For example, the SN 106A may transmit the CPAC configuration to the UE 102 by the CPAC configuration procedure 320A if the at least one measurement result is above a first threshold.

In another example, the SN 106A may perform an SN Modification procedure with the MN 104A to configure the UE 102 to perform immediate PSCell change to a second PSCell (e.g., the PSCell at event 302 or a new PSCell) if the at least one measurement result associated with the second PSCell is above a second threshold that is larger than the first threshold. In the SN Modification procedure, the SN 106A sends an SN Modification Required message to the MN 104A and the MN 104A may respond with an SN Modification Confirm message. The MN 104A may send an SN Modification Request message to the SN 106A in response to the SN Modification Required message and the SN 106A may send an SN Modification Request Acknowledge message in response. The SN 106A configures the UE 102 to perform the immediate PSCell change to the second PSCell in an RRC reconfiguration message in the SN Modification Required message or SN Modification Request Acknowledge message. In turn, the MN 104A transmits the RRC reconfiguration message to the UE 102. The UE 102 transmits an RRC reconfiguration complete message to the MN 104A in response to the RRC reconfiguration message and in turn, the MN 104A may send an SN message including the RRC reconfiguration complete message to the SN 106A. The SN message can be the SN Modification Confirm message or an SN Reconfiguration Complete message. In some implementations, the MN 104A includes the RRC reconfiguration message in an RRC container message and transmits the RRC container message to the UE 102. The UE 102 may include the RRC reconfiguration complete message in an RRC container response message and transmit the RRC container response message to the MN 104A in response to the RRC container message. In turn, the MN 104A sends the SN message (e.g., the SN Modification Confirm message or SN Reconfiguration Complete message) including the RRC reconfiguration complete message to the SN 106A.

The UE 102 immediately performs a random access procedure on the second PSCell in response to the RRC reconfiguration message. If the SN 106A identifies the UE 102 in the random access procedure on the second PSCell, the SN 106A may resume communication with the UE via SN radio resources. If the UE 102 successfully complete the random access procedure, the UE operates in DC with the MN and the SN and communicates with the SN 106A via the second PSCell.

When the SN 106A is implemented as an ng-eNB, the RRC reconfiguration message generated by the SN 106A is an RRCConnectionReconfiguration message, and the RRC reconfiguration complete message the MN 104A receives 310 is RRCConnectionReconfigurationComplete. When the SN 106A is implemented as a gNB, the RRC reconfiguration message generated by the SN 106A is an RRCReconfiguration message, and the RRC reconfiguration complete message is an RRCReconfigurationComplete message. When the MN 104A is implemented as an eNB or ng-eNB, the RRC container message is an RRCConnectionReconfiguration message, and the RRC container response message is RRCConnectionReconfigurationComplete. When the MN 104A is implemented as a gNB, the RRC container message is an RRCReconfiguration message, and the RRC container response message is an RRCReconfigurationComplete message.

In yet another example, the SN 106A may perform an SN Release procedure with the MN 104A to configure the UE 102 to release the MR-DC if the at least one measurement result is below the first threshold or a third threshold smaller than the first threshold. In the SN Release procedure, the SN 106A sends an SN Release Required message to the MN 104A and the MN 104A may respond with an SN Release Confirm message. The MN 104A configures the UE 102 to release the MR-DC in an RRC reconfiguration message generated by the MN 104A. The UE 102 immediately releases the MR-DC and transmits an RRC reconfiguration complete message to the MN 106A in response to the RRC reconfiguration message. The UE 102 is in SC with the MN 104A upon releasing the MR-DC. When the MN 104A is implemented as an eNB or ng-eNB, the RRC reconfiguration message generated by the MN 104A is an RRCConnectionReconfiguration message, and the RRC reconfiguration complete message is RRCConnectionReconfigurationComplete. When the MN 104A is implemented as a gNB, the RRC reconfiguration message generated by the MN 104A is an RRCReconfiguration message, and the RRC reconfiguration complete message is an RRCReconfigurationComplete message.

Figure 3F:
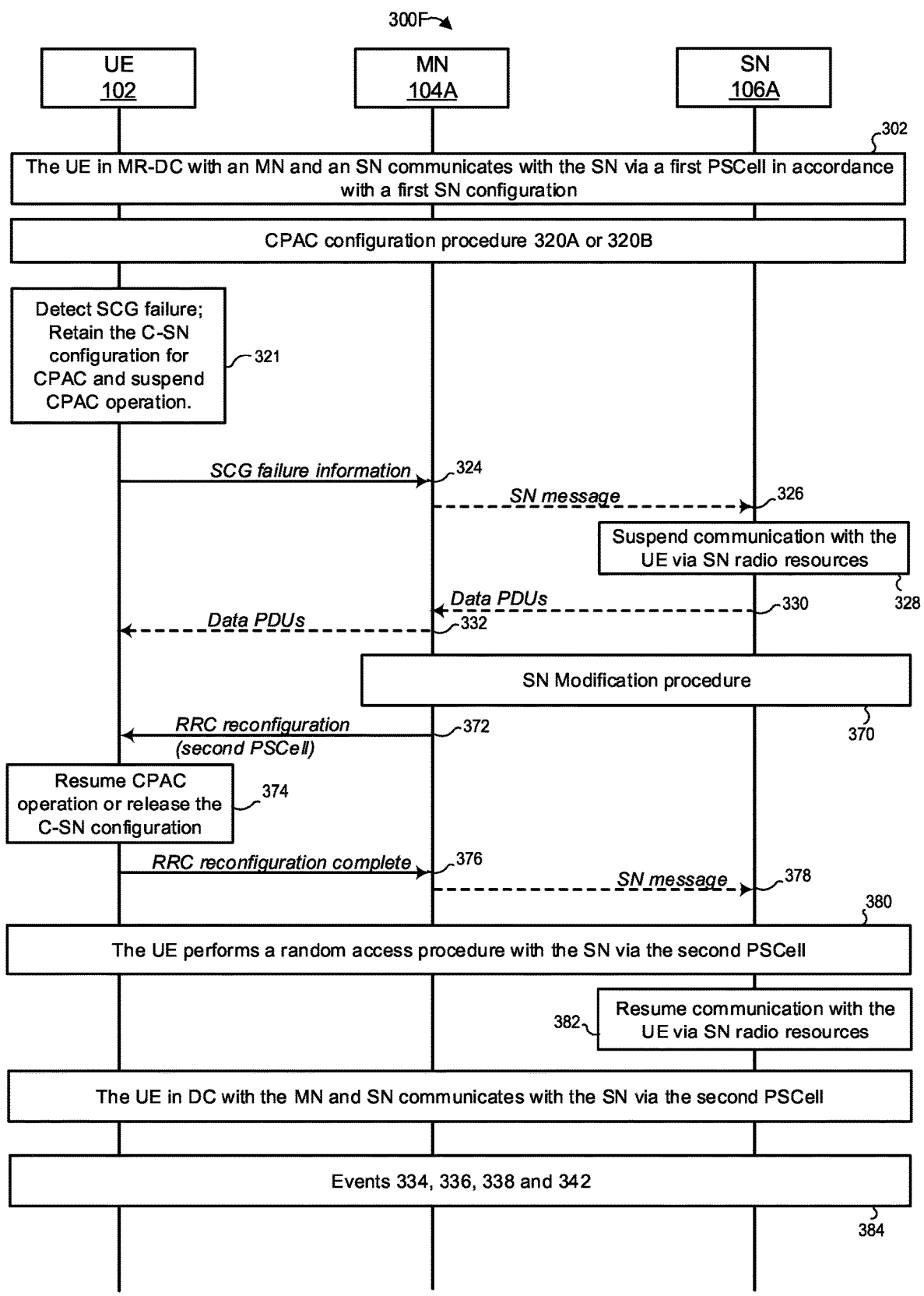
FIG. 3F is a messaging diagram of an example scenario similar to the scenarios of FIGS. 3A and 3B, but with the UE suspending the conditional operation for CPAC in response to the SCG failure, until the RAN configures a new PSCell.

Now referring to FIG. 3F, a scenario 300F involves handling a conditional configuration when the UE operating in DC with the MN and SN detects SCG failure. In this scenario, the base station 104A operates as an MN and the base station 106A operates as an SN. Events in this scenario similar to those discussed above are labeled with the same reference numbers. The differences between the scenarios of FIGS. 3A-3B and FIG. 3F are discussed below.

Similar to the scenarios 300A and 300B, the UE 102 detects 321 SCG failure, and retains 321 the C-SN configuration for CPAC. However, in scenario 300F, the UE 102 suspends 321 a CPAC operation in response to the SCG failure. After the UE 102 suspends 321 the CPAC operation, the UE 102 may stop detecting the condition for connecting to the C-PSCell 126A, or stop connecting to the C-PSCell 126A if the UE 102 detects that the condition for connecting to the C-PSCell 126A is satisfied.

In some implementations, the UE 102 may include at least one measurement result in the SCG failure information message 324 and in turn, the MN 104A may send the at least one measurement result to the SN 106A in the SN message 326. In other implementations, the UE 102 may transmit at least one measurement report message including at least one measurement result to the SN 106A via the MN 104A after the UE 102 detects the SCG failure. In yet other implementations, the UE 102 may transmit at least one measurement report message including at least one measurement result to the MN 104A after the UE 102 detects the SCG failure.

The SN 106A may initiate and perform 370 an SN Modification procedure with the MN 104A to configure the UE 102 to perform an immediate PSCell change to a second PSCell (e.g., the first PSCell at event 302 or a new PSCell) if the at least one measurement result associated with the second PSCell is above a threshold. In the SN Modification procedure, the SN 106A sends an SN Modification Required message to the MN 104A and the MN 104A may respond with an SN Modification Confirm message. The MN 104A may send an SN Modification Request message to the SN 106A in response to the SN Modification Required message and the SN 106A may send an SN Modification Request Acknowledge message in response.

Alternatively, the MN 104A may initiate and perform 370 an SN Modification procedure with the SN 106A to configure the UE 102 to perform immediate PSCell change to a second PSCell (e.g., the first PSCell at event 302 or a new PSCell) if the at least one measurement result associated with the second PSCell is above a threshold. In the SN Modification procedure, the MN 104A may send an SN Modification Request message to the SN 106A and the SN 106A may send an SN Modification Request Acknowledge message in response. The SN message can be the SN Modification Request message.

The SN 106A configures the UE 102 to perform the immediate PSCell change to the second PSCell in an RRC reconfiguration message (e.g., an SN Modification Required message or an SN Modification Request Acknowledge message). In turn, the MN 104A transmits 372 the RRC reconfiguration message to the UE 102. If the SN 106A does not configure the UE 102 to release the C-SN configuration in the RRC reconfiguration message, the UE 102 resumes 374 the CPAC operation in response to the RRC reconfiguration message. After the UE 102 resumes the CPAC operation, the UE 102 may start detecting the condition for connecting to the C-PSCell 126A, or connect to the C-PSCell 126A if the UE 102 detects that the condition for connecting to the C-PSCell 126A is satisfied. If the UE 102 detects the condition for connecting to the C-PSCell 126A before completing the random access procedure 380, the UE 102 may connect to the C-PSCell 126A after completing the random access procedure. Alternatively, the UE 102 may resume 374 the CPAC operation after completing the random access procedure 380.

If the SN 106A configures the UE 102 to release the C-SN configuration in the RRC reconfiguration message, the UE 102 releases 374 the C-SN configuration in response to the RRC reconfiguration message.

The UE 102 transmits 376 an RRC reconfiguration complete message to the MN 104A in response to the RRC reconfiguration message and in turn, the MN 104A may send 378 an SN message including the RRC reconfiguration complete message to the SN 106A. The SN message the SN 106A receives 378 can be the SN Modification Confirm message or an SN Reconfiguration Complete message. In some implementations, the MN 104A may include the RRC reconfiguration message in an RRC container message and transmit the RRC container message to the UE 102. The UE 102 may include the RRC reconfiguration complete message in an RRC container response message and transmit the RRC container response message to the MN 104A in response to the RRC container message. In turn, the MN 104A sends the SN Reconfiguration Complete message including the RRC reconfiguration complete message to the SN 106A.

The UE 102 immediately performs 380 a random access procedure on the second PSCell in response to the RRC reconfiguration message 372. If the SN 106A identifies the UE 102 in the random access procedure on the second PSCell, the SN 106A may resume 382 communication with the UE via SN radio resources. If the UE 102 successfully completes the random access procedure, the UE operates 384 in DC with the MN and the SN and communicates 384 with the SN 106A via the second PSCell. Events 334, 336, 338 and 342 may occur after event 384.

Figure 3G:
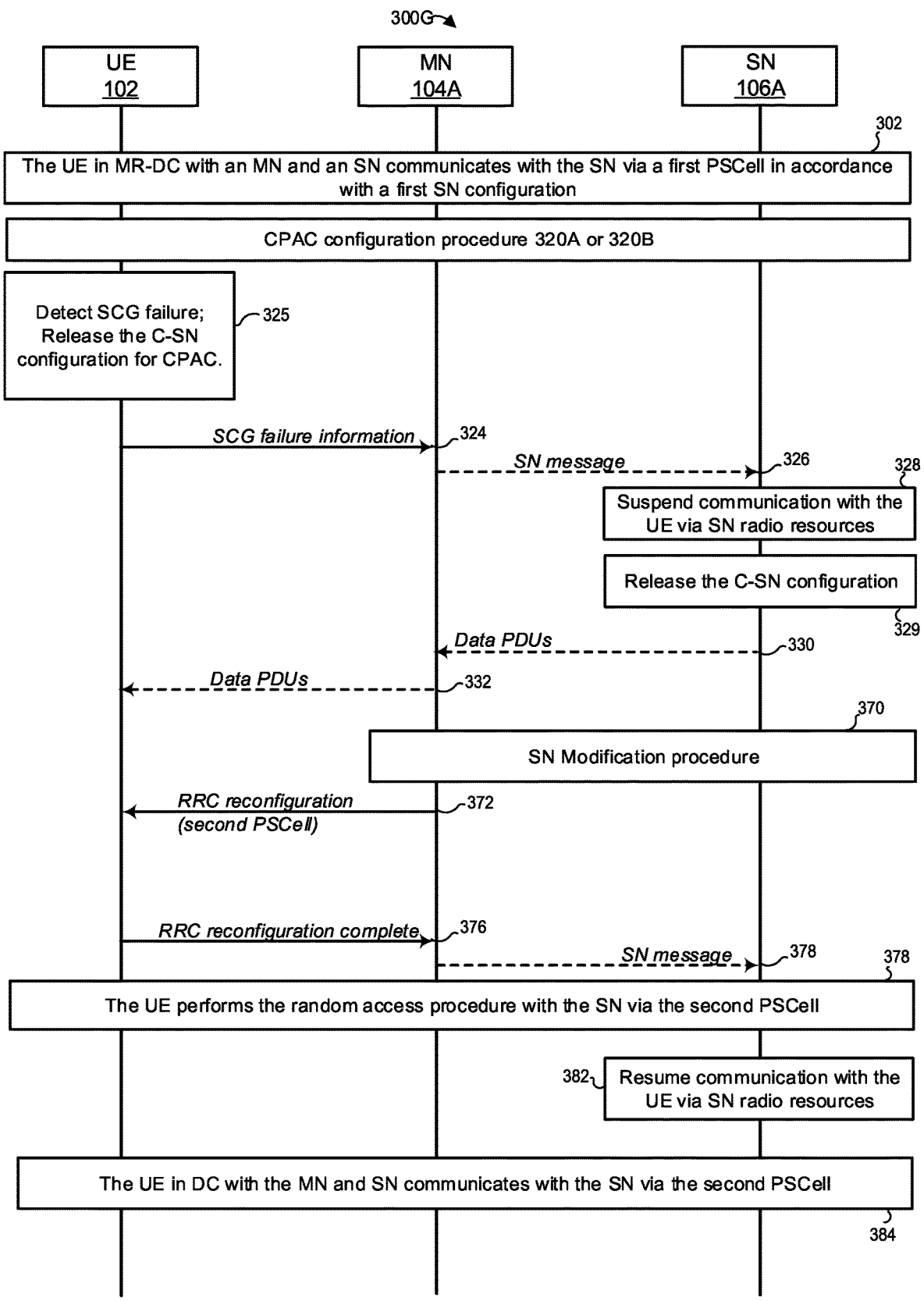
FIG. 3G is a messaging diagram of an example scenario in which a UE operating in MR-DC releases a previously received conditional configuration for CPAC in response to SCG failure, in accordance with the techniques of this disclosure.

Now referring to FIG. 3G, a scenario 300G involves handling a conditional configuration when the UE operating in DC with the MN and SN detects SCG failure. In this scenario, the base station 104A operates as an MN and the base station 106A operates as an SN. Events in this scenario similar to those discussed above are labeled with the same reference numbers. The differences between the scenarios of FIG. 3F and FIG. 3G are discussed below.

In contrast to scenario 300F, in scenario 300G, the UE 102 detects 325 SCG failure and releases 325 the C-SN configuration (or the conditional configuration) for CPAC in response to detecting the SCG failure rather than retaining the C-SN configuration. The SN 106A may release the C-SN configuration (or the conditional configuration) in response receiving 326 an SN message (if sent by the MN 104A) or in response to determining that the UE 102 has disconnected from the SN 106A (i.e., the SN 106A determines that the UE 102 has detected an SCG failure by detecting disconnection from the UE 102).

In some implementations, the condition in the conditional configuration may be associated with at least one measurement configuration (e.g., MeasConfig IE) configured by the MN 104A to the UE 102. Each of the at least one measurement configuration is associated with a measurement identity (e.g., Measid IE). In some implementations, the UE 102 may release the at least one measurement configuration if the UE 102 releases 325 the C-SN configuration or the conditional configuration. In other implementations, the UE 102 does not release the at least one measurement configuration if the UE 102 releases 325 the C-SN configuration or the conditional configuration.

Figure 4A:
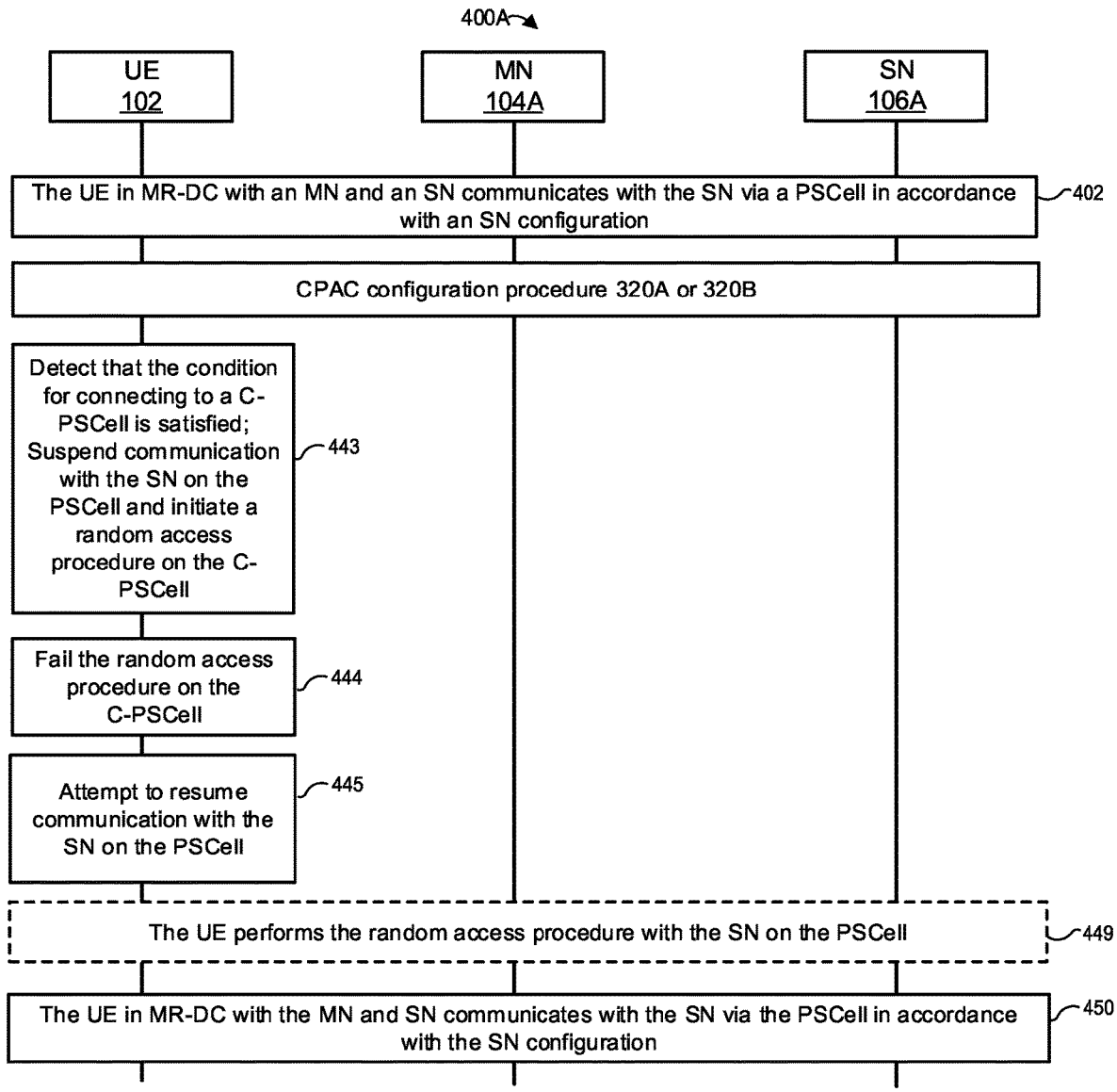
FIG. 4A is a messaging diagram of an example scenario in which a UE operating in MR-DC fails to connect to a C-PSCell and resumes communication with the SN on the PSCell, in accordance with the techniques of this disclosure.

Now referring to FIG. 4A, a scenario 400A involves failure on a CPAC without SN change, i.e., a conditional change of a PSCell of an SN when the UE is already operating in DC with the MN and SN. In this scenario, the base station 104A operates as an MN and the base station 106A operates as an SN. The differences between the scenarios of FIGS. 3A-3B and FIG. 4A are discussed below.

At the beginning of scenario 400A, the UE 102 operates in MR-DC with the MN 104A and the SN 106A. The UE 102 communicates 402 UL PDUs and/or DL PDUs with SN 106A via a PSCell (i.e., a cell other than cell 126A) in accordance with a certain SN configuration. The UE 102, the MN 104A, and the SN 106A then perform the CPAC configuration procedure 320A or 320B, discussed above with reference to FIGS. 3A and 3B.

The UE 102 may later detect 443 that the condition for connecting to a C-PSCell 126A is satisfied. The UE 102 may 443 suspend communication with the SN 106A on the PSCell and initiate 443 a random access procedure on the C-PSCell 126A in response to the detection. The UE 102 may also suspend communication with the SN 106A on one or more SCells (if configured). The UE 102 may fail 444 the random access procedure on the C-PSCell 126A. The UE 102 attempts 445 to resume communication with the SN on the PSCell in response to the failure on the random access procedure. To resume communication with the SN 106A on the PSCell, the UE 102 in some implementations may perform 449 a random access procedure with the SN 106A via the PSCell. If the UE 102 successfully completes the random access procedure 449, the UE 102 in MR-DC with the MN 104A and SN 106A communicates 450 with the SN 106A via the PSCell in accordance with the SN configuration. That is, the UE 102 resumes communication with the SN 106A via the PSCell. In some implementations, the UE 102 performs 449 the random access procedure using one or more random access configurations broadcast on the PSCell, e.g., in one or more system information blocks (SIBS). In one implementation, if the UE 102 successfully completes the random access procedure 449, the UE 102 in MR-DC with the MN 104A and SN 106A communicates with the SN 106A via the one or more SCells in accordance with the SN configuration. That is, the UE 102 resumes communication with the SN 106A via the one or more SCells. In another implementation, if the UE 102 successfully completes the random access procedure 449, the UE does not communicate with the SN 106A via the one or more SCells in accordance with the SN configuration until the UE 102 receives from the SN 106A a MAC control element (CE) activating the one or more SCells.

In other implementations, the UE 102 skips the event 449. To resume communication with the SN 106A on the PSCell, the UE 102 operates 450 in MR-DC with the MN 104A and SN 106A and communicates 450 with the SN 106A via the PSCell in accordance with the SN configuration. For example, the UE 102 may transmit control signals on PUCCH on the PSCell to the SN 106A and receive at least one physical downlink control channel (PDCCH) on the PSCell or the one or more SCells in accordance with the SN configuration. The control signals may include scheduling request, uplink control information (UCI) or channel state information (CSI).

In some implementations, the UE 102 fails 444 the random access procedure because the UE 102 does not successfully complete the random access procedure within a time period. For example, the UE 102 may start a timer (e.g., T304 or T307) to count the time period in response to the detection 443. If the UE 102 successfully completes the random access procedure before the timer expires, the UE stops the timer. Otherwise, the timer expires and the UE 102 fails the random access procedure 444 (i.e., the UE 102 fails the CPAC procedure). The UE 102 can determine that an SCG failure occurred upon the timer expiring. In some implementations, the UE 102 can determine that the failure type of the SCG failure is an SCG change failure (or SCG synchronous reconfiguration failure). In other implementations, the UE 102 can determine that the failure type of the SCG failure is a conditional SCG change failure or a conditional SCG synchronous reconfiguration failure.

If the UE 102 skips the random access procedure 449, the UE 102 may fail to resume 450 communication with the SN 106A via the PSCell because the UE 102 does not identify a UE identity of the UE 102 on the at least one PDCCH on the PSCell within a time period. More specifically, the UE 102 may fail to resume 450 communication with the SN 106A on the PSCell if the UE 102 does not find a cyclic redundancy check (CRC) scrambled with the UE identity on the at least one PDCCH on the PSCell within the time period. For example, the UE 102 may start a timer (e.g., T304, T307 or a new timer T3xx) to count the time period in response to the detection 443. If the UE 102 successfully identifies the UE identity (e.g., the UE 102 finds a CRC scrambled with the UE identity) on the at least one PDCCH on the PSCell before the timer expires, the UE stops the timer and determines that the UE 102 successfully resumed communication with the SN 106A on the PSCell. Otherwise, the timer expires and the UE 102 fails to resume communication with the SN 106A on the PSCell.

In some implementations, the UE 102 may transmit an SCG failure information message to the MN 104A to notify the MN 104A of the (conditional) SCG change failure in response to the failure 444. The MN 104A may send an SN message to the SN 106A in response to the SCG failure information message. In some implementations, the MN 104A may indicate the conditional SCG change failure or indicate that the SN 106A should release the C-SN configuration in the SN message. In some implementations, the SN message can be an SN Modification Request message and the SN 106A may send an SN Modification Request Acknowledge message to the MN 104A in response. In other implementations, the SN message can be an SN Release Request message and the SN 106A may send an SN Release Request Acknowledge message to the MN 104A in response.

In other implementations, the UE 102 does not transmit an SCG failure information message if the UE 102 successfully resumes 450 communication with the SN 106A via the PSCell. That is, the UE 102 may operate as if the failure 444 did not occur or that the detection 443 did not occur.

In some implementations, the UE 102 may retain the C-SN configuration in response to the failure 444. Then the UE 102 may perform events 334-338 and 342 as described for FIG. 3A. The SN 106A may not release the C-SN configuration in response to the SN message or in response to determination that the UE 102 disconnects from the SN 106A (i.e., the SN 106A determines the UE 102 has the SCG failure by its detection).

In other implementations, the UE 102 may release the C-SN configuration in response to the failure 444. The SN 106A may release the C-SN configuration in response to the SN message or in response to a determination that the UE 102 disconnected from the SN 106A.

Figure 4B:
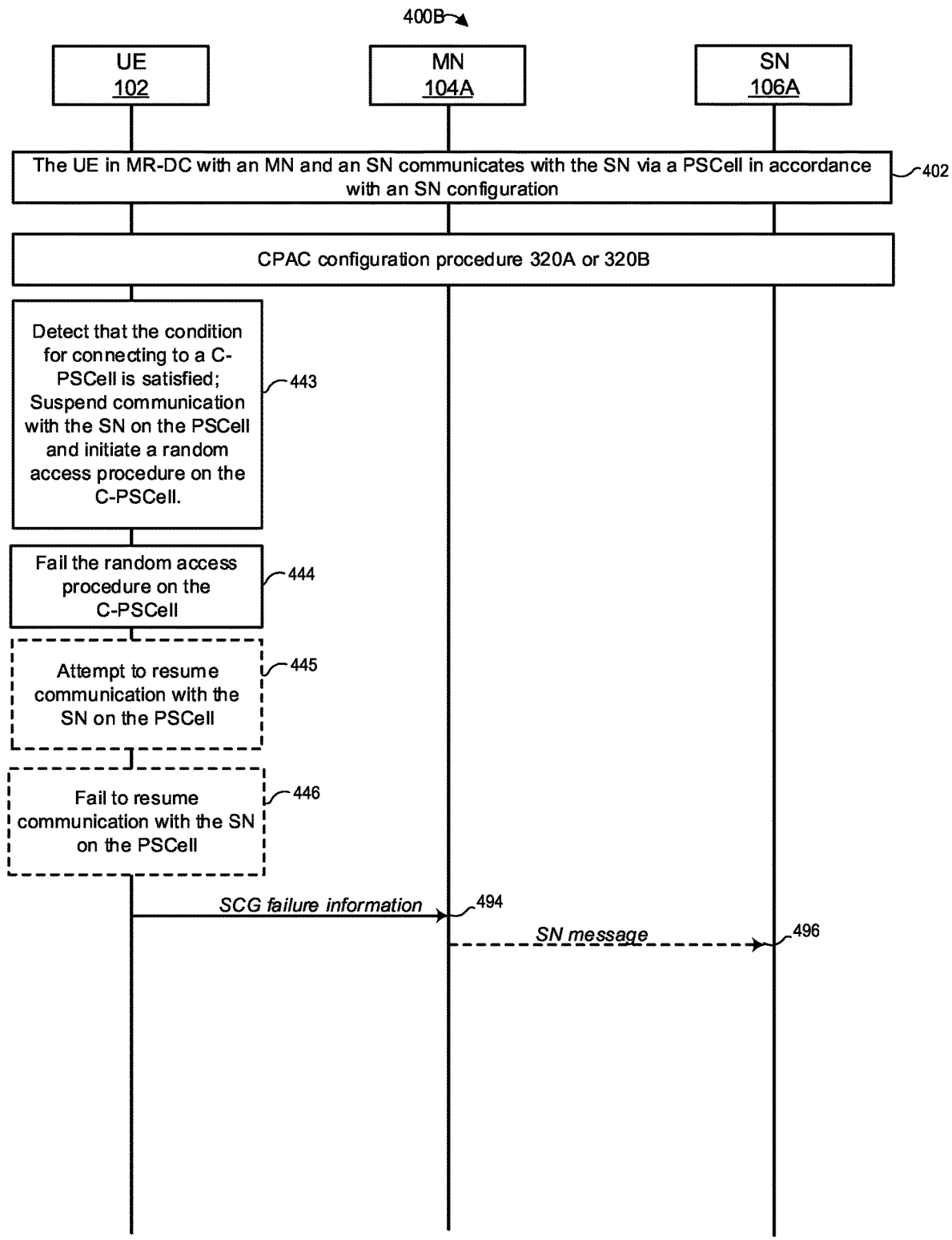
FIG. 4B is a messaging diagram of an example scenario similar to the scenario of FIG. 4A, but with the UE failing to resume communication on the PSCell with the SN.

Next, a scenario 400B of FIG. 4B is generally similar to the scenario 400A, and events in this scenario similar to those discussed above are labeled with the same reference numbers. The differences between FIGS. 4A and 4B are described below.

In some implementations, the UE 102 may attempt 445 to resume communication with the SN 106A on the PSCell. The UE 102 may fail to resume communication with the SN 106A on the PSCell as described for FIG. 4A. The UE 102 may transmit 494 an SCG failure information message to the MN 104A if the UE 102 fails to resume communication with the SN 106A on the PSCell. The UE 102 may indicate the (conditional) SCG change failure in the SCG failure information message. The MN 104A may send 496 an SN message to the SN 106A in response to the SCG failure information message as described for FIG. 4A. If the UE 102 successfully resumes communication with the SN 106A on the PSCell as described for FIG. 4A, the UE 102 in one implementation may not transmit an SCG failure information message to the MN 104A. If the UE 102 successfully resumes communication with the SN 106A on the PSCell as described for FIG. 4A, the UE 102 in another implementation may transmit the SCG failure information message to the MN 104A to notify the MN 104A of the (conditional) SCG change failure.

In other implementations, the UE 102 may not attempt to resume communication with the SN 106A. The UE 102 may transmit 494 an SCG failure information message to the MN 104A in response to the failure 444. The UE 102 may indicate the (conditional) SCG change failure in the SCG failure information message. The MN 104A may send 496 an SN message (e.g., SN Modification Request message) to the SN 106A in response to the SCG failure information message as described for FIG. 4A. The SN 106A may suspend communication with the UE 102 via SN radio resources in response to the SN message 496 or in response to determining that the UE 102 has disconnected from the SN 106A, as described for FIG. 3A.

Figure 4C:
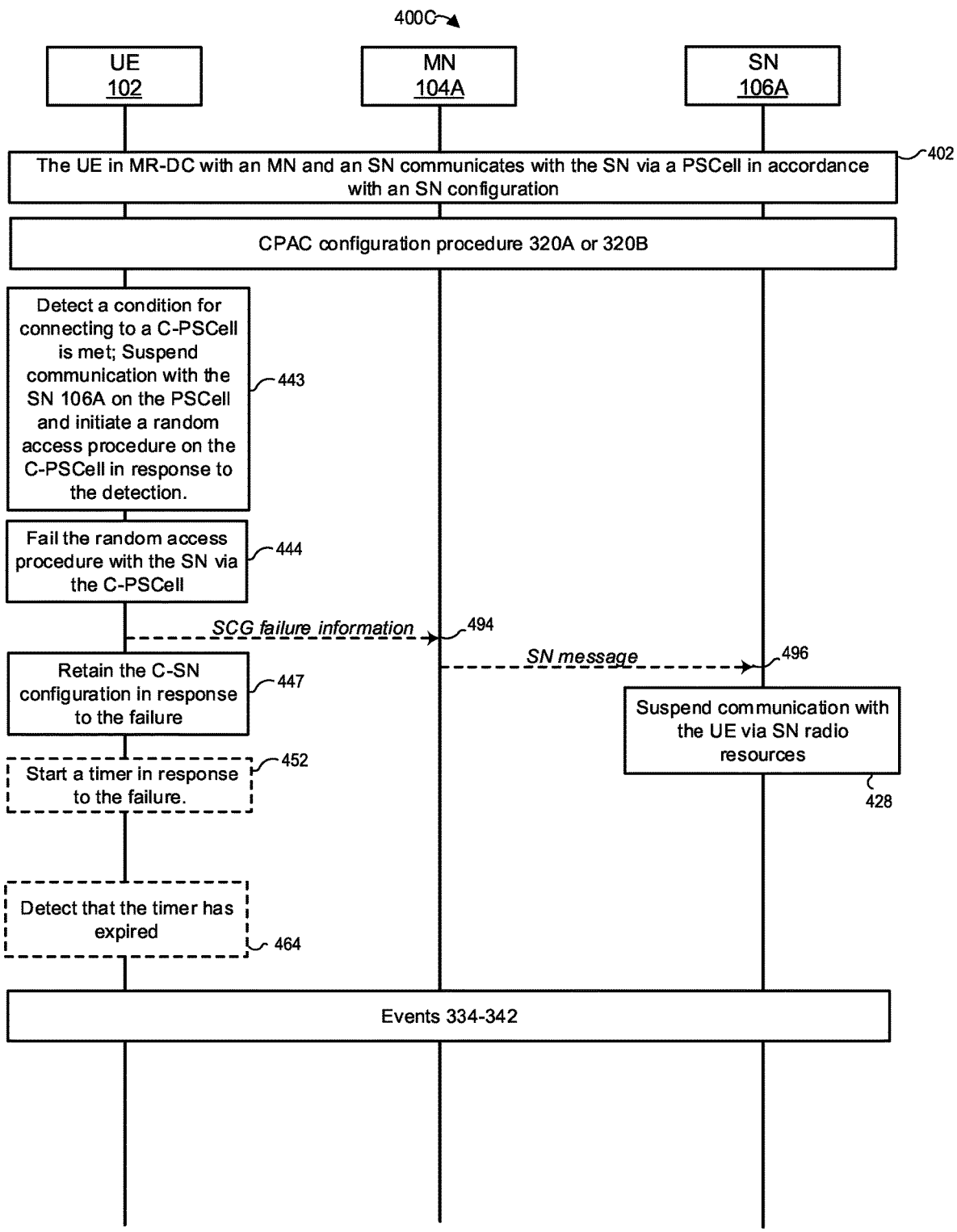
FIG. 4C is a messaging diagram of an example scenario similar to the scenario of FIG. 4B, but with the UE retaining the C-SN configuration.

Turning to the scenario 400C depicted in FIG. 4C, the UE 102 may retain 447 the C-SN configuration in response to the failure 444. The UE 102 may then perform events 334-342 as described for FIG. 3A. In some implementations, the UE 102 may start 452 a timer and wait until the UE 102 detects 464 that the timer has expired before performing events 334-342. The SN 106A may not release the C-SN configuration in response to the SN message or in response to determining that the UE 102 has disconnected from the SN 106A. Alternatively, the UE 102 can perform event 335 instead of event 334.

Figure 4D:
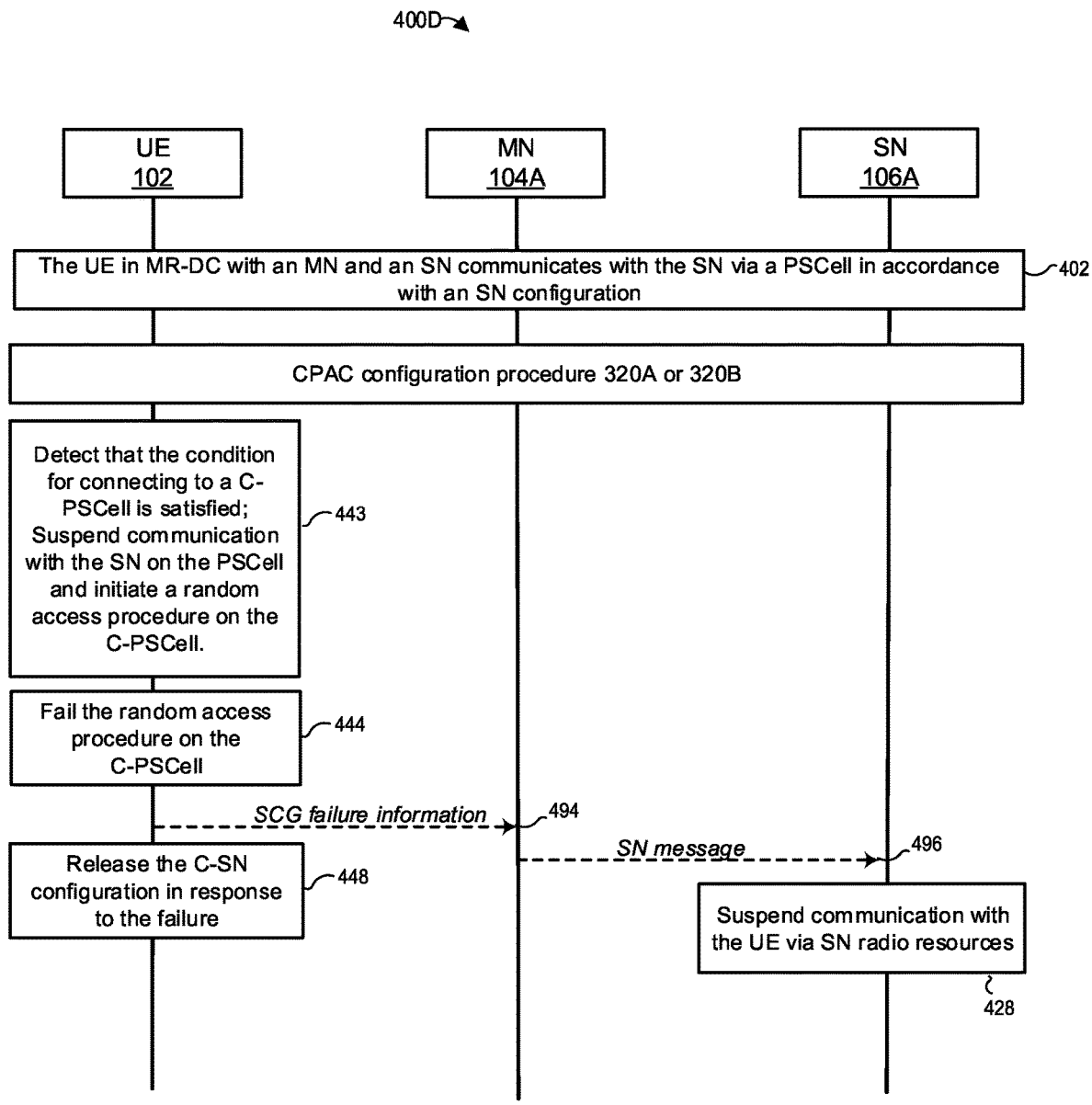
FIG. 4D is a messaging diagram of an example scenario similar to the scenario of FIG. 4C, but with the UE releasing the C-SN configuration.

Turning to the scenario 400D depicted in FIG. 4D, the UE 102 may release 448 the C-SN configuration in response to the failure 444 or 446. The SN 106A may release the C-SN configuration in response to the SN message or in response to determination that the UE 102 disconnects from the SN 106A (i.e., the SN 106A determines the UE 102 has the SCG failure by its detection).

Several example scenarios involving CSAC are discussed next with reference to FIGS. 5A-E.

Figure 5A:
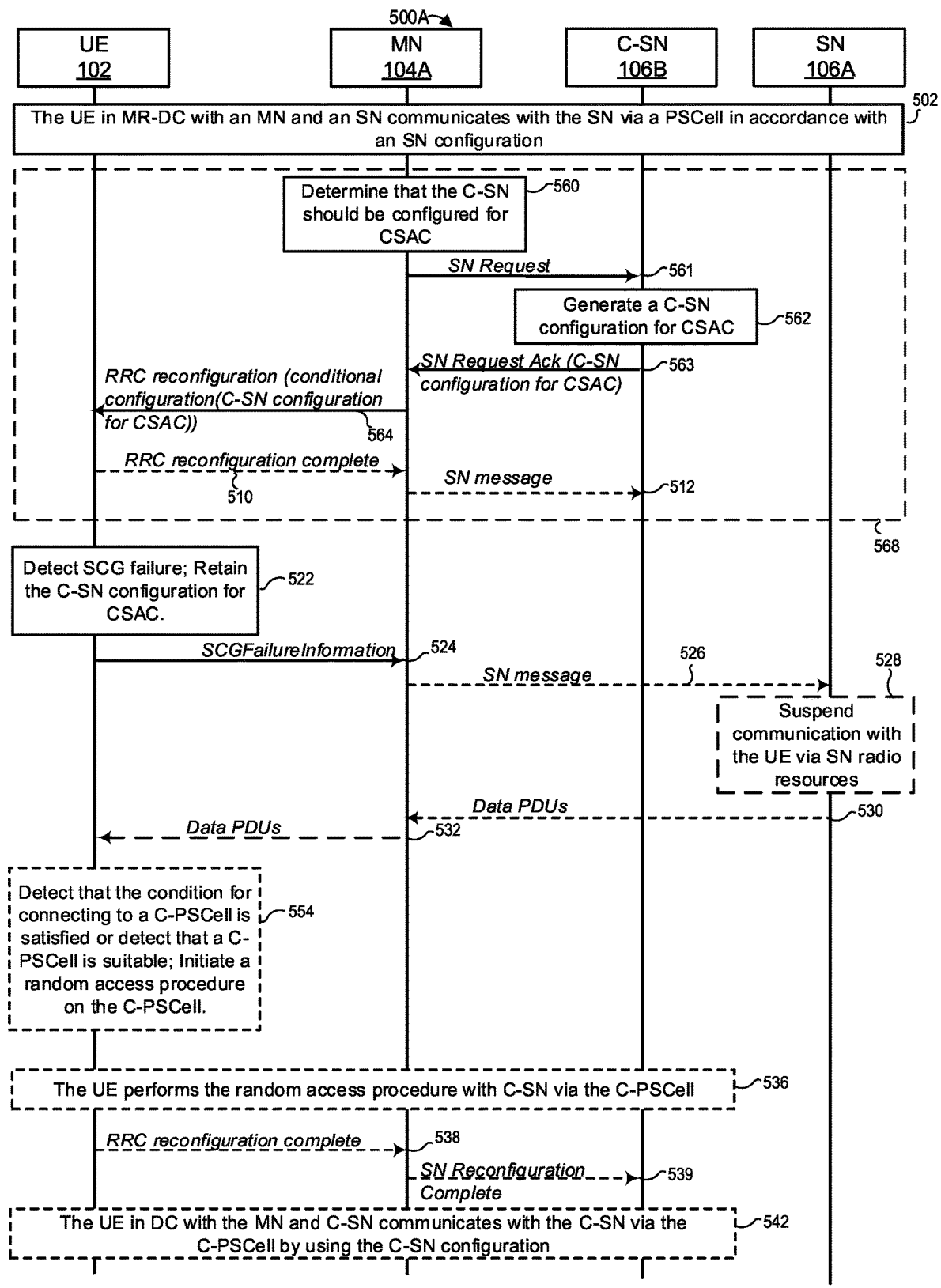
FIG. 5A is a messaging diagram of an example scenario in which a UE operating in MR-DC retains a conditional configuration for a conditional SN addition or change (CSAC) procedure in response to SCG failure, in accordance with the techniques of this disclosure.

Referring first to a scenario 500A of FIG. 5A, the base station 104A operates as an MN, the base station 106A operates as an SN, and the base station 106B operates as a C-SN. At the beginning of this scenario, the UE 102 operates 502 in DC with the MN 104A and SN 106A and communicates UL PDUs and/or DL PDUs with MN 104A via a PCell, and communicates UL PDUs and/or DL PDUs with the SN 106A via a PSCell (i.e., a cell other than cell 126A). In some implementations, the scenario 500A may begin with the UE 102 operating 502 in SC with the MN 104A. Events 524, 526, 528, 530 and 532 are similar to events 324, 326, 328, 330 and 332.

The MN 104A determines 560 that it should configure the base station 106B as a C-SN for CSAC, such that the SN for the UE 102 will change from the SN 106B to the C-SN 106B. The MN 104A can make this determination based on measurement result(s) from the UE 102, for example, or in response to an indication that the SN 106A requires a conditional SN change (e.g., SN Change Required message), which the SN 106A can send to the MN 104A. More intelligently, the MN 104A can derive or estimate the UE 102 is moving toward coverage of the base station 106B according to uplink signals received from the UE 102 or positioning measurement result(s) received from the UE 102. In response to the determination, the MN 104A sends 561 an SN Request message to the C-SN 106B for the CSAC. In response to receiving 561 the SN Request message, the C-SN 106B determines 562 that it should generate a C-SN configuration for CSAC, for the UE 102. The C-SN 106B transmits 563 an SN Request Acknowledge message including the C-SN configuration for the CSAC to the MN 104A. The C-SN configuration can include a configuration for a C-PSCell and for zero, one, or more C-SCells. In some implementations, the MN 104A may include the C-SN configuration message in an RRC container message. The MN 104A then includes the C-SN configuration for CSAC or the RRC container message in a conditional configuration field/IE and transmits 564 an RRC reconfiguration message including the conditional configuration field/IE to the UE 102. In some implementations, the UE 102 transmits 510 an RRC reconfiguration complete message to the MN 104A in response to the RRC reconfiguration message. The MN 104A can transmit 512 an SN message (e.g., SN Reconfiguration Complete message or SN Change Confirm message) to the C-SN 106B in response to the RRC reconfiguration complete message. Events 502, 560-564, 510, and 412 collectively define a CSAC configuration procedure 568.

In some implementations, the C-SN 106B includes a radio bearer configuration for the conditional configuration in the SN Request Acknowledge message in event 563, and in turn the MN 104A may include the radio bearer configuration in the RRC reconfiguration message in event 564. The MN 104A may include the radio bearer configuration at the level of the RRC reconfiguration message, at the level of the conditional configuration element or at the level of the RRC container message described above.

When transmitting 564 the RRC reconfiguration to the UE 102, the MN 104A can specify a condition that must be satisfied before the UE 102 applies the C-SN configuration for CSAC. Alternatively, the SN 106A can specify, in the indication that indicating that the SN 106A requires a conditional SN change, that a condition that must be satisfied before the UE 102 applies the C-SN configuration for CSAC. The MN 104A can include a configuration of this condition at the level of the RRC reconfiguration message, at the level of the conditional configuration element, or at the level of the C-SN configuration for CSAC. In the conditional configuration element in the RRC reconfiguration message of the 564, the MN 104A for example can include a configuration ID to identify the C-SN configuration for CSAC.

In some implementations, the SN Request message is an SN Addition Request message, and the SN Request Acknowledge message is an SN Addition Request Acknowledge message. In other implementations, the SN Request message is an SN Modification Request message, and the SN Request Acknowledge message is an SN Modification Request Acknowledge message. In some implementations, the MN 104A indicates to the base station 106B, in the SN Request message, that the MN 104A requests that the base station 106A operate as a C-SN for the UE 102. The UE 102 can determine that the conditional configuration includes the C-SN configuration and apply the C-SN configuration for the CSAC to communicate with the C-SN 106B.

At a later time, the UE 102 detects 522 SCG failure and retains 522 the C-SN configuration for CSAC in response to the SCG failure. The UE 102 transmits 524 an SCG failure information message to the MN 104A to inform the MN 104A of the SCG failure. In response to receiving 524 the SCG failure information message, the MN 104A may send 526 an SN message to the SN 106A to cause the SN 106A to suspend communication with the UE 102 via SN radio resources (i.e., SCG radio resources on the PSCell and SCell(s), if configured, of the SN 106A). The SN 106A may suspend 528 communication with the UE via SN radio resources in response to receiving 526 the SN message (if sent by the MN 104A) or in response to a determination that the UE 102 disconnects from the SN 106A. Thus, the SN 106A does not expend its radio resources attempting to transmit data to the UE 102 which has detected the SCG failure. After the SN 106A suspends communication with the UE 102 via the SN radio resources, the SN 106A may send 530 data PDUs (e.g., PDCP PDUs) including data packets to the MN 104A, e.g., if the SN 106A receives the data packets from the CN 110 (e.g., S-GW 112 or UPF 162)

or an edge server. In turn, the MN 104A transmits 532 the data PDUs to the UE 102. Thus, the SN 106A sends 530 the data PDUs to the UE 102 via the MN 104A. The data PDUs can be associated to a SN-terminated bearer which can be a split bearer or an MCG bearer.

Generally speaking, an SCG failure can be related to SCG radio resources the UE 102 uses to communicate with the SN 106A. The SCG failure can be for example one of a radio link failure, SCG change failure (or SCG synchronous reconfiguration failure), SCG reconfiguration failure and SRB3 integrity failure. The UE 102 can detect the SCG failure when the UE 102 detects a random access problem on the PSCell, or when a timer T310 or T313 for monitoring a radio link on the PSCell expires or when the maximum number of retransmissions on SCG radio resources with the SN 106A at the RLC layer has been reached. Further, the SCG change failure can correspond to an immediate SCG change failure (or immediate SCG synchronous reconfiguration failure) or conditional SCG change failure (or conditional SCG synchronous reconfiguration failure). The term "SCG change" can apply to PSCell change or SN change. The immediate SCG synchronous reconfiguration failure occurs when the UE 102 fails an RRC reconfiguration procedure involving reconfiguration with sync for immediate SCG change. The conditional SCG change can correspond to CPAC or CSAC. The conditional SCG synchronous reconfiguration failure occurs when the UE 102 fails an RRC reconfiguration procedure involving reconfiguration with sync for conditional SCG change. The UE detects 522 the conditional SCG change failure (or the conditional SCG synchronous reconfiguration failure) if the UE 102 fails connecting to a C-PSCell (i.e., the UE 102 fails the CPAC or CSAC) due to detecting that the condition is satisfied or that the C-PSCell is suitable ("suitable" is described similarly for FIG. 3C). The SCG reconfiguration failure may include immediate SCG reconfiguration failure and conditional SCG reconfiguration failure. The UE 102 detects the immediate SCG reconfiguration failure if the UE 102 receives an RRC reconfiguration message on an SRB (e.g., SRB3) established between the UE 102 and the SN 106A, and determines that the RRC reconfiguration message contains an invalid configuration which is not in a conditional configuration (or a C-SN configuration). The UE 102 detects the conditional SCG reconfiguration failure if the UE 102 receives a C-SN configuration and identifies the C-SN configuration is invalid (e.g. the C-SN configuration contains an invalid configuration).

According to the above, the SCG failure can be divided into 8 failure types (or causes): (1) a random access problem, (2) aimer T310 or T313 expiring, (3) exceeding a maximum number of retransmissions at the RLC layer, (4) an immediate SCG change failure (or immediate SCG synchronous reconfiguration failure), (5) a conditional SCG change failure (conditional SCG synchronous reconfiguration failure), (6) an immediate SCG reconfiguration failure, (7) a conditional SCG reconfiguration failure, (7) an SRB3 integrity failure In other implementations, some of the types of SCG failure listed above can be merged into one failure type. For example, the immediate SCG reconfiguration failure and the conditional SCG reconfiguration failure can be combined into an SCG reconfiguration failure. In another example, the immediate SCG change failure and the conditional SCG change failure can be combined into an SCG reconfiguration failure.

In some implementations, the UE 102 retains the C-SN configuration if the SCG failure is a first failure type and releases the C-SN configuration if the SCG failure is a second failure type. For example, the second failure type can be a conditional SCG change failure or a conditional SCG reconfiguration failure and the first failure type can be a different failure type.

Optionally, after detecting 522 the SCG failure and retaining 522 a C-SN configuration, the UE 102 detects 554 that a condition (or conditions) for connecting to the C-PSCell 126B is satisfied, and initiates 554 a random access procedure on the C-PSCell 126B in response to the detection. For convenience, this discussion may refer to the condition or a configuration in singular, but it will be understood that there may be multiple conditions, and that the conditional configuration can include one or multiple configuration parameters. In any case, the UE 102 performs 536 the random access procedure with the C-SN 106B via the C-PSCell 126B using a random access configuration included in the C-SN configuration. The UE 102 (if the UE 102 is operating in DC) may disconnect from the SN 106A (i.e., the PSCell and all of SCell(s) of the SN 106A if configured) in response to the event 554 or 536. The UE 102 may transmit 538 an RRC reconfiguration complete message to the MN 104A in response to the event 554 or 536. The UE 102 may transmit 538 the RRC reconfiguration complete message before or after the event 536 or while the UE 102 performs 536 the random access procedure. In turn, the MN 104A sends 539 an SN message (e.g., an existing SN message such as an SN Reconfiguration Complete message or a newly defined SN message) to the C-SN 106B in response to the RRC reconfiguration complete message. The MN 104A may or may not include the RRC reconfiguration complete message in the SN message. The newly defined SN message can be specifically designed for the MN 104A to send the RRC reconfiguration complete message to the C-SN 106B or to notify the UE 102 to apply the C-SN configuration.

In some implementations, the random access procedure can be a four-step random access procedure or a two-step random access procedure. In other implementations, the random access procedure can be a contention-based random access procedure or a contention-free random access procedure. After the UE 102 successfully completes 536 the random access procedure, the C-SN 106B begins to operate as the SN 106B, and the UE 102 begins to operate 542 in DC with the MN 104A and the SN 106B. In particular, the UE 102 communicates 542 with the SN 106B via the C-PSCell 126B (i.e., new PSCell 126B) in accordance with the C-SN configuration for the CSAC.

In some implementations, the C-SN 106B identifies the UE 102 if the C-SN 106B finds an identity of the UE 102 in a medium access control (MAC) protocol data unit (PDU) received from the UE 102 in the random access procedure (event 536). The C-SN 106B includes the identity of the UE 102 in the C-SN configuration. In other implementations, the C-SN 106B identifies the UE 102 if the C-SN 106B receives a dedicated random access preamble from the UE 102 in the random access procedure. The C-SN 106B includes the dedicated random access preamble in the C-SN configuration.

The SN configuration can include multiple configuration parameters for the UE 102 to communicate with the SN 106A via the PSCell 126A and zero, one, or more secondary cells (SCells) of the SN 106A. The multiple configuration parameters may configure radio resources for the UE 102 to communicate with the SN 106A via the PSCell 126A and zero, one, or more SCells of the SN 106A. The multiple configuration parameters may configure zero, one, or more radio bearers. The one or more radio bearers can include an SRB and/or DRBs.

In some implementations, the C-SN 106B specifies the one or more conditions in the C-SN configuration for CSAC. In other implementations, the MN 104A includes the C-SN configuration along with the one or more conditions in a conditional configuration element or in the RRC reconfiguration message 564. The MN 104A may generate the conditional configuration for the UE 102A or receive 563 the conditional configuration from the C-SN 106B.

In some implementations, the C-SN configuration includes a group configuration (CellGroupConfig) IE that configures the C-PSCell 126B and zero, one, or more C-SCells of the C-SN 106B. In one implementation, the C-SN configuration can be an RRCReconfiguration message, RRCReconfiguration-IEs or the CellGroupConfig IE conforming to 3GPP TS 38.331. In other implementations, the C-SN configuration includes an SCG-ConfigPartSCG-r12 IE that configures the C-PSCell and may configure zero, one, or more C-SCells of the C-SN 106B. In one implementation, the C-SN configuration is an RRCConnectionReconfiguration message, RRCConnectionReconfiguration-IEs or the ConfigPartSCG-r12 IE conforming to 3GPP TS 36.331.

In some implementations, the SN configuration includes a CellGroupConfig IE that configures the PSCell and may zero, one, or more SCells of the SN 106A. In one implementation, the SN configuration can be an RRCReconfiguration message, RRCReconfiguration-IEs or the CellGroupConfig IE conforming to 3GPP TS 38.331. In other implementations, the SN configuration can include an SCG-ConfigPartSCG-r12 IE that configures the PSCell and may configure zero, one, or more SCells of the SN 106A. In one implementation, the SN configuration can be an RRCConnectionReconfiguration message, RRCConnectionReconfiguration-IEs or the ConfigPartSCG-r12 IE conforming to 3GPP TS 36.331.

In some cases, the UE 102 receives 564 one or more conditions in the conditional configuration or in the RRC reconfiguration message. The UE 102 can use the one or more conditions to determine whether to connect to the C-PSCell 126B. If the UE 102 detects that the condition is satisfied, the UE 102 connects to the C-PSCell 126B. That is, the condition (also referred to as the triggering condition) triggers the UE 102 to connect to the C-PSCell 126B or to execute the C-SN configuration. If the UE 102 does not detect that the condition is satisfied, the UE 102 does not connect to the C-PSCell 126B.

In some implementations, the C-SN 106B can include a CU 172 and one or more DU 174 as illustrated in FIG. 1C. The CU 172 receives the SN Request message from the MN 104A and sends the SN Request Acknowledge message. The DU 174 may generate the C-SN configuration or part of the C-SN configuration (e.g., the identity of the UE 102, the dedicated random access preamble, the random access configuration) and send the C-SN configuration or part of the C-SN configuration to the CU 172. In cases where the DU 174 generates part of the C-SN configuration, the CU 172 may generate the rest of the C-SN configuration. In one implementation, the DU 174 can perform 536 the random access procedure with the UE 102 and identify the UE 102 in the random access procedure. In response to the identification, the DU 174 communicates with the UE 102 using the C-SN configuration or part of the C-SN configuration. In another implementation, the DU 174 can perform 536 the random access procedure with the UE 102 and forward the identity of the UE 102 received in the MAC PDU in the random access procedure to the CU 172. The CU 172 identifies the UE 102 according to the identity of the UE 102. In response to the identification, the CU 172 and DU 174 communicates with the UE 102 using the rest of the C-SN configuration and part of the C-SN configuration respectively.

If the C-SN 106B identifies the UE 102 on the C-PSCell 126B during the random access procedure 536, the C-SN 106B begins to transmit downlink control information (DCI) command(s) on physical downlink control channel(s) (PDCCH(s)), reference signal(s) or data to the UE 102 via the C-PSCell 126B and/or one or more C-SCells (if configured in the C-SN configuration) according to some configuration parameters in the C-SN configuration. If the C-SN 106B identifies the UE 102 on the C-PSCell 126B during the random access procedure 536, the C-SN 106B can receive signal(s) on physical uplink control channel(s) (PUCCH(s)), sounding reference signal(s) or data from the UE 102 via the C-PSCell 126B and/or one or more C-SCells (if configured in the C-SN configuration) according to some configuration parameters in the C-SN configuration. The UE 102 receives the DCI command(s) on PDCCH(s), reference signal(s) or data from the C-SN 106B via the C-PSCell 126B and/or one or more C-SCells (if configured in the C-SN configuration) according to some configuration parameters in the C-SN configuration. The UE 102 may transmit signal(s) on PUCCH(s), sounding reference signal(s) or data to the C-SN 106B via the C-PSCell 126B and one or more C-SCells (if configured in the C-SN configuration) according to some configuration parameters in the C-SN configuration. In response to the identification, the C-SN 106B becomes SN 106B, C-PSCell 126B becomes PSCell 126B, and the one or more C-SCells become one or more SCells.

As described above, the MN 104A and C-SN 106B configures the C-PSCell 126B for the UE 102 before the C-PSCell 126B becomes suitable for the UE 102. The UE 102 retains the C-SN configuration in response to detecting the SCG failure. When the C-PSCell 126B becomes suitable for the UE 102 (i.e., the UE 102 detects the corresponding condition), the UE 102 performs the random access procedure with the C-PSCell to quickly change PSCell (i.e., change SN). In contrast to the immediate SN Addition procedure, the conditional SN addition technique discussed in this disclosure significantly reduces latency associated with DC configuration.

Figure 5B:
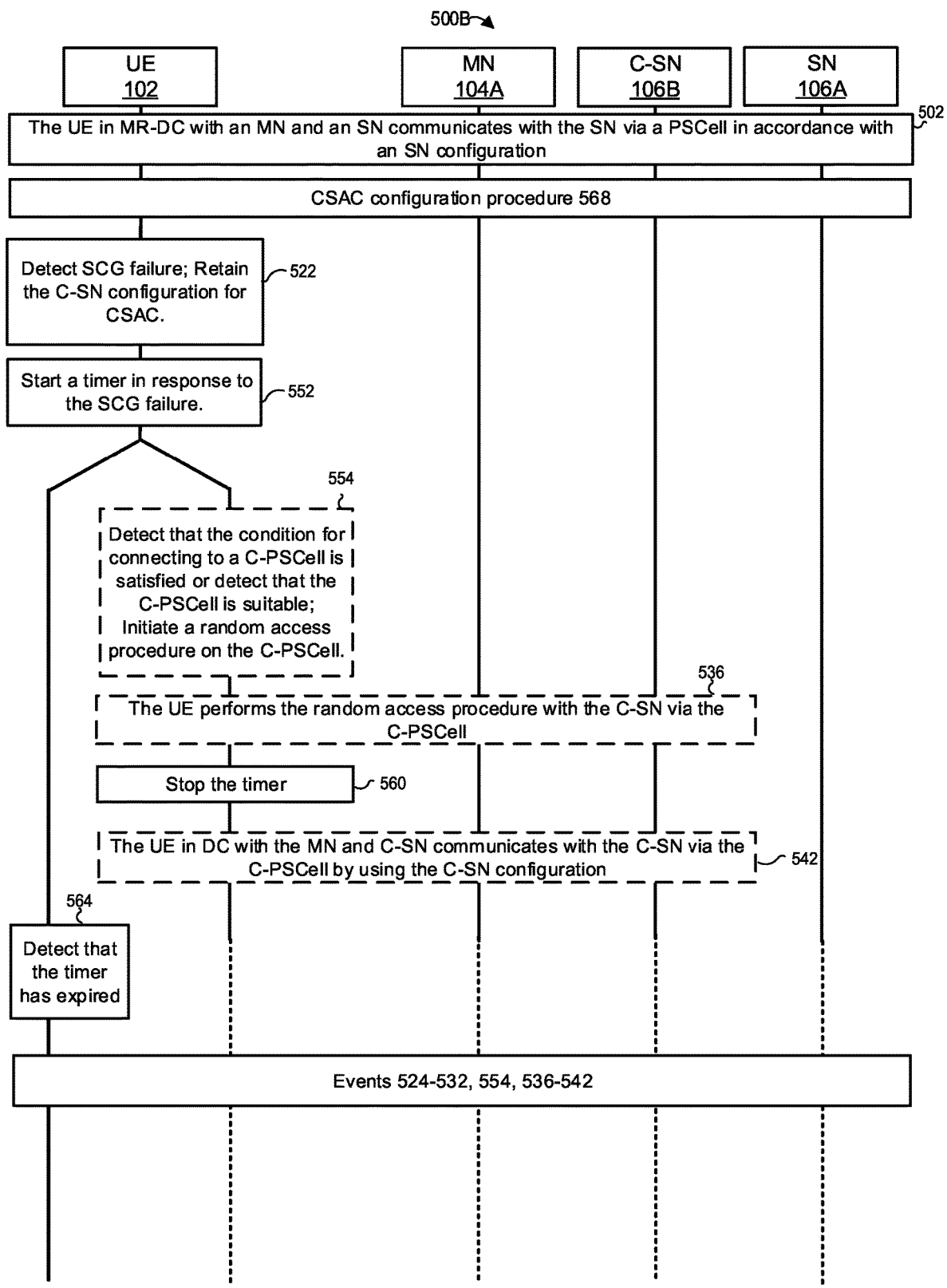
FIG. 5B is a messaging diagram of an example scenario similar to the scenarios of FIGS. 5A, but with the UE notifying the MN of the SCG failure only after failing to connect to the candidate cell within a predetermined period of time.

Now referring to FIG. 5B, a scenario 500B is generally similar to the scenario 500A, and events in this scenario similar to those discussed above are labeled with the same reference numbers. However, the UE 102 in this scenario starts a timer to determine whether to notify the MN 104A of an SCG failure.

The UE detects 522 an SCG failure and retains 522 the C-SN configuration for CSAC. In contrast to the scenario 500A, the UE 102 does not initiate SCG failure reporting upon detecting the SCG failure. Instead, the UE 102 starts 552 an SCG failure recovery timer in response to the SCG failure (e.g., upon detecting the SCG failure). Before the SCG failure timer expires, the UE 102 detects 554 that the condition for connecting to the C-PSCell 126B is satisfied or that the C-PSCell 126B is suitable, and initiates 554 a random access procedure on the C-PSCell 126B in response to the detection. The UE 102 then performs 536 the random access procedure with the C-SN 106B via the C-PSCell 126B, e.g., using one or more random access configurations in the C-SN configuration. If the UE 102 successfully completes the random access procedure, the UE 102 stops 560 the SCG failure recovery timer and communicates 542 with the C-SN 106B via the C-PSCell 126B in accordance with configurations in the C-SN configuration. If the UE 102 does not detect that a condition for connecting to the C-PSCell 126B is satisfied or that the C-PSCell 126B is suitable before detecting 564 that the SCG failure recovery timer has expired, events 524-532, 554, and 536-542 may occur.

Figure 5C:
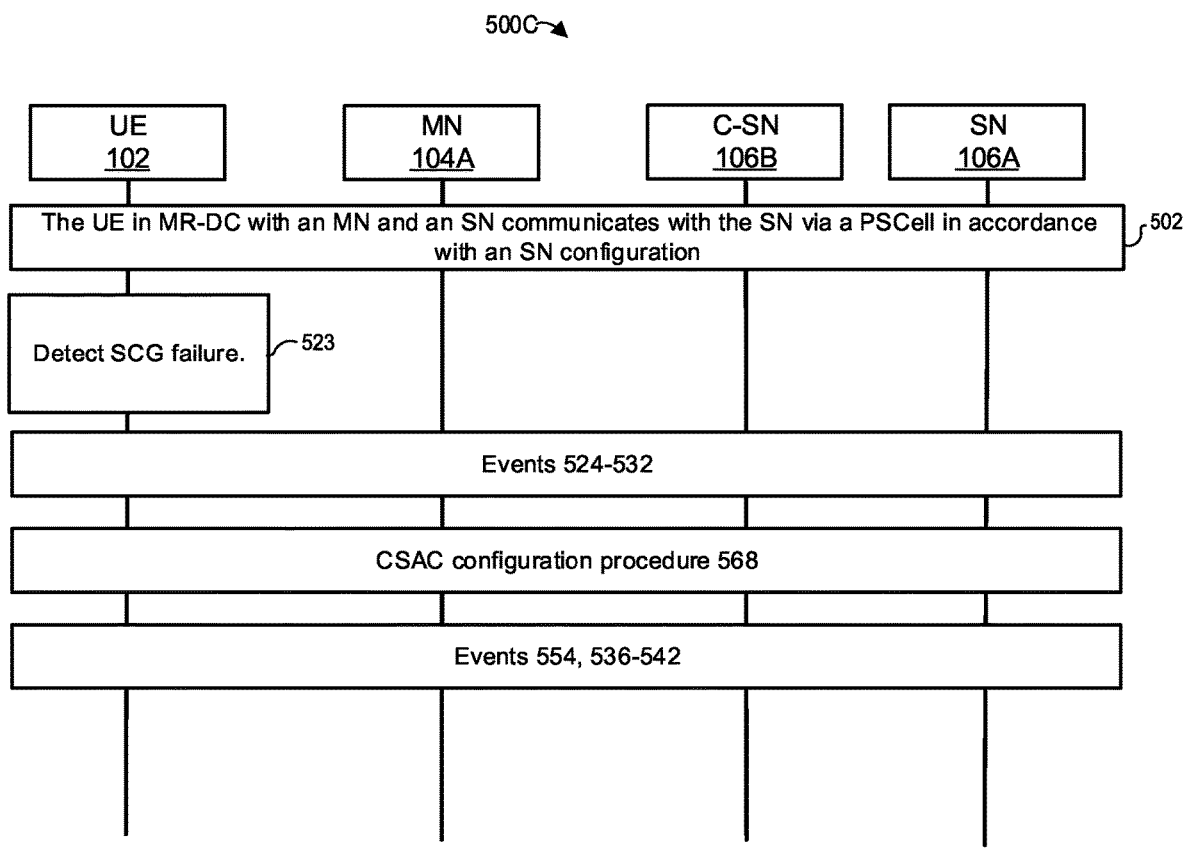
FIG. 5C is a messaging diagram of an example scenario similar to the scenario of FIG. 5A, but with the MN providing the conditional configuration for CSAC after the UE detects SCG failure.

Now referring to FIG. 5C, a scenario 500C is generally similar to the scenario 500A, and events in this scenario similar to those discussed above are labeled with the same reference numbers. In this scenario, the UE 102 detects 523 an SCG failure and transmits 524 an SCG failure information message. When the UE 102 detects 523 the SCG failure, the UE 102 has not yet received a CSAC configuration procedure from the MN 104A. In this scenario, the MN 104A provides 568 the conditional configuration for CSAC after receiving an SCG failure information message indicating that the UE has detected an SCG failure.

Figure 5D:
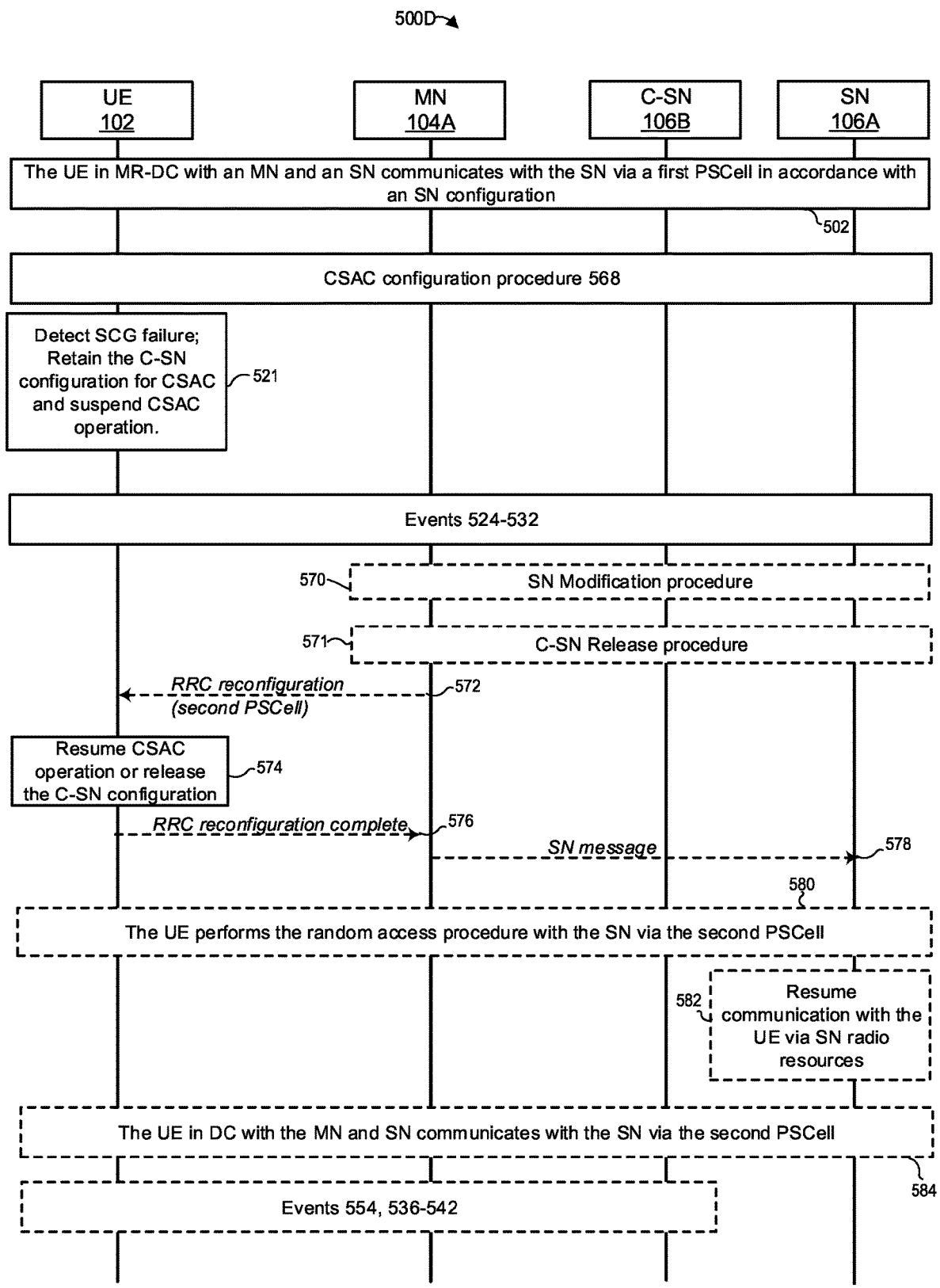
FIG. 5D is a messaging diagram of an example scenario similar to the scenarios of FIG. 5A, but with the UE suspending the conditional operation for CSAC in response to the SCG failure, until the RAN configures a new PSCell.

Now referring to FIG. 5D, a scenario 500D involves handling a conditional configuration when the UE operating in SC with the MN, or in DC with the MN and SN, detects SCG failure. In this scenario, the base station 104A operates as an MN, the base station 106A operates as an SN, and the base station 106B operates as a C-SN. Events in this scenario similar to those discussed above are labeled with the same reference numbers. The differences between the scenarios of FIG. 5A and FIG. 5D are discussed below.

Similar to the scenario 500A, the UE 102 detects 521 SCG failure, and retains 521 the C-SN configuration for CSAC. However, in scenario 500D, the UE 102 suspends 521 a CSAC operation in response to the SCG failure. After the UE 102 suspends the CSAC operation, the UE 102 may stop detecting the condition for connecting to the C-PSCell 126B, or stop connecting to the C-PSCell 126B if the UE 102 detects that the condition for connecting to the C-PSCell 126B is satisfied.

In some implementations, the UE 102 may include at least one measurement result in the SCG failure information message 524 and in turn, the MN 104A may send the at least one measurement result to the SN 106A in the SN message 526. In other implementations, the UE 102 may transmit at least one measurement report message including at least one measurement result to the SN 106A via the MN 104A after the UE 102 detects the SCG failure. In yet other implementations, the UE 102 may transmit at least one measurement report message including at least one measurement result to the MN 104A after the UE 102 detects the SCG failure.

The SN 106A may perform 570 an SN Modification procedure with the MN 104A to configure the UE 102 to perform immediate PSCell change to a second PSCell (e.g., the first PSCell at event 502 or a new PSCell) if the at least one measurement result associated with the second PSCell is above a threshold. In the SN Modification procedure, the SN 106A sends an SN Modification Required message to the MN 104A and the MN 104A may respond with an SN Modification Confirm message. The MN 104A may send an SN Modification Request message to the SN 106A in response to the SN Modification Required message and the SN 106A may send an SN Modification Request Acknowledge message in response.

Alternatively, the MN 104A may initiate and perform 570 an SN Modification procedure with the SN 106A to configure the UE 102 to perform immediate PSCell change to a second PSCell (e.g., the first PSCell at event 502 or a new PSCell) if the at least one measurement result associated with the second PSCell is above a threshold. In the SN Modification procedure, the MN 104A may send an SN Modification Request message to the SN 106A and the SN 106A may send an SN Modification Request Acknowledge message in response. The SN message at event 526 can be the SN Modification Request message so that the SN message at event 526 can be a part of the SN Modification procedure.

The SN 106A configures the UE 102 to perform the immediate PSCell change to the second PSCell in an RRC reconfiguration message (e.g., an SN Modification Required message or an SN Modification Request Acknowledge message). In turn, the MN 104A transmits 572 the RRC reconfiguration message to the UE 102. In one implementation, the MN 104A may transmit an RRC container message including the RRC reconfiguration message to the UE 102 at event 572. If the MN 104A does not configure the UE 102 to release the C-SN configuration in the RRC container message, the UE 102 resumes 574 the CSAC operation in response to the RRC container message. After the UE 102 resumes the CSAC operation, the UE 102 may start detecting the condition for connecting to the C-PSCell 126B, or connect to the C-PSCell 126B if the UE 102 detects that the condition for connecting to the C-PSCell 126B is satisfied. If the UE 102 detects the condition for connecting to the C-PSCell 126B before completing the random access procedure 580, the UE 102 may connect to the C-PSCell 126B after completing the random access procedure. Alternatively, the UE 102 may resume 574 the CSAC operation after completing the random access procedure 380.

If the MN 104A determines to release the C-SN configuration, the MN 104A performs 571 a C-SN Release procedure with the C-SN 106B. In the C-SN Release procedure, the MN 104A sends an SN Release Request message to the C-SN 106B to indicate the C-SN 106B to release the C-SN configuration. The C-SN 106B may send an SN Release Request Acknowledge message to the MN 104A in response to the SN Release Request message. In response to the determination, the MN 104A configures the UE 102 to release the C-SN configuration in the RRC container message, the UE 102 releases 574 the C-SN configuration in response to the RRC container message. The MN 104A may perform the SN Modification procedure 570, the C-SN Release procedure 517 in parallel or sequentially.

The UE 102 transmits 576 an RRC reconfiguration complete message to the MN 104A in response to the RRC reconfiguration message and in turn, the MN 104A may send 578 an SN message including the RRC reconfiguration complete message to the SN 106A. In one implementation, the UE 102 transmits 576 an RRC container response message including the RRC reconfiguration complete message in response to the RRC container message. The SN message the MN 104 transmits 578 can be the SN Modification Confirm message or an SN Reconfiguration Complete message. In some implementations, the MN 104A may include the RRC reconfiguration message in an RRC container message and transmit the RRC container message to the UE 102. The UE 102 may include the RRC reconfiguration complete message in an RRC container response message and transmit the RRC container response message to the MN 104A in response to the RRC container message. In turn, the MN 104A sends the SN Reconfiguration Complete message or the SN Modification Confirm message including the RRC reconfiguration complete message to the SN 106A.

The UE 102 immediately performs 580 a random access procedure on the second PSCell in response to the RRC reconfiguration message 572. If the SN 106A identifies the UE 102 in the random access procedure on the second PSCell, the SN 106A may resume 582 communication with the UE via SN radio resources. If the UE 102 successfully completes the random access procedure, the UE operates 584 in DC with the MN and the SN and communicates 584 with the SN 106A via the second PSCell. Events 554 and 536-542 may occur after event 584.

Figure 5E:
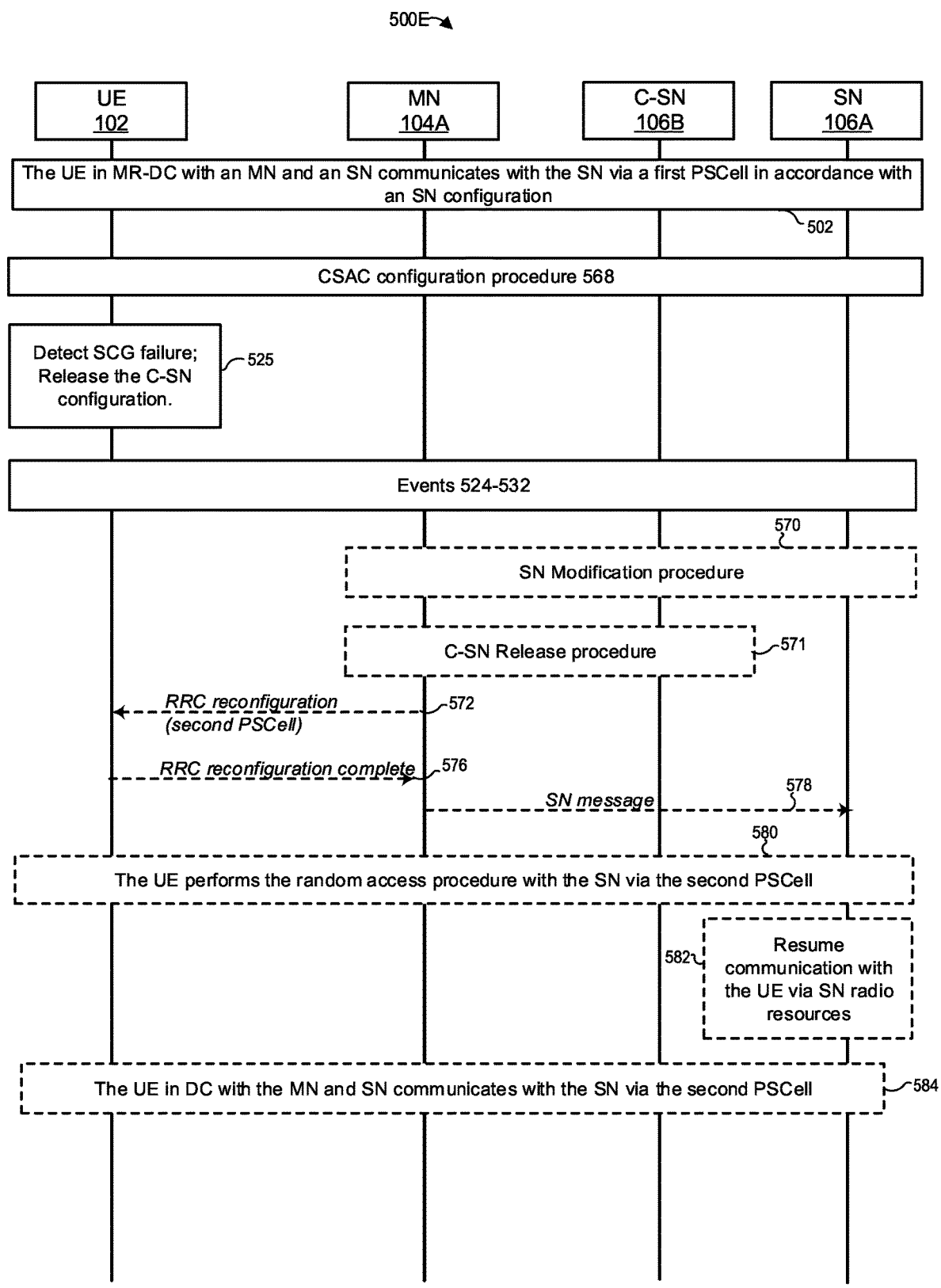
FIG. 5E is a messaging diagram of an example scenario in which a UE operating in MR-DC releases a previously received conditional configuration for CSAC in response to SCG failure, in accordance with the techniques of this disclosure.

Now referring to FIG. 5E, a scenario 500E involves handling a conditional configuration when the UE in SC with the MN or in DC with the MN and SN detects SCG failure. In this scenario, the base station 104A operates as an MN, the base station 106A operates as an SN, and the base station 106B operates as a C-SN. Events in this scenario similar to those discussed above are labeled with the same reference numbers. The differences between the scenarios of FIGS. 5A and 5D and FIG. 5E are discussed below.

In contrast to scenario 500D, in scenario 500E, the UE 102 detects 525 SCG failure, and releases 525 the C-SN configuration (or the condition configuration) in response to the SCG failure rather than retaining the C-SN configuration. The MN 104A does not need to explicitly configure the UE 102 to release the C-SN configuration in the RRC container message.

Figure 6A:
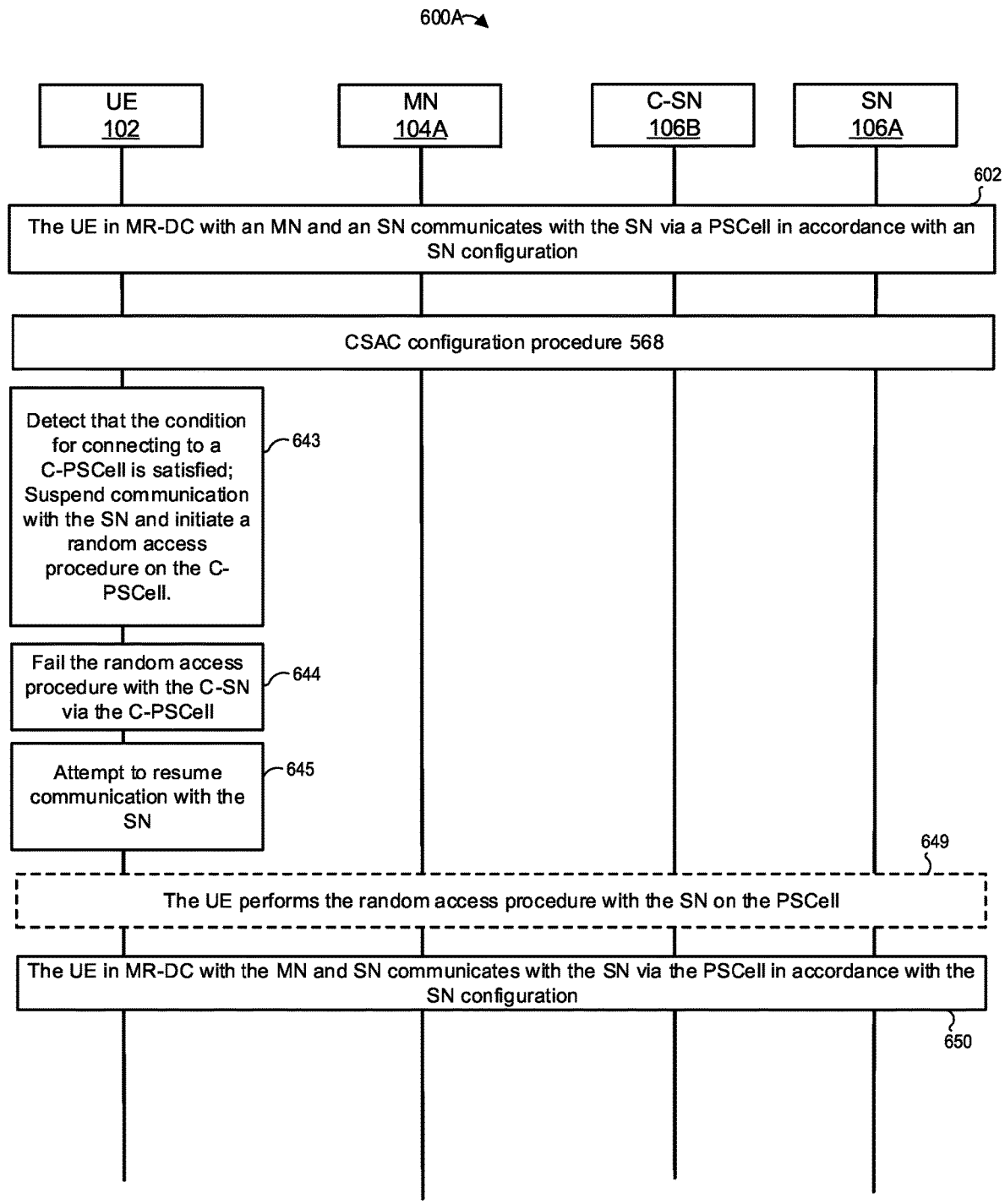
FIG. 6A is a messaging diagram of an example scenario in which a UE operating in MR-DC fails to connect to a C-PSCell and resumes communication on the PSCell with the SN, in accordance with the techniques of this disclosure.

Now referring to FIG. 6A, a scenario 600A involves failure on a CSAC. In this scenario, the base station 104A operates as an MN and the base station 106A operates as an SN. The differences between the scenarios of FIG. 5A and FIG. 6A are discussed below.

At the beginning of scenario 600A, the UE 102 operates in MR-DC with the MN 104A and the SN 106A. The UE 102 communicates 602 UL PDUs and/or DL PDUs with SN 106A via a PSCell (i.e., a cell other than cell 126A) in accordance with a certain SN configuration. The UE 102, the MN 104A, and the SN 106A then perform the CSAC configuration procedure, discussed above with reference to FIG. 5A.

The UE 102 may later detect 643 that the condition for connecting to a C-PSCell 126B is satisfied. The UE 102 may 643 suspend communication with the SN 106A on the PSCell and initiate 643 a random access procedure on the C-PSCell 126B in response to the detection. The UE 102 may also suspend communication with the SN 106A on one or more SCells (if configured). The UE 102 may fail 644 the random access procedure on the C-PSCell 126B. The UE 102 attempts 645 to resume communication with the SN on the PSCell in response to the failure on the random access procedure. To resume communication with the SN 106A on the PSCell, the UE 102 in some implementations may perform 649 a random access procedure with the SN 106A via the PSCell. In some implementations, the UE 102 performs 649 the random access procedure using one or more random access configurations broadcast on the PSCell, e.g., in one or more system information blocks (SIBS). If the UE 102 successfully completes the random access procedure 649, the UE 102 in MR-DC with the MN 104A and SN 106A communicates 650 with the SN 106A via the PSCell in accordance with the SN configuration. That is, the UE 102 resumes communication with the SN 106A via the PSCell. In one implementation, if the UE 102 successfully completes the random access procedure 649, the UE 102 in MR-DC with the MN 104A and SN 106A may also communicate with the SN 106A via the one or more SCells in accordance with the SN configuration. That is, the UE 102 resumes communication with the SN 106A via the one or more SCells. In another implementation, if the UE 102 successfully completes the random access procedure 649, the UE does not communicate with the SN 106A via the one or more SCells in accordance with the SN configuration until the UE 102 receives from the SN 106A a MAC control element (CE) activating the one or more SCells.

In other implementations, the UE 102 skips the event 649. To resume communication with the SN 106A on the PSCell, the UE 102 operates 650 in MR-DC with the MN 104A and SN 106A and communicates 650 with the SN 106A via the PSCell in accordance with the SN configuration. For example, the UE 102 may transmit control signals on PUCCH on the PSCell to the SN 106A and receive at least one physical downlink control channel (PDCCH) on the PSCell or the one or more SCells in accordance with the SN configuration. The control signals may include scheduling request, uplink control information (UCI) or channel state information (CSI).

In some implementations, the UE 102 may fail 644 the random access procedure because the UE 102 does not successfully complete the random access procedure within a time period. For example, the UE 102 may start a timer (e.g., T304 or T307) to count the time period in response to the detection 643. If the UE 102 successfully completes the random access procedure before the timer expires, the UE stops the timer. Otherwise, the timer expires and the UE 102 fails the random access procedure 644 (i.e., the UE 102 fails the CSAC procedure). The UE 102 can determine that an SCG failure occurred upon the timer expiring. In some implementations, the UE 102 can determine that the failure type of the SCG failure is an SCG change failure (or SCG synchronous reconfiguration failure). In other implementations, the UE 102 can determine that the failure type of the SCG failure is a conditional SCG change failure or a conditional SCG synchronous reconfiguration failure.

If the UE 102 skips the random access procedure 649, the UE 102 may fail resume communication with the SN 106A via the PSCell at event 650 because the UE 102 does not identify a UE identity of the UE 102 on the at least one PDCCH on the PSCell within a time period. More specifically, the UE 102 may fail to resume communication with the SN 106A on the PSCell if the UE 102 does not find a cyclic redundancy check (CRC) scrambled with the UE identity on the at least one PDCCH on the PSCell within the time period. For example, the UE 102 may start a timer (e.g., T304, T307 or a new timer T3xx) to count the time period in response to the detection 643. If the UE 102 successfully identifies the UE identity (e.g., the UE 102 finds a CRC scrambled with the UE identity) on the at least one PDCCH on the PSCell before the timer expires, the UE stops the timer and determines that the UE 102 successfully resumed communication with the SN 106A on the PSCell. Otherwise, the timer expires and the UE 102 fails to resume communication with the SN 106A on the PSCell.

In some implementations, the UE 102 may transmit an SCG failure information message to the MN 104A to notify the MN 104A of the (conditional) SCG change failure in response to the failure 644. In other implementations, the UE 102 does not transmit an SCG failure information message as if the failure 644 did not occur or the CSAC procedure did not occur.

In some implementations, the UE 102 may retain the C-SN configuration in response to the failure 644. Then the UE 102 may perform events 554 and 536-542 as described for FIG. 5A. In other implementations, the UE 102 may release the C-SN configuration in response to the failure 644.

Figure 6B:
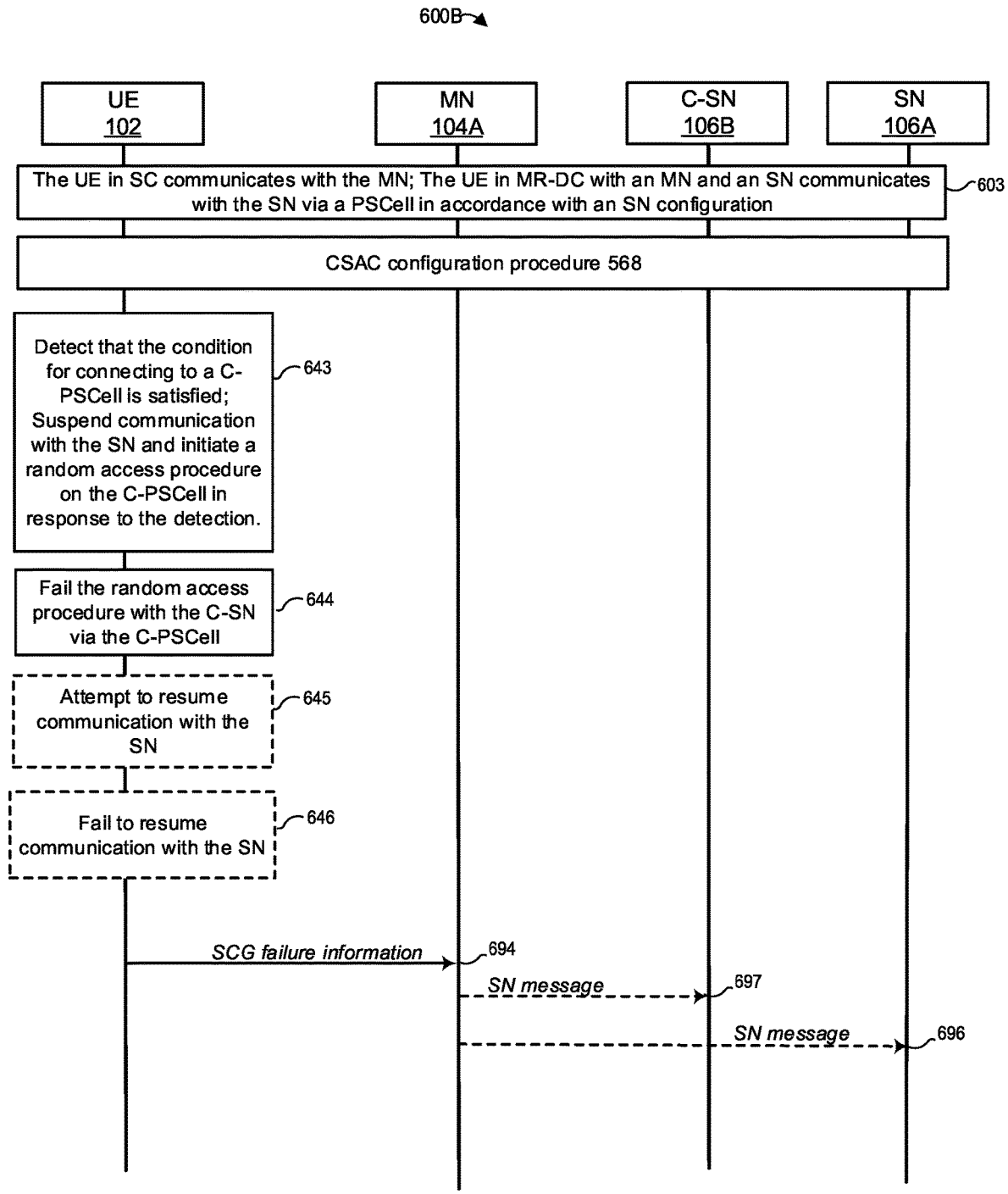
FIG. 6B is a messaging diagram of an example scenario similar to the scenario of FIG. 6A, but with the UE failing to resume communication on the PSCell with the SN.

Next, a scenario 600B of FIG. 6B is generally similar to the scenario 600A, and events in this scenario similar to those discussed above are labeled with the same reference numbers. The differences between FIGS. 6A and 6B are described below.

In the beginning of the scenario 600B, the UE in SC communicates 603 in SC with the MN 104A or operates 603 in DC with the MN 104A and SN 106A and communicates 603 with the SN 106A via the PSCell in accordance with the SN configuration. In some implementations, the UE 102 may attempt 645 to resume communication with the SN 106A on the PSCell. The UE 102 may fail 644 to resume communication with the SN 106A on the PSCell as described for FIG. 6A. The UE 102 may transmit 694 an SCG failure information message to the MN 104A if the UE 102 fails to resume communication with the SN 106A on the PSCell. In other implementations, the UE 102 may not attempt to resume communication with the SN 106A. The UE 102 may transmit 694 an SCG failure information message to the MN 104A in response to the failure 644.

The UE 102 may indicate the (conditional) SCG change failure in the SCG failure information message. The MN 104A may send 697 an SN message to the C-SN 106B in response to the SCG failure information message. The MN 104A may send a 696 SN message to the SN 106A in response to the SCG failure information message. The SN 106A may suspend communication with the UE 102 via SN radio resources in response to the SN message 696 or in response to determination that the UE 102 disconnects from the SN 106A (i.e., the SN 106A determines the UE 102 has the SCG failure by its detection), as described for FIG. 3A.

In some implementations, the MN 104A indicates that the C-SN 106B should release the C-SN configuration in the SN message 697. In one implementation, the SN message 697 can be an SN Release Request message and the C-SN 106B may send an SN Release Request Acknowledge message to the MN 104A in response. In this case, the UE 102 may release the C-SN configuration in response to the failure 644 or 646. Alternatively, the MN 104A may send the UE 102 an RRC reconfiguration message indicating the UE 102 to release the C-SN configuration, and the UE 102 releases the C-SN configuration and transmits an RRC reconfiguration complete message to the MN 104A in response to the RRC reconfiguration message. When the MN 104A is implemented as an eNB or ng-eNB, the RRC reconfiguration message is an RRCConnectionReconfiguration message, and the RRC reconfiguration complete message is an RRCConnectionReconfigurationComplete message. When the MN 104A is implemented as a gNB, the RRC reconfiguration message is an RRCReconfiguration message, and the RRC reconfiguration complete message is an RRCReconfigurationComplete message.

In some implementations, the MN 104A indicates that the SN 106A should release the SN configuration (i.e., release the MR-DC for the UE 102) in the SN message 696. In one implementation, the SN message 696 can be an SN Release Request message and the SN 106A may send an SN Release Request Acknowledge message to the MN 104A in response. The MN 104A may send the UE 102 an RRC reconfiguration message indicating that the UE 102 is to release the MR-DC. The UE 102 may release the MR-DC (i.e., release the SN configuration) and transmit an RRC reconfiguration complete message to the MN 104A in response to the RRC reconfiguration message. When the MN 104A is implemented as an eNB or ng-eNB, the RRC reconfiguration message is an RRCConnectionReconfiguration message, and the RRC reconfiguration complete message is an RRCConnectionReconfigurationComplete message. When the MN 104A is implemented as a gNB, the RRC reconfiguration message is an RRCReconfiguration message, and the RRC reconfiguration complete message is an RRCReconfigurationComplete message.

In other implementations, the MN 104A may indicate that the SN 106A should reconfigure the UE 102. In one implementation, the SN message 696 can be an SN Modification Request message and the SN 106A may send an SN Modification Request Acknowledge message to the MN 104A in response. The SN 106A may reconfigure the UE 102 to connect to a second PSCell (e.g., the PSCell at event 603 or a new PSCell) in an RRC reconfiguration message in the SN Modification Request Acknowledge message. In turn, the MN 104A transmits the RRC reconfiguration message to the UE 102. The UE 102 performs a random access procedure on the second PSCell with the SN 106A according to one or more random access configurations in the RRC reconfiguration message. The UE 102 transmits an RRC reconfiguration complete message to the MN 104A during or after the random access procedure. To transmit the RRC reconfiguration message generated by the SN 106A, the MN 104A in one implementation transmits an RRC container message including the RRC reconfiguration to the UE 102. In response, the UE 102 in one implementation transmits an RRC container response message including the RRC reconfiguration complete message to the MN 104A to transmit the RRC reconfiguration complete message. When the SN 106A is implemented as an ng-eNB, the RRC reconfiguration message generated by the SN 106A is an RRCConnectionReconfiguration message, and the RRC reconfiguration complete message is an RRCConnectionReconfigurationComplete message. When the SN 106A is implemented as a gNB, the RRC reconfiguration message generated by the SN 106A is an RRCReconfiguration message, and the RRC reconfiguration complete message is an RRCReconfigurationComplete message. When the MN 104A is implemented as an eNB or ng-eNB, the RRC container message is an RRCConnectionReconfiguration message, and the RRC container response message is RRCConnectionReconfigurationComplete. When the MN 104A is implemented as a gNB, the RRC container message is an RRCReconfiguration message, and the RRC container response message is an RRCReconfigurationComplete message.

In some implementations, the UE 102 may retain the C-SN configuration in response to the failure 644. Then the UE 102 may perform events 554 and 536-542 as described for FIG. 5A. In this case, the MN 104A may not send the SN message 697 to the C-SN 106B.

For further clarity, several example methods which the devices operating in the systems of FIGS. 1A and 1B can implement are discussed next with reference to FIGS. 7-16.

Figure 7:
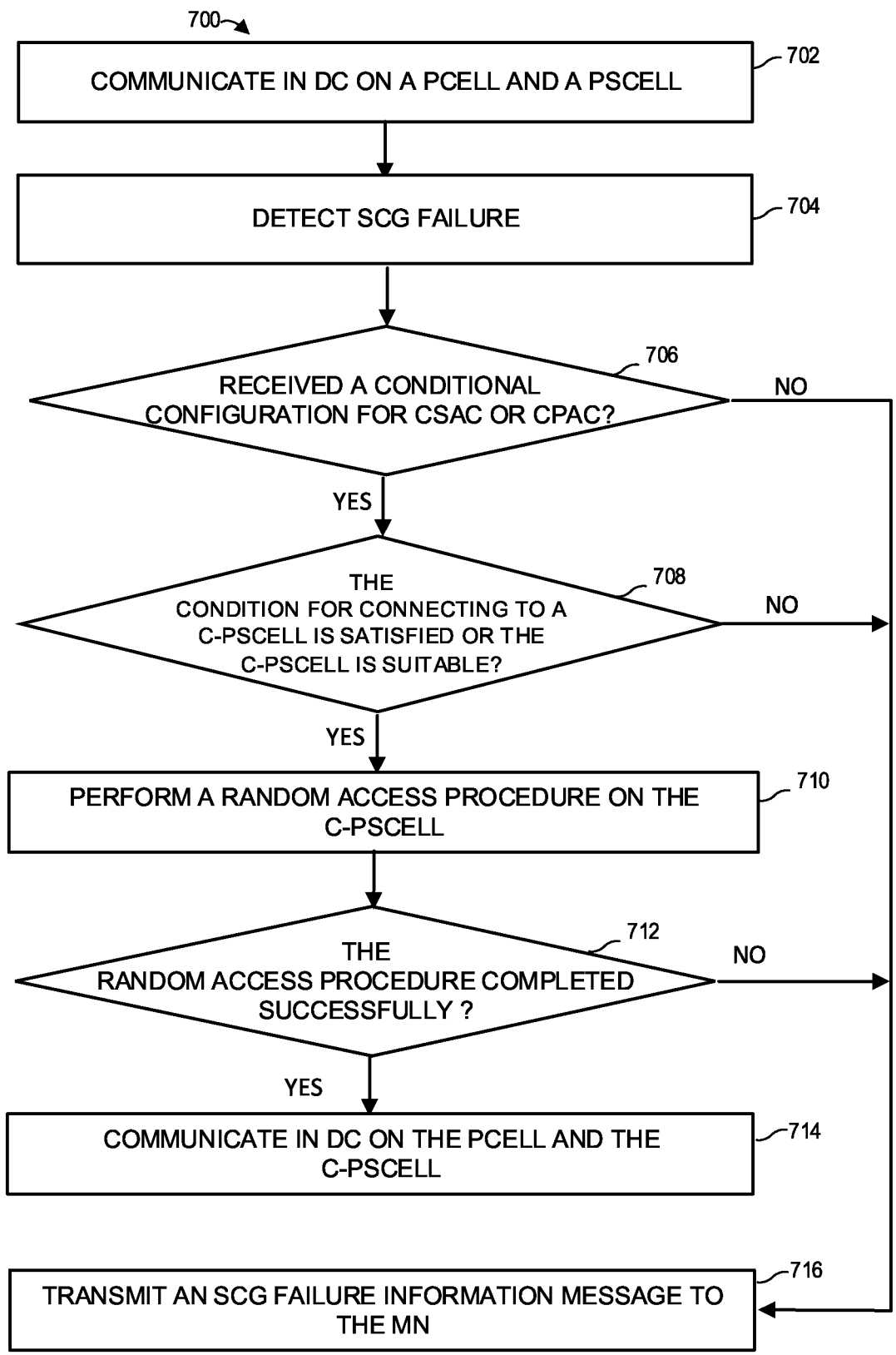
FIG. 7 is a flow diagram of an example method for managing a conditional configuration in view of an SCG failure and a type of a conditional procedure, which can be implemented in a UE of this disclosure.

Referring first to FIG. 7, an example method 700 for managing a conditional configuration can be implemented in a suitable UE such as the UE 102 of FIGS. 1A and 1B, as a set of instructions stored on computer-readable medium and executable by processing hardware (e.g., one or more processors). For convenience, the method 700 is discussed below with reference to the UE 102.

The method 700 begins at block 702, where the UE 102 communicates in DC on a PCell and on a PSCell (event 302 of FIGS. 3A-G; event 402 of FIGS. 4A-D; event 502 of FIGS. 5A-E; event 602 of FIG. 6A; event 603 of FIG. 6B). Next, at block 704, the UE 102 detects an SCG failure (event 322 of FIGS. 3A-D; event 323 of FIG. 3E; event 321 of FIG. 3F; event 325 of FIG. 3G; event 522 of FIGS. 5A-B; event 523 of FIG. 5C; event 521 of FIG. 5I); event 525 of FIG. 5E).

At block 706, the UE 102 determines whether the UE 102 has received a conditional configuration for a conditional procedure such as CPAC (event 320A or 320B of FIGS. 3A-G, 4A-D) or CSAC (event 568 of FIGS. 5A-E, 6A-B), for example. If the UE 102 has not received a conditional configuration, as in FIG. 3E and FIG. 5C, the flow proceeds to block 716. Otherwise, as in FIG. 3D and FIG. 5B, the flow proceeds to block 708.

At block 708, the UE 102 determines whether the UE 102 detects that the condition for connecting to the C-PSCell is satisfied or that the C-PSCell is suitable (event 354 of FIG. 3D; event 554 of FIG. 5B). If the UE 102 does not detect that the condition for connecting to the C-PSCell is satisfied or that the C-PSCell is suitable, the flow proceeds to block 716. Otherwise, the flow proceeds to block 710.

At block 710, the UE 102 performs a random access procedure on the C-PSCell (event 336 of FIG. 3D; event 536 of FIG. 5B). At block 712, the UE 102 determines whether the random access procedure was successfully completed. If the random access procedure was not successfully completed, the flow proceeds to block 716. Otherwise, the flow proceeds to block 714.

At block 714, the UE communicates in DC on the PCell and on the C-PSCell (event 342 of FIG. 3D; event 542 of FIG. 3B). On the other hand, at block 716, the UE 102 transmits an SCG failure information message to the MN (event 324 of FIG. 3E, event 524 of FIG. 5C).

Figure 8:
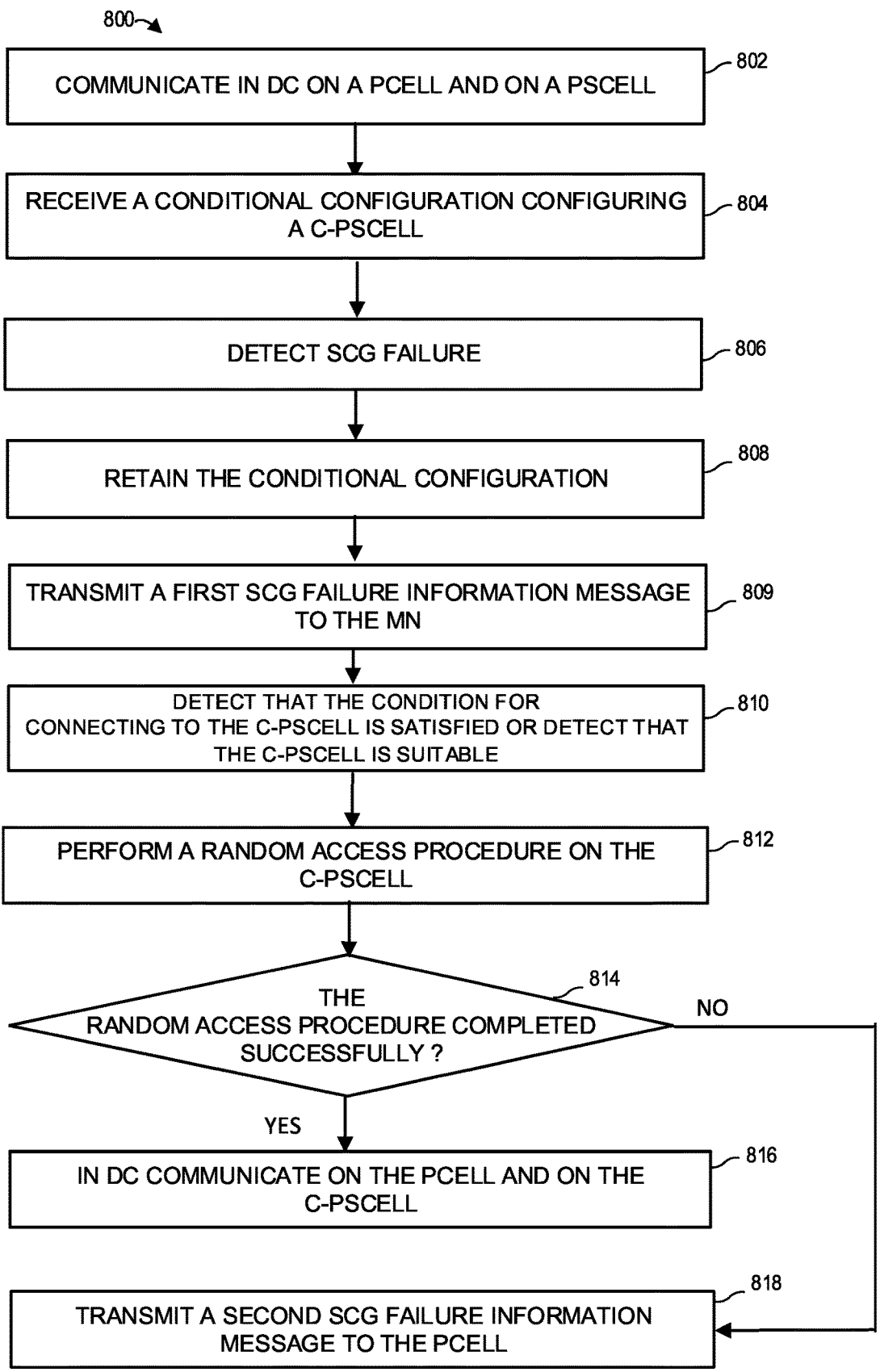
FIG. 8 is a flow diagram of an example method for managing a conditional configuration in view of an SCG failure and the result of a random access procedure on a candidate cell, which can be implemented in a UE of this disclosure.

Now referring to FIG. 8, an example method 800 for managing a conditional configuration after detecting an SCG failure can be implemented in a UE of this disclosure as a set of instructions stored on computer-readable medium by processing hardware (e.g., one or more processors). For convenience, the method 800 is discussed below with reference to the UE 102.

The method 800 begins at block 802, where the UE 102 communicates in DC on a PCell and on a PSCell (event 302 of FIGS. 3A-E; event 402 of FIGS. 4A-D; event 502 of FIGS. 5A-E; event 602 of FIG. 6A). Next, at block 804, the UE 102 receives a conditional configuration for a conditional procedure such as CPAC (event 320A or 320B of FIGS. 3A-D, 3F-G, 4A-D) or CSAC (event 568 of FIGS. 5A-B, 5D-E, 6A-B), for example.

At block 806, the UE 102 detects an SCG failure (event 322 of FIGS. 3A-D; event 321 of FIG. 3F; event 325 of FIG. 3G; event 522 of FIGS. 5A-B; event 521 of FIG. 5D; event 525 of FIG. 5E). Next, at block 808, the UE 102 retains the conditional configuration (event 322 of FIG. 3A-C; event 522 of FIG. 5A). At block 809, the UE 102 transmits a first SCG failure information message to the MN (event 324 of FIG. 3A-C; event 524 of FIG. 5A) in response to the detection.

At block 810, the UE 102 detects that the condition for connecting to the C-PSCell is satisfied or that the C-PSCell is suitable (event 334 of FIGS. 3A-B, event 335 of FIG. 3C, event 554 of FIG. 5A). At block 812, the UE 102 performs a random access procedure on the C-PSCell (event 336 of FIGS. 3A-C, event 536 of FIG. 5A).

At block 814, the UE 102 determines whether the random access procedure was successfully completed. If the random access procedure was not successful, the flow proceeds to block 818. Otherwise, the flow proceeds to block 816.

At block 816, the UE 102 communicates in DC on the PCell and on the C-PSCell (event 342 of FIGS. 3A-C; event 542 of FIG. 5A). Alternatively, if the flow proceeds to block 818, the UE 102 transmits a second SCG failure information message to the PCell. In some implementations, the UE 102 may detect the SCG failure on communication on the PSCell and indicate the SCG failure as an immediate SCG failure in the first SCG failure information message. The UE 102 may indicate a conditional SCG failure in the second SCG failure information message. In some implementations, the UE 102 includes a field or information element in the second SCG failure information message to indicate the conditional SCG failure and does not include the field or information element to indicate the immediate SCG failure.

Figure 9:
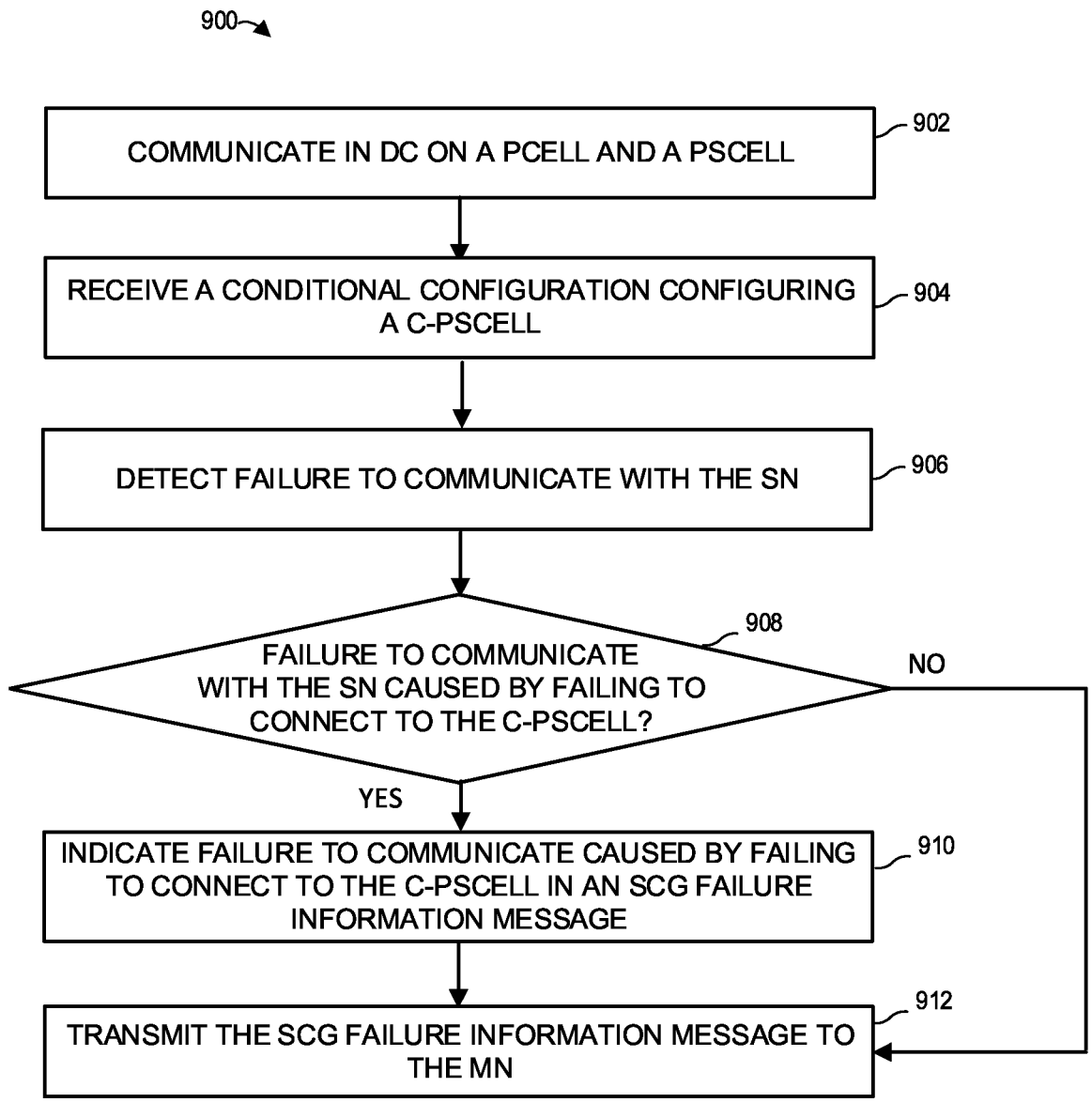
FIG. 9 is a flow diagram of an example method for notifying a RAN of a failure to communicate with an SN with additional information indicating that the UE fails to connect to a C-PSCell, when the UE operates in MR-DC, which can be implemented in a UE of this disclosure.

FIG. 9 illustrates an example method 900 for notifying a RAN of an SCG failure with additional information indicating that the UE fails to connect to a C-PSCell, when the UE operates in MR-DC, which can be implemented in a UE of this disclosure as a set of instructions stored on computer-readable medium by processing hardware (e.g., one or more processors). For convenience, the method 900 is discussed below with reference to the UE 102.

The method 900 starts at block 902, where the UE 102 communicates in DC on a PCell and on a PSCell (event 302 of FIGS. 3A-E; event 402 of FIGS. 4A-D; event 502 of FIGS. 5A-E; event 602 of FIG. 6A). Next, at block 904, the UE 102 receives a conditional configuration for a conditional procedure such as CPAC (event 320A or 320B of FIGS. 3A-D, 3F-G, 4A-D) or CSAC (event 568 of FIGS. 5A-B, 5D-E, 6A-B), for example.

At block 906, the UE 102 detects a failure to communicate with the SN on the PSCell or on a C-PSCell (event 322 of FIGS. 3A-D; event 321 of FIG. 3F; event 325 of FIG. 3G; event 444 of FIGS. 4A-D; event 522 of FIGS. 5A-B; event 521 of FIG. 5D; event 525 of FIG. 5E; event 644 of FIGS. 6A-B). At block 908, the UE 102 determines whether the failure to communicate with the SN was caused by failing to connect to the C-PSCell. If the failure was not caused by failing to connect to the C-PSCell, the flow proceeds to block 912. If failure was caused by failing to connect to the C-PSCell (event 444 of FIGS. 4A-D; event 644 of FIGS. 6A-B), the flow proceeds to block 910.

At block 910, the UE 102 indicates that the failure to communicate with the SN was caused by failing to connect to the C-PSCell in an SCG failure information message and transmits the SCG failure information message to the MN (event 494 of FIGS. 4B-D; event 694 of FIG. 6B) at block 912. If the flow proceeds to block 912 from block 908, the UE 102 also transmits an SCG failure information message to the MN (event 324 of FIGS. 3A-C, 3F-G; event 524 of FIGS. 5A, 5D-E).

Figure 10:
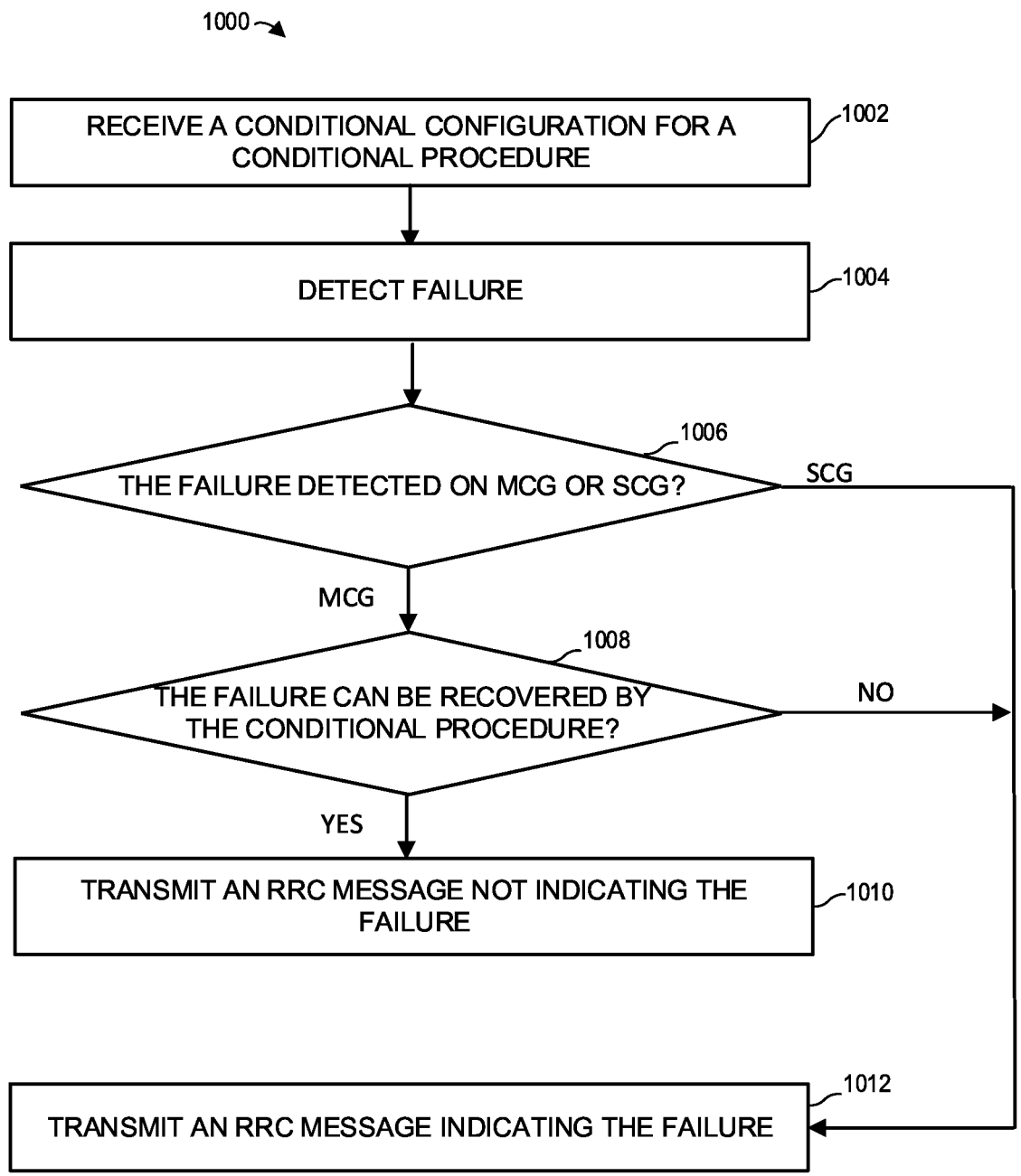
FIG. 10 is a flow diagram of an example method for determining whether a UE should notify the RAN of failure on a conditional procedure of a cell group, which can be implemented in a UE of this disclosure.

FIG. 10 is a flow diagram of an example method 1000 for determining whether to notify a RAN of failure on a conditional procedure, which can be implemented in a UE of this disclosure as a set of instructions stored on computer-readable medium by processing hardware (e.g., one or more processors). For convenience, the method 1000 is discussed below with reference to the UE 102.

The method 1000 starts at block 1002, when the UE 102 receives a conditional configuration for a conditional procedure such as CPAC (event 320A or 320B of FIGS. 3A-G, 4A-D) or CSAC (event 568 of FIGS. 5A-E, 6A-B). Next, at block 1004, the UE 102 detects a failure. At block 1006, the UE 102 determines whether the failure is an MCG failure or an SCG failure. If the failure is an SCG failure, the flow proceeds to block 1012. If the failure is an MCG failure, the flow proceeds to block 1008. In some implementations, MCG failure can be related to MCG radio resources the UE 102 uses to communicate with the MN 104A. The MCG failure can be for example a radio link failure, handover failure (or MCG synchronous reconfiguration failure), MCG reconfiguration failure, or SRB1 or SRB2 integrity failure. The UE 102 can detect the MCG failure while communicating with the MN 104A.

At block 1008, the UE 102 determines whether the failure can be recovered using the conditional procedure. If the failure cannot be recovered, the flow proceeds to block 1012. Otherwise, the flow proceeds to block 1010.

At block 1010, the UE 102 transmits an RRC message that does not indicate the failure to the MN. On the other hand, at block 1012, the UE 102 transmits an RRC message indicating the failure. In some implementations, the RRC message at block 1010 is an RRC reconfiguration complete message (e.g., RRCConnectionReconfigurationComplete message or RRCReconfigurationComplete message) and the RRC message at block 1012 is an SCG failure information message (e.g., SCGFailureInformation message). In some implementations, the UE 102 can detect that a condition for connecting to a candidate PCell (C-PCell) is satisfied, or detect that a C-PCell is suitable, after detecting the MCG failure. The UE 102 may recover the MCG failure by connecting to the C-PCell in response to the detection. To connect to the C-PCell, the UE 102 perform a random access procedure on the C-PCell and transmit the RRC reconfiguration complete message on the C-PCell during or after the random access procedure. If the conditional configuration includes one or more random access configurations, the UE 102 can use the one or more random access configurations to perform the random access procedure. If the conditional configuration includes one or more random access configurations, the UE 102 can use one or more random access configurations in one or more system information blocks broadcast on the C-PCell. In some implementations, the UE 102 may use one or more random access configurations in the conditional configuration and in the one or more SIBs to perform the random access procedure. If the UE 102 successfully completes the random access procedure, the UE 102 communicates data on the C-PCell. If the UE 102 fails the random access procedure, the UE 102 can perform a RRC connection re-establishment procedure in which the UE 102 transmits a RRC reestablishment request message (e.g., RRCConnectionReestablishmentRequest message or RRCReestablishmentRequest message) to a cell.

Figure 11:
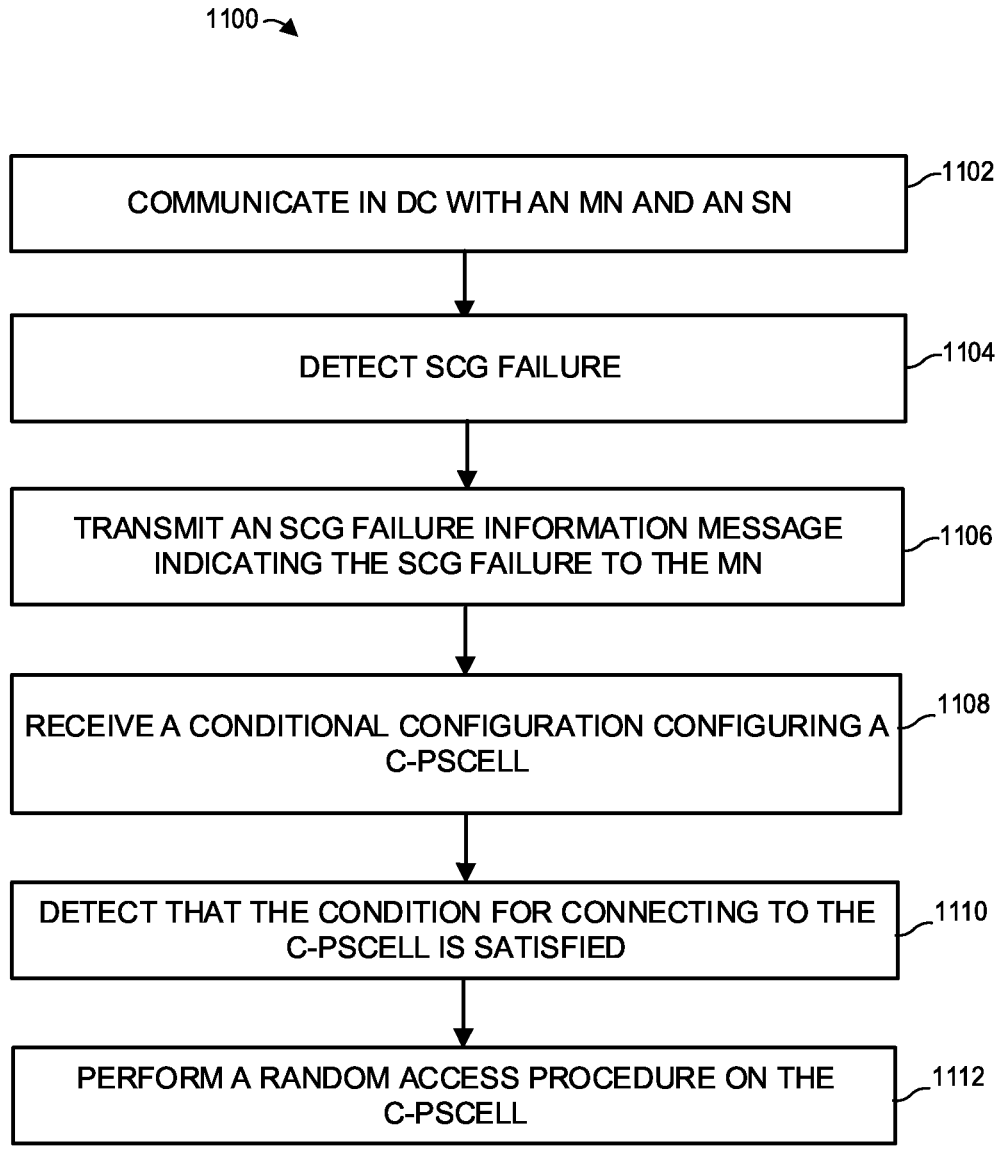
FIG. 11 is a flow diagram of an example method for configuring a conditional configuration after detecting SCG failure, which can be implemented in a UE of this disclosure.

Now referring to FIG. 11, an example method 1100 for configuring a conditional configuration after detecting an SCG failure can be implemented in a UE of this disclosure as a set of instructions stored on computer-readable medium by processing hardware (e.g., one or more processors). For convenience, the method 1100 is discussed below with reference to the UE 102.

The method 1100 starts at block 1102, where the UE 102 communicates in DC with an MN and an SN (event 302 of FIG. 3E; event 502 of FIG. 5C). Next, at block 1104, the UE 102 detects an SCG failure (event 323 of FIG. 3E; event 523 of FIG. 5C). At block 1106, the UE 102 transmits an SCG failure information message indicating the SCG failure to the MN in response to the detection (event 324 of FIG. 3E; event 523 of FIG. 5C).

At block 1108, the UE 102 receives a conditional configuration for a conditional procedure such as CPAC (event 320A of FIG. 3E) or CSAC (event 568 of FIG. 5C) after transmitting the SCG failure information message. The UE 102 may receive the conditional configuration from the MN, for example. At block 1110, the UE 102 detects that a condition for connecting to a C-PSCell is satisfied (event 334 of FIG. 3E; event 554 of FIG. 5C). In response to the detection, at block 1112 the UE 102 performs a random access procedure on the C-PSCell (event 336 of FIG. 3E; event 536 of FIG. 5C). After block 1112, the method 1100 may proceed in a similar way as method 800 at blocks 814-818.

Figure 12:
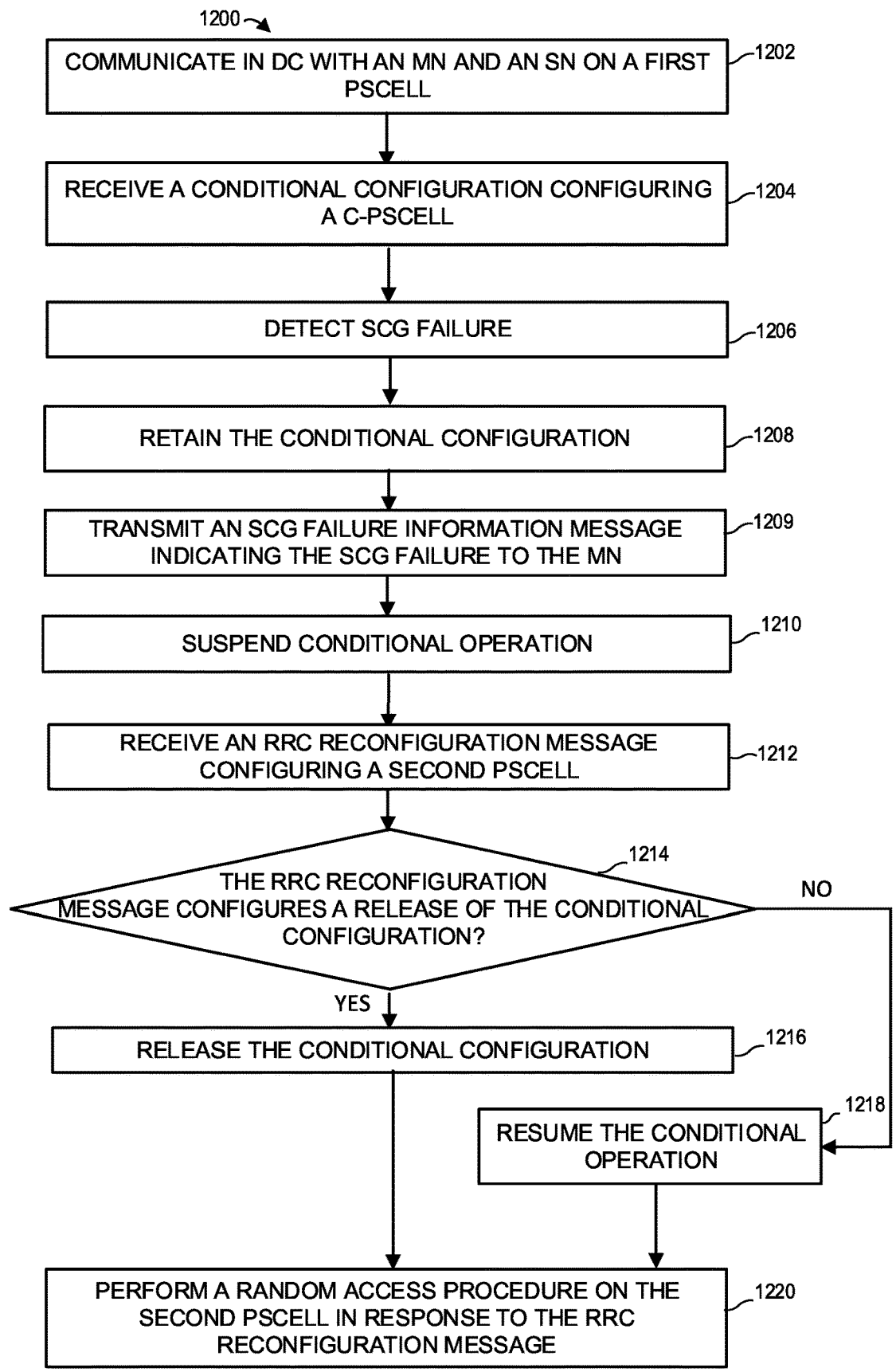
FIG. 12 is a flow diagram of an example method for managing a conditional configuration after detecting SCG failure, which includes suspending the conditional procedure and which can be implemented in a UE of this disclosure.

FIG. 12 illustrates an example method 1200 for managing a conditional configuration after detecting an SCG failure, which can be implemented in a UE of this disclosure as a set of instructions stored on computer-readable medium by processing hardware (e.g., one or more processors). For convenience, the method 1200 is discussed below with reference to the UE 102.

The method 1200 begins at block 1202, where the UE communicates in DC with an MN on a PCell and an SC on a first PSCell (event 302 of FIG. 3F; event 502 of FIG. 5D). Next, at block 1204, the UE 102 receives a conditional configuration for a conditional procedure such as CPAC (320A or 320B of FIG. 3F) or CSAC (568 of FIG. 5D). At block 1206, the UE 102 detects an SCG failure (event 321 of FIG. 3F; event 521 of FIG. 5D).

At block 1208, the UE 102 retains the conditional configuration (event 321 of FIG. 3F; event 521 of FIG. 5D). Next, at block 1209, the UE 102 transmits an SCG failure information message indicating the SCG failure to the MN (event 324 of FIG. 3F; event 524 of FIG. 5D). At block 1210, the UE 102 suspends the conditional operation (event 321 of FIG. 3F; event 521 of FIG. 5D).

At block 1212, the UE 102 receives an RRC reconfiguration message configuring a second PSCell (event 372 of FIG. 3F; event 572 of FIG. 5D). At block 1214, the UE 102 determines whether the RRC reconfiguration message configures the UE 102 to release the conditional configuration. If so, then the flow proceeds to block 1216, where the UE 102 releases the conditional configuration. If not, then the flow proceeds to block 1218, where the UE 102 resumes the conditional operation.

From block 1216 or block 1218, the flow proceeds to block 1220. At block 1220, the UE 102 performs a random access procedure on the second PSCell in response to the RRC reconfiguration message (event 380 of FIG. 3F; event 580 of FIG. 5D).

Figure 13:
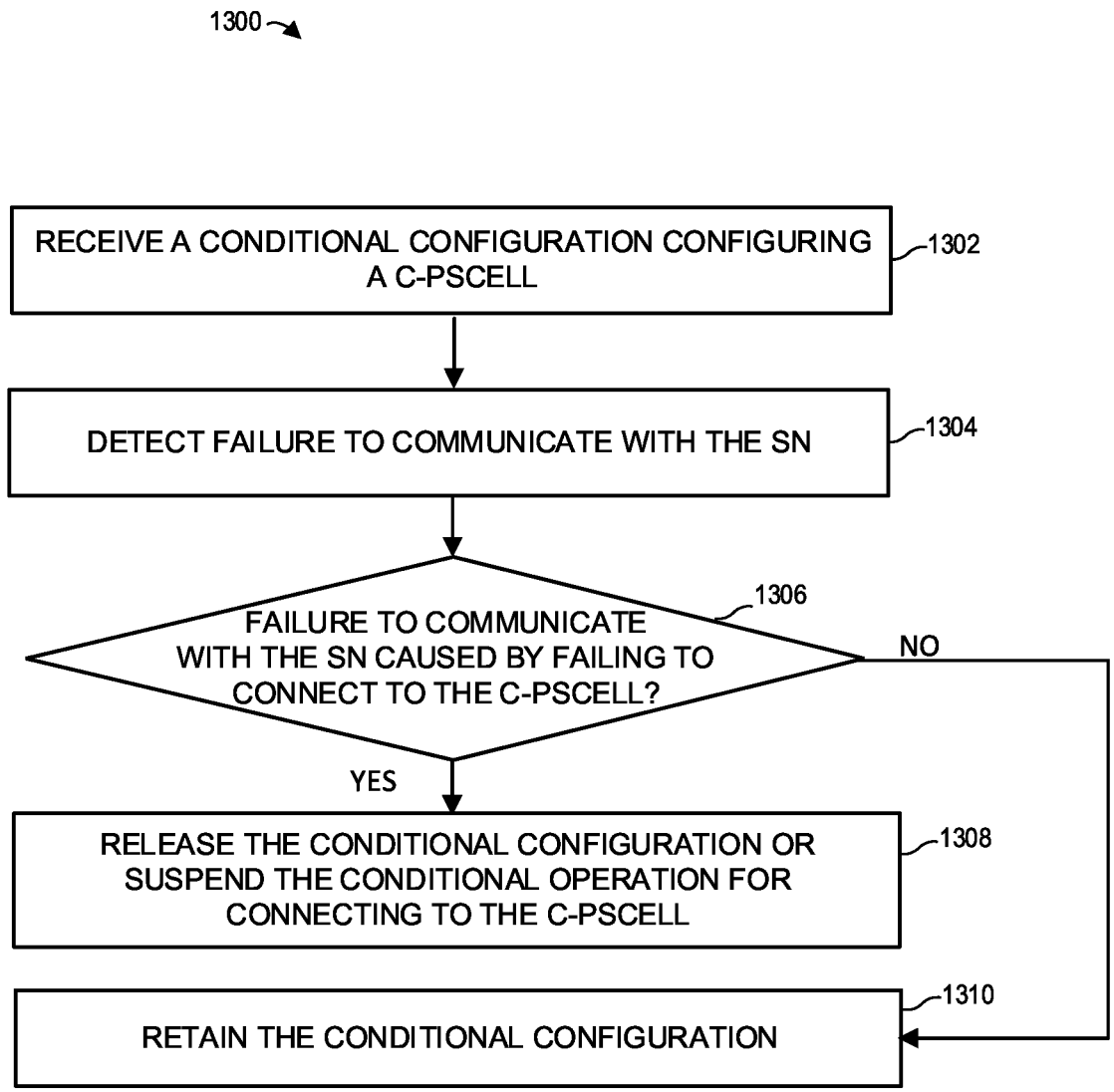
FIG. 13 is a flow diagram of an example method for managing a conditional configuration after detecting a failure to communicate with an SN, which includes releasing the conditional configuration and which can be implemented in a UE of this disclosure.

FIG. 13 is a flow diagram of an example method 1300 for managing a conditional configuration after detecting an SCG failure, which can be implemented in a UE of this disclosure as a set of instructions stored on computer-readable medium by processing hardware (e.g., one or more processors). For convenience, the method 1300 is discussed below with reference to the UE 102.

The method 1300 begins at block 1302, where the UE 102 receives a conditional configuration configuring a C-PSCell (event 320A or 320B of FIG. 4D). At block 1304, the UE 102 detects a failure to communicate with the SN on the PSCell or on a C-PSCell. Next, at block 1306, the UE 102 determines whether the failure to communicate with the SN was caused by failing to connect to the C-PSCell. If the failure was not caused by failing to connect to the C-PSCell, the flow proceeds to block 1310, where the UE 102 retains the conditional configuration. Otherwise, the flow proceeds to block 1308, where the UE 102 releases the conditional configuration (event 448 of FIG. 4D) or suspends the conditional operation for connecting to the C-PSCell. In some scenarios, before or after block 1308, in response to determining that the failure to communicate with the SN was caused by failing to connect to the C-PSCell, the UE 102 may perform steps similar to blocks 910-912 of method 900.

Figure 14:
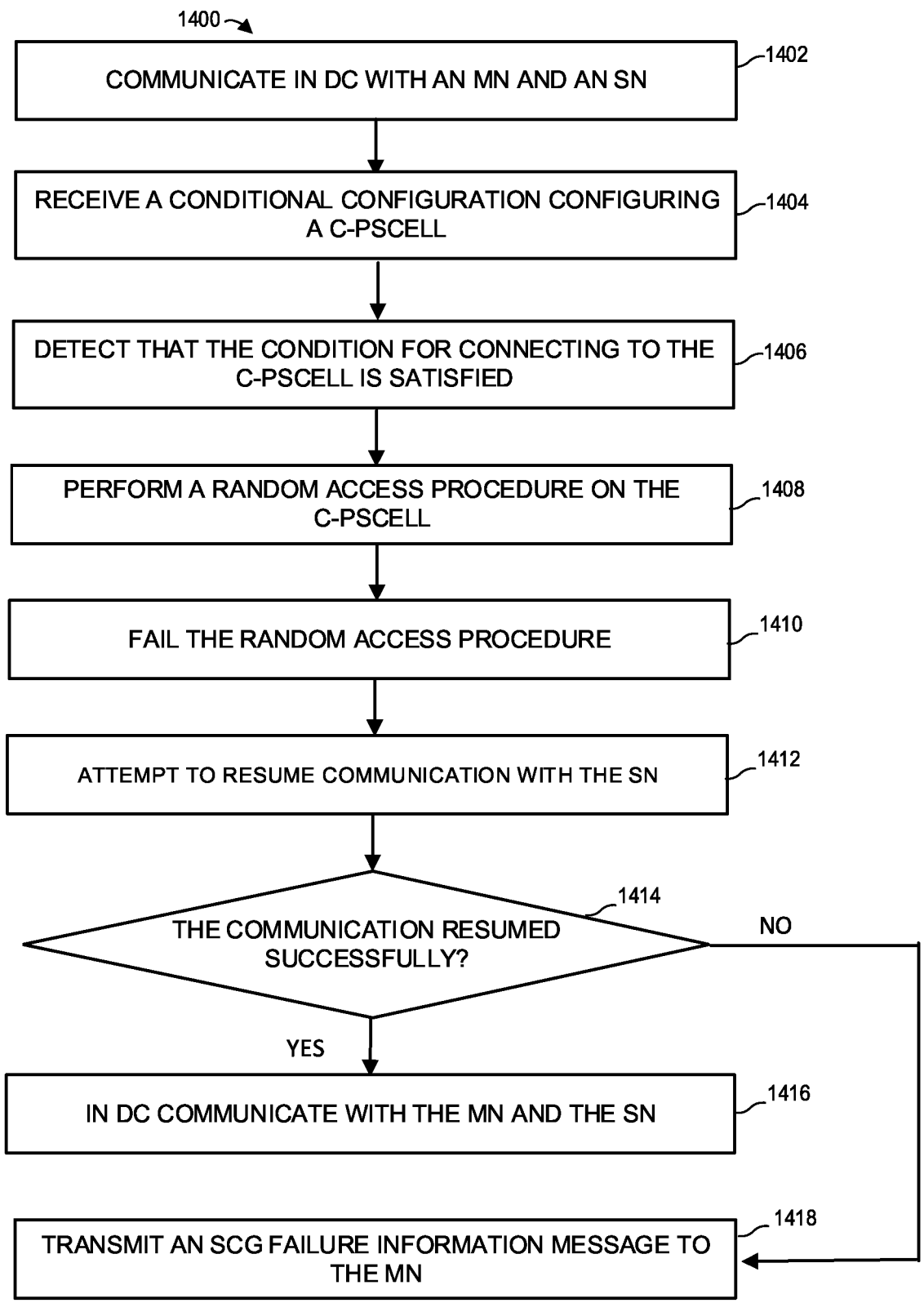
FIG. 14 is a flow diagram of an example method for resuming communication after failing to connect to a C-PSCell, which can be implemented in a UE of this disclosure.

FIG. 14 is a flow diagram of an example method 1400 for resuming communication after failing to connect to a C-PSCell, which can be implemented in a UE of this disclosure as a set of instructions stored on computer-readable medium by processing hardware (e.g., one or more processors). For convenience, the method 1400 is discussed below with reference to the UE 102.

The method 1400 begins at block 1402, where the UE 102 communicates in DC with an MN and an SN (event 402 of FIGS. 4A-B; event 602 or 603 of 6A-B). At block 1404, UE 102 receives a conditional configuration for a conditional procedure such as CPAC (320A or 320B of FIGS. 4A-B) or CSAC (568 of FIGS. 6A-B). At block 1406, the UE 102 detects that the condition for connecting to the C-PSCell is satisfied (event 443 of FIGS. 4A-B; event 643 of FIGS. 6A-B).

At block 1408, in response to the detection, the UE 102 performs a random access procedure on the C-PSCell (event 443 of FIGS. 4A-B; event 643 of FIGS. 6A-B). Next, at block 1410, the UE 102 fails the random access procedure on the C-PSCell (event 444 of FIGS. 4A-B; event 644 of FIGS. 6A-B).

At block 1412, the UE 102 attempts to resume communication with the SN (event 445 of FIGS. 4A-B; event 645 of FIGS. 6A-B). Next, at block 1414, the UE 102 determines whether the communication with the SN was resumed successfully. If so, the flow proceeds to block 1416, where the UE 102 communicates in DC with the MN and the SN (event 450 of FIG. 4A; event 650 of FIG. 6A). Otherwise, the flow proceeds to block 1418, where the UE 102 transmits an SCG failure information message to the MN (event 494 of FIG. 4B; event 694 of FIG. 6B). The UE may indicate in the transmitted SCG failure information message that the failure to communicate was caused by failing to connect to the C-PSCell, similar to blocks 910-912 of method 900.

Figure 15:
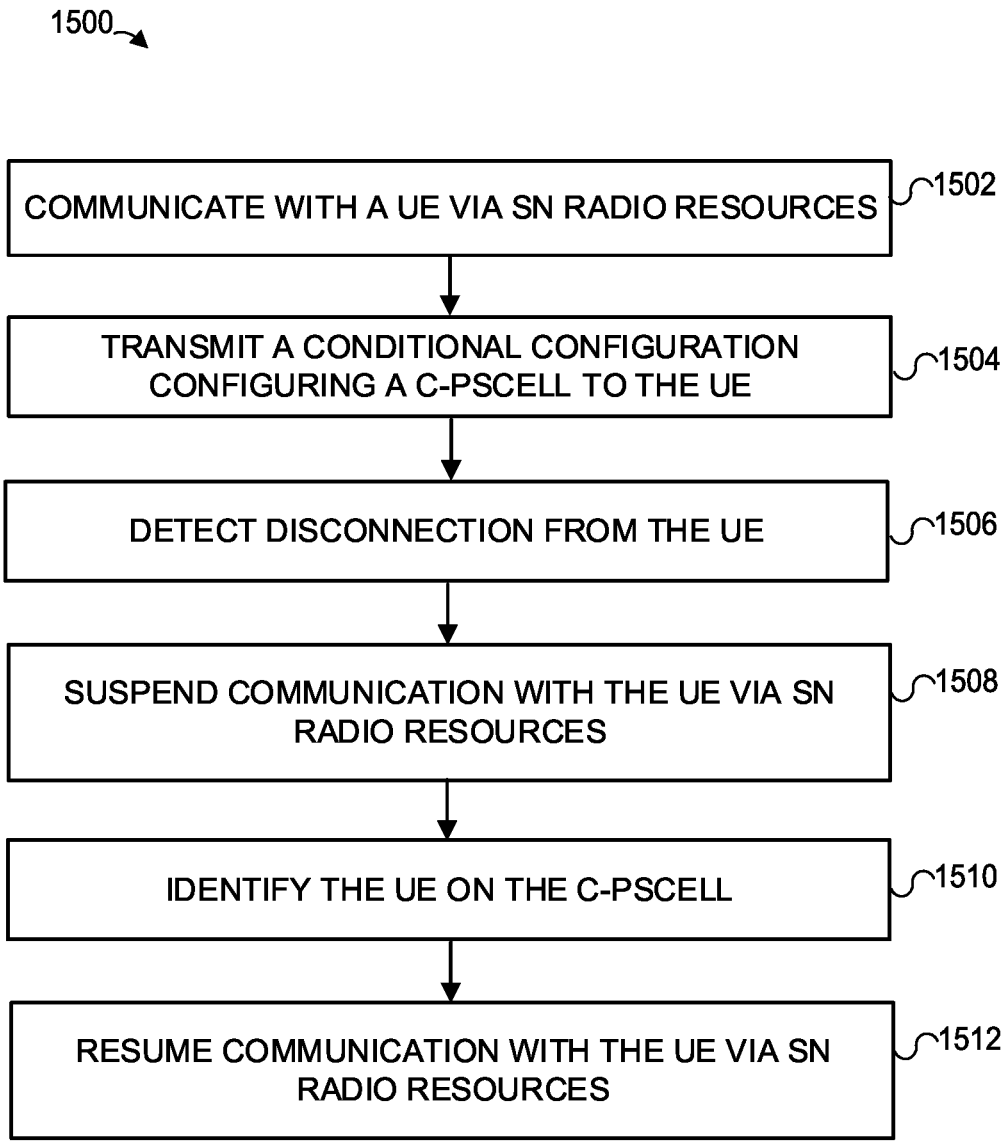
FIG. 15 is a flow diagram of an example method for managing communication with a UE after detecting SCG failure, which can be implemented in a RAN of this disclosure.

Now referring to FIG. 15, an example method 1500 for managing communication with a UE after detecting an SCG failure can be implemented in a RAN of this disclosure as a set of instructions stored on a computer-readable medium and executable by processing hardware (e.g., one or more processors), for example.

The method 1500 begins at block 1502, where the RAN communicates with a UE (such as the UE 102) via SN radio resources (event 302 of FIGS. 3A-D; event 502 of FIGS. 5A-B). Next, at block 1504, the RAN transmits a conditional configuration for a conditional procedure such as CPAC (event 320A or 320B of FIGS. 3A-D) or CSAC (event 568 of FIG. 5A-B) to the UE.

At block 1506, the RAN detects disconnection from the UE (events 324-326 of FIGS. 3A-D; events 524-526 of FIGS. 5A-B). At block 1508, in response to detecting the disconnection, the RAN suspends communication with the UE via SN radio resources (event 328 of FIGS. 3A-D; event 528 of FIGS. 5A-B).

At block 1510, the RAN identifies the UE on the C-PSCell (event 336 of FIGS. 3A-D; event 536 of 5A-B). In response to identifying the UE, at block 1512, the RAN resumes communication with the UE via SN radio resources (events 340-342 of FIGS. 3A-D; event 542 of FIGS. 5A-B).

Figure 16:
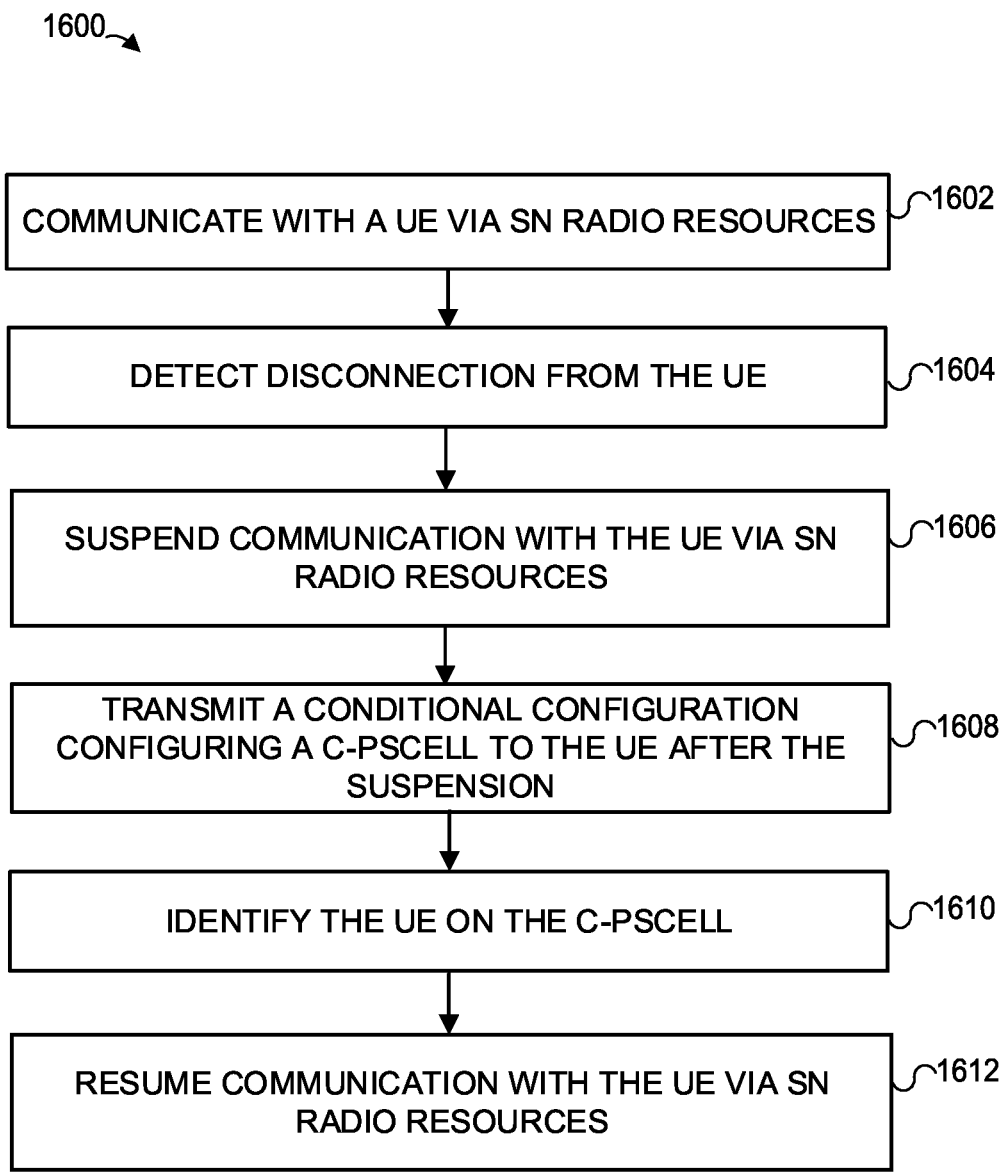
FIG. 16 is a flow diagram of another example method for managing communication with a UE after detecting SCG failure, which can be implemented in a RAN of this disclosure.

FIG. 16 is a flow diagram of an example method for managing communication with a UE after detecting an SCG failure, which can be implemented in a RAN of this disclosure as a set of instructions stored on a computer-readable medium and executable by processing hardware (e.g., one or more processors), for example.

The method 1600 begins at block 1602, where the RAN communicates with a UE (such as the UE 102) via SN radio resources (event 302 of FIG. 3E; event 502 of FIG. 5C). Next, at block 1604, the RAN detects disconnection from the UE (events 324-326 of FIG. 3E; events 524-526 of FIG. 5C). At block 1606, the RAN suspends communication with the UE via SN radio resources in response to detecting the disconnection (event 328 of FIG. 3E; event 528 of FIG. 5C).

After the suspension, at block 1608, the RAN transmits a conditional configuration for a conditional procedure such as CPAC (event 320A of FIG. 3E) or CSAC (event 568 of FIG. 5C) to the UE. At block 1610, the RAN identifies the UE on the C-PSCell (event 336 of FIG. 3E; event 536 of FIG. 5C). Next, at block 1612, the RAN resumes communication with the UE via SN resources (event 340-342 of FIG. 3E; event 542 of FIG. 5C).

Figure 17:
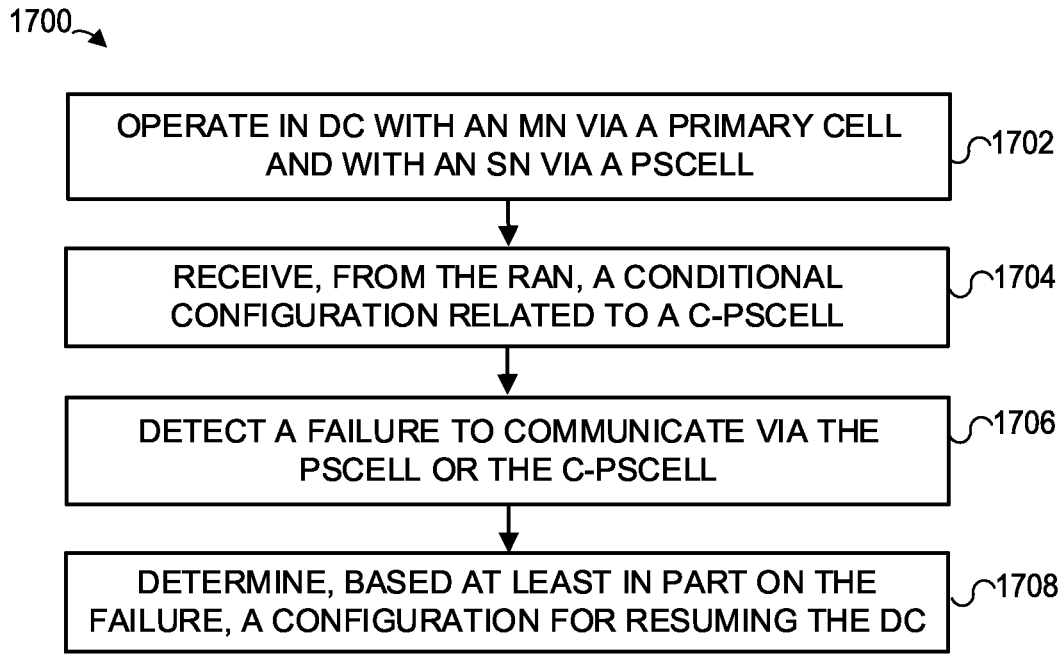
FIG. 17 is a flow diagram of an example method for managing mobility, which can be implemented in a UE of this disclosure.

For further clarity, FIG. 17 illustrates a flow diagram of an example method 1700 for managing mobility, which can be implemented in a UE of this disclosure as a set of instructions stored on computer-readable medium by processing hardware (e.g., one or more processors). For convenience, the method 1700 is discussed below with reference to the UE 102.

The method 1700 begins at block 1702, where the UE 102 operates in DC with an MN via a PCell and with an SN via a PSCell (event 302 of FIGS. 3A-G; event 402 of FIGS. 4A-D; event 502 of FIGS. 5A-E; event 602 of FIG. 6A; event 603 of FIG. 6B). At block 1704, the UE receives a conditional configuration related to a C-PSCell from the RAN (events 320A or 320B of FIGS. 3A-G, 4A-D; event 568 of FIGS. 5A-E, 6A-B).

At block 1706, the UE 102 detects a failure to communicate via the PSCell or the C-PSCell. In some scenarios, detecting the failure may include detecting an SCG failure (event 322 of FIGS. 3A-D; event 323 of FIG. 3E; event 321 of FIG. 3F; event 325 of FIG. 3G; event 522 of FIGS. 5A-B; event 523 of FIG. 5C; event 521 of FIG. 5D; event 525 of FIG. 5E). In other scenarios, detecting the failure may include determining that a random access procedure on the C-PSCell has failed (444 of FIGS. 4A-D; 644 of FIGS. 6A-B). The UE 102 may report the failure to communicate via the PSCell or the C-PSCell to the MN via an SCG information failure message (event 324 of FIGS. 3A-G; event 494 of FIGS. 4B-D; event 524 of FIGS. 5A-E; event 694 of FIG. 6B). The UE 102 may indicate in the SCG failure information message whether the failure to communicate relates to the PSCell or the C-PSCell (block 910 of FIG. 9).

Further, in some implementations, the UE 102 may detect the SCG failure prior to receiving the conditional configuration (e.g., FIGS. 3E, 5C).

At block 1708, the UE 102 determines, based at least in part on the failure detected at block 1706, a configuration for resuming the DC. For example, the UE 102 may retain the conditional configuration in response to detecting an SCG failure (event 322 of FIGS. 3A-D; event 321 of FIG. 3F; event 522 of FIGS. 5A-B; event 521 of FIG. 5E). If a UE 102 has received a conditional configuration, the UE 102 may apply the conditional configuration in response to determining that the condition is satisfied or that the C-PSCell is suitable (events 334 or 335 of FIGS. 3A-F; event 354 of FIG. 3D; event 443 of FIGS. 4A-D; event 554 of FIGS. 5A-C; event 643 of FIGS. 6A-B).

In some implementations, the UE 102 may release the conditional configuration in response to detecting an SCG failure (event 325 of FIG. 3G; event 525 of FIG. 5E). The UE 102 may report the SCG failure to the MN, and subsequently receive from the RAN a configuration for connecting to the SN via a new secondary cell (event 372 of FIG. 3G; event 572 of FIG. 3E).

Further, in some implementations, the UE 102 may start a timer in response to detecting an SCG failure, and stop the timer in response to connecting to a C-PSCell. If the UE 102 does not connect to the C-PSCell before the timer expires, the UE 102 may report the SCG failure to the MN (e.g., FIGS. 3D, 5B).

In some implementations, the UE 102 may suspend the conditional procedure until the RAN reconfigures a connection with the SN via a new secondary cell (e.g., FIGS. 3F, 5D).

In scenarios where the failure to communicate with the SN is caused by failure to connect to the C-PSCell, the UE 102 may attempt to resume connection with the SN via the PSCell (event 445 of FIGS. 4A-B; event 645 of FIGS. 6A-B). The UE 102 may report the failure to the MN (event 494 of FIGS. 4B-4D; event 694 of FIG. 6B). In some scenarios, the UE 102 may retain the conditional configuration and attempt to connect to the C-PSCell after a predetermined amount of time (e.g., FIG. 4C). In other scenarios, the UE 102 may release the conditional configuration (e.g., event 448 of FIG. 4D).

Figure 18:
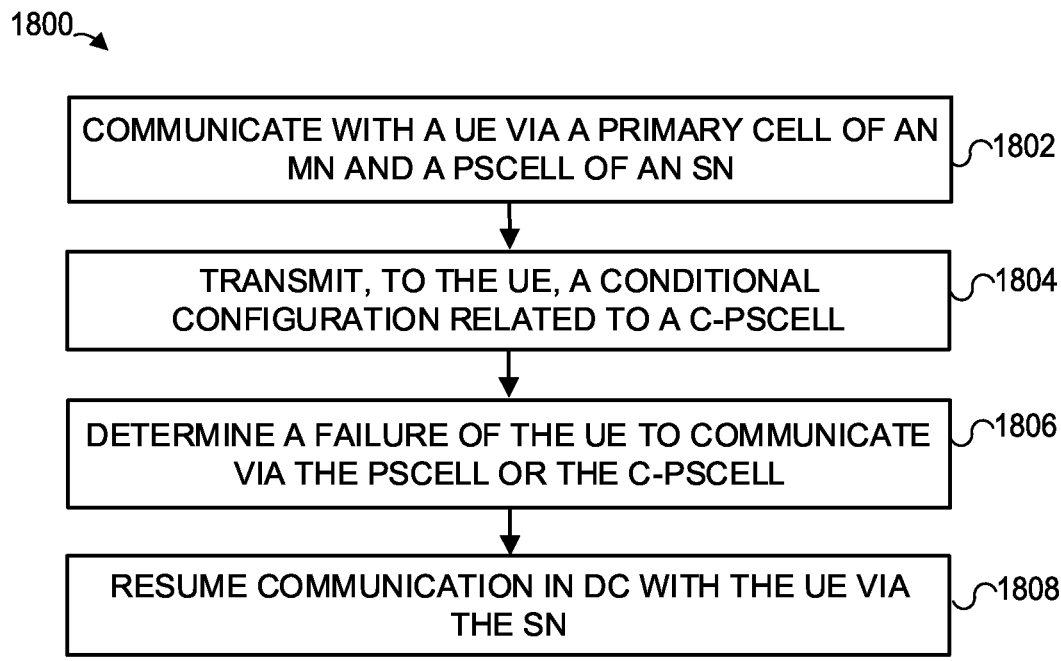
FIG. 18 is a flow diagram of an example method for configuring a UE, which can be implemented in a RAN of this disclosure

FIG. 18 illustrates a flow diagram of an example method 1800 for managing communication with a UE (such as the UE 102), which can be implemented in a RAN of this disclosure as a set of instructions stored on a computer-readable medium and executable by processing hardware (e.g., one or more processors), for example.

The method 1800 begins at block 1802, where the RAN communicates with a UE via a primary cell of an MN and a PSCell of an SN to provide DC to the UE (event 302 of FIGS. 3A-G; event 402 of FIGS. 4A-D; event 502 of FIGS. 5A-E; event 602 of FIG. 6A; event 603 of FIG. 6B). At block 1804, the RAN transmits a conditional configuration related to a C-PSCell to the UE (events 320A or 320B of FIGS. 3A-G, 4A-D; event 568 of FIGS. 5A-E, 6A-B). The conditional configuration is associated with a condition to be satisfied before the UE applies the conditional configuration during a conditional procedure.

At block 1806, in response to determining a failure of the UE to communicate via the PSCell or the C-PSCell, the RAN suspends a communication with the UE via the SN (event 328 of FIGS. 3A-G; event 428 of FIGS. 4C-D; event 528 of FIGS. 5A-E). The RAN may determine a failure of the UE to communicate by receiving an indication of an SCG failure (e.g., FIGS. 3A-F; FIGS. 5A-E), or by determining that the UE has failed a random access procedure on the C-PSCell (e.g., FIGS. 4B-D, 6B).

At block 1808, the RAN resumes the communication with the UE via the SN. The RAN may resume the communication by establishing a connection between the UE and the SN via the C-PSCell (e.g., FIGS. 3A-E, 5A-C), a new secondary cell (e.g., FIGS. 3F-G, 5D-E) or via the PSCell (e.g., FIG. 4C).

The following description may be applied to the description above.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

The following list of examples reflects a variety of the embodiments explicitly contemplated by the present disclosure:

Example 1. A method for managing mobility in a user equipment (UE) operating in dual connectivity (DC) with a master node (MN) via a primary cell and a secondary node (SN) via a primary secondary cell, the MN and the SN operating in a radio access network (RAN), the method comprising: receiving, by processing hardware and from the RAN, a conditional configuration related to a candidate primary secondary cell, the conditional configuration associated with a condition to be satisfied before the UE applies the conditional configuration during a conditional procedure; detecting, by the processing hardware, a failure to communicate via the primary secondary cell or the candidate primary secondary cell; and determining, by the processing hardware and based at least in part on the failure, a configuration according to which the UE is to resume the DC.

Example 2. The method of example 1, wherein the detecting includes detecting a secondary cell group (SCG) failure on the primary secondary cell.

Example 3. The method of example 2, wherein the determining includes: retaining the conditional configuration in response to detecting the SCG failure.

Example 4. The method of example 3, wherein the determining includes: applying the conditional configuration in response to determining that the condition is satisfied.

Example 5. The method of example 3, wherein the determining includes: applying the conditional configuration in response to determining that the candidate secondary cell is suitable, when the condition is not satisfied.

Example 6. The method of any of examples 3-5, further comprising: reporting the SCG failure to the MN.

Example 7. The method of example 6, further comprising: indicating, in a message reporting the SCG failure, whether the SCG failure relates to the primary secondary cell or the candidate primary secondary cell.

Example 8. The method of example 3, further comprising: starting a timer in response to the detecting the SCG failure; in a first instance: detecting that the condition is satisfied prior to expiration of the timer, connecting to the candidate secondary cell, and stopping the timer; and in a second instance: detecting expiration of the timer when the condition is not satisfied; and reporting the SCG failure to the MN.

Example 9. The method of example 3, further comprising: suspending the conditional procedure until the RAN reconfigures a connection with the SN via a new secondary cell.

Example 10. The method of example 2, wherein the detecting of the SCG failure occurs prior to the receiving of the conditional configuration.

Example 11. The method of example 10, wherein the determining includes: applying the conditional configuration in response to determining that the condition is satisfied.

Example 12. The method of example 10, wherein the determining includes: applying the conditional configuration in response to determining that the candidate secondary cell is suitable, when the condition is not satisfied.

Example 13. The method of any of examples 11-12, further comprising: reporting the SCG failure to the MN.

Example 14. The method of example 13, wherein the reporting comprises: indicating, in a message reporting the SCG failure, whether the SCG failure relates to the primary secondary cell or the candidate primary secondary cell.

Example 15. The method of example 2, wherein the determining includes: releasing the conditional configuration in response to the SCG failure.

Example 16. The method of example 15, wherein the determining further includes: reporting the SCG failure to the MN; and receiving, from the RAN and subsequently to the reporting, a configuration for connecting to the SN via a new secondary cell.

Example 17. The method of example 1, wherein the detecting includes determining that a random access procedure on the candidate secondary cell has failed.

Example 18. The method of example 17, wherein determining the configuration includes: resuming the connection with the SN via the primary secondary cell.

Example 19. The method of example 17, wherein determining the configuration includes: in response to failing to resume the connection with the SN via the primary secondary cell, reporting the SCG failure to the MN.

Example 20. The method of example 17, wherein determining the configuration includes: retaining the conditional configuration after determining that the random access procedure on the candidate secondary cell has failed; and attempting to connect to the candidate secondary cell.

Example 21. The method of example 20, wherein the attempting includes attempting to connect to the candidate secondary cell after a predetermined period of a time.

Example 22. The method of example 17, wherein determining the configuration includes: releasing the conditional configuration in response to the failure of the random access procedure.

Example 23. The method of any of the preceding examples, wherein the conditional procedure is a conditional primary second cell addition or change (CPAC).

Example 24. The method of any of the preceding examples, wherein the conditional procedure is a conditional secondary node (SN) addition or change (CSAC).

Example 25. A user equipment (UE) including processing hardware and configured to implement a method of any of examples 1-24.

Example 26. A method in a radio access network (RAN) for configuring a user equipment (UE), the method comprising: communicating, by processing hardware, with a UE via a primary cell of a master node (MN) and a primary secondary cell of a secondary node (SN) to provide dual connectivity (DC) to the UE; transmitting, by processing hardware and to the UE, a conditional configuration related to a candidate secondary cell, the conditional configuration associated with a condition to be satisfied before the UE applies the conditional configuration during a conditional procedure; in response to determining a failure of the UE to communicate via the secondary cell or the candidate secondary cell, suspending a communication with the UE via the SN; and resuming, by the processing hardware, the communication with the UE via the SN.

Example 27. The method of example 26, wherein determining the failure includes: receiving, from the UE, an indication of a secondary cell group (SCG) failure.

Example 28. The method of example 26, wherein resuming the communication includes establishing a connection between the UE and the SN via the candidate secondary cell.

Example 29. The method of example 26, wherein determining the failure includes: determining that the UE has failed a random access procedure on the candidate secondary cell.

Example 30. The method of example 29, wherein resuming the communication includes resuming the communication via the primary secondary cell.

Example 31. The method of example 26, wherein the transmitting occurs before determining the failure.

Example 32. The method of example 26, wherein the transmitting occurs after determining the failure.

Example 33. The method of any of the preceding examples, wherein the conditional procedure is a conditional primary second cell addition or change (CPAC).

Example 34. The method of any of the preceding examples, wherein the conditional procedure is a conditional secondary node (SN) addition or change (CSAC).

Example 35. A base station including processing hardware and configured to implement a method of any of examples 26-34.

What is claimed is:

1. A method for managing mobility in a user equipment (UE) operating in dual connectivity (DC) with a master node (MN) via a primary cell and a secondary node (SN) via a primary secondary cell associated with a secondary cell group (SCG), the MN and the SN operating in a radio access network (RAN), the method comprising:
   receiving, by the UE and from the RAN, a conditional configuration related to a candidate primary secondary cell (PSCell), the conditional configuration associated with a condition to be satisfied before the UE applies the conditional configuration during a conditional procedure;
   detecting, by the UE, an SCG failure;
   in response to the detecting, suspending, by the UE, the conditional procedure;
   receiving, from the RAN and subsequent to the detecting the SCG failure, a radio resource control (RRC) reconfiguration message for an unconditional PSCell change; and
   releasing the conditional configuration in response to the RRC reconfiguration message.

2. The method of claim 1, wherein the suspending includes:
   retaining the conditional configuration.

3. The method of claim 2, wherein the suspending includes:
   stopping detecting whether the condition is satisfied.

4. The method of claim 2, wherein the suspending includes:
refraining from applying the conditional configuration if the UE detects that the condition is satisfied.

5. The method of claim 1, further comprising:
reporting, by the UE, the SCG failure to the MN.

6. The method of claim 5, wherein the reporting includes:
transmitting an SCG failure information message to the MN.

7. The method of claim 5, further comprising:
indicating, in a message reporting the SCG failure, whether the SCG failure relates to a primary secondary cell or a candidate primary secondary cell.

8. The method of claim 1, wherein the conditional procedure is a conditional primary secondary cell change (CPC).

9. The method of claim 1, wherein the conditional procedure is a conditional secondary node (SN) addition or change (CSAC).

10. The method of claim 1, wherein detecting the SCG failure includes detecting at least one of:
a radio link failure;
an SCG change failure;
an SCG synchronous reconfiguration failure;
an SCG reconfiguration failure; or
a signaling radio bearer 3 (SRB3) integrity failure.

11. A user equipment (UE) including processing hardware, the UE operating in dual connectivity (DC) with a master node (MN) via a primary cell and a secondary node (SN) via a primary secondary cell associated with a secondary cell group (SCG), the MN and the SN operating in a radio access network (RAN), and the UE configured to:
receive, from the RAN, a conditional configuration related to a candidate primary secondary cell (PSCell), the conditional configuration associated with a condition to be satisfied before the UE applies the conditional configuration during a conditional procedure;
detect an SCG failure;
in response to the detecting, suspend the conditional procedure;
receive, from the RAN and subsequent to detecting the SCG failure, a radio resource control (RRC) reconfiguration message for an unconditional PSCell change; and
release the conditional configuration in response to the RRC reconfiguration message.

12. The UE of claim 11, wherein to suspend the conditional procedure, the UE is configured to:
retain the conditional configuration.

13. The UE of claim 12, wherein to suspend the conditional procedure, the UE is configured to:
stop detecting whether the condition is satisfied.

14. The UE of claim 12, wherein to suspend the conditional procedure, the UE is configured to:
refrain from applying the conditional configuration if the UE detects that the condition is satisfied.

15. The UE of claim 11, wherein the conditional procedure is a conditional primary secondary cell change (CPC) or a conditional secondary node (SN) addition or change (CSAC).

* * * * *